US009202779B2

(12) United States Patent
Kornachuk et al.

(10) Patent No.: US 9,202,779 B2
(45) Date of Patent: Dec. 1, 2015

(54) ENFORCEMENT OF SEMICONDUCTOR STRUCTURE REGULARITY FOR LOCALIZED TRANSISTORS AND INTERCONNECT

(71) Applicant: Tela Innovations, Inc., Los Gatos, CA (US)

(72) Inventors: Stephen Kornachuk, Campbell, CA (US); Jim Mali, Morgan Hill, CA (US); Carole Lambert, Campbell, CA (US); Scott T. Becker, Scotts Valley, CA (US)

(73) Assignee: Tela Innovations, Inc., Los Gatos, CA (US)

( * ) Notice: Subject to any disclaimer, the term of this patent is extended or adjusted under 35 U.S.C. 154(b) by 0 days.

(21) Appl. No.: 14/216,891

(22) Filed: Mar. 17, 2014

(65) Prior Publication Data

US 2014/0197543 A1 Jul. 17, 2014

Related U.S. Application Data

(60) Continuation of application No. 13/897,307, filed on May 17, 2013, now Pat. No. 8,701,071, which is a division of application No. 12/363,705, filed on Jan. 30, 2009, now Pat. No. 8,453,094.

(60) Provisional application No. 61/024,980, filed on Jan. 31, 2008.

(51) Int. Cl.
*G06F 17/50* (2006.01)
*H01L 23/498* (2006.01)

(52) U.S. Cl.
CPC .......... *H01L 23/498* (2013.01); *G06F 17/5072* (2013.01); *G06F 17/5077* (2013.01); *G06F 2217/12* (2013.01); *H01L 2924/0002* (2013.01)

(58) Field of Classification Search
CPC ................................ G06F 17/50; G06F 15/04
USPC ......................................................... 716/126
See application file for complete search history.

(56) References Cited

U.S. PATENT DOCUMENTS

| 4,197,555 A | 4/1980 | Uehara et al. |
| 4,417,161 A | 11/1983 | Uya |

(Continued)

FOREIGN PATENT DOCUMENTS

| EP | 0102644 | 7/1989 |
| EP | 0788166 | 8/1997 |

(Continued)

OTHER PUBLICATIONS

U.S. Appl. No. 60/625,342, filed May 25, 2006, Pileggi et al.

(Continued)

*Primary Examiner* — Thuan Do
(74) *Attorney, Agent, or Firm* — Martine Penilla Group, LLP

(57) ABSTRACT

A global placement grating (GPG) is defined for a chip level to include a set of parallel and evenly spaced virtual lines. At least one virtual line of the GPG is positioned to intersect each contact that interfaces with the chip level. A number of sub-gratings are defined. Each subgrating is a set of equally spaced virtual lines of the GPG that supports a common layout shape run length thereon. The layout for the chip level is partitioned into subgrating regions. Each subgrating region has any one of the defined subgratings allocated thereto. Layout shapes placed within a given subgrating region in the chip level are placed in accordance with the subgrating allocated to the given subgrating region. Non-standard layout shape spacings at subgrating region boundaries can be mitigated by layout shape stretching, layout shape insertion, and/or subresolution shape insertion, or can be allowed to exist in the final layout.

21 Claims, 20 Drawing Sheets

(56) References Cited

U.S. PATENT DOCUMENTS

| | | |
|---|---|---|
| 4,424,460 A | 1/1984 | Best |
| 4,602,270 A | 7/1986 | Finegold et al. |
| 4,613,940 A | 9/1986 | Shenton et al. |
| 4,657,628 A | 4/1987 | Holloway et al. |
| 4,682,202 A | 7/1987 | Tanizawa |
| 4,745,084 A | 5/1988 | Rowson et al. |
| 4,780,753 A | 10/1988 | Miyashima et al. |
| 4,801,986 A | 1/1989 | Chang et al. |
| 4,804,636 A | 2/1989 | Groover, III |
| 4,812,688 A | 3/1989 | Chu et al. |
| 4,884,115 A | 11/1989 | Michel et al. |
| 4,928,160 A | 5/1990 | Crafts |
| 4,975,756 A | 12/1990 | Haken et al. |
| 5,068,603 A | 11/1991 | Mahoney |
| 5,079,614 A | 1/1992 | Khatakhotan |
| 5,097,422 A | 3/1992 | Corbin |
| 5,117,277 A | 5/1992 | Yuyama et al. |
| 5,121,186 A | 6/1992 | Wong et al. |
| 5,208,765 A | 5/1993 | Turnbull |
| 5,224,057 A | 6/1993 | Igarashi |
| 5,242,770 A | 9/1993 | Chen et al. |
| 5,268,319 A | 12/1993 | Harari |
| 5,298,774 A | 3/1994 | Ueda et al. |
| 5,313,426 A | 5/1994 | Sakuma et al. |
| 5,351,197 A | 9/1994 | Upton et al. |
| 5,359,226 A | 10/1994 | DeJong |
| 5,365,454 A | 11/1994 | Nakagawa et al. |
| 5,367,187 A | 11/1994 | Yuen |
| 5,378,649 A | 1/1995 | Huang |
| 5,396,128 A | 3/1995 | Dunning et al. |
| 5,420,447 A | 5/1995 | Waggoner |
| 5,461,577 A | 10/1995 | Shaw et al. |
| 5,471,403 A | 11/1995 | Fujimaga |
| 5,497,334 A | 3/1996 | Russell et al. |
| 5,497,337 A | 3/1996 | Ponnapalli et al. |
| 5,526,307 A | 6/1996 | Lin et al. |
| 5,536,955 A | 7/1996 | Ali |
| 5,545,904 A | 8/1996 | Orbach |
| 5,581,098 A | 12/1996 | Chang |
| 5,581,202 A | 12/1996 | Yano et al. |
| 5,612,893 A | 3/1997 | Hao et al. |
| 5,636,002 A | 6/1997 | Garofalo |
| 5,656,861 A | 8/1997 | Godinho et al. |
| 5,682,323 A | 10/1997 | Pasch et al. |
| 5,684,311 A | 11/1997 | Shaw |
| 5,684,733 A | 11/1997 | Wu et al. |
| 5,698,873 A | 12/1997 | Colwell et al. |
| 5,705,301 A | 1/1998 | Garza et al. |
| 5,723,883 A | 3/1998 | Gheewalla |
| 5,723,908 A | 3/1998 | Fuchida et al. |
| 5,740,068 A | 4/1998 | Liebmann et al. |
| 5,745,374 A | 4/1998 | Matsumoto |
| 5,764,533 A | 6/1998 | deDood |
| 5,774,367 A | 6/1998 | Reyes et al. |
| 5,780,909 A | 7/1998 | Hayashi |
| 5,789,776 A | 8/1998 | Lancaster et al. |
| 5,790,417 A | 8/1998 | Chao et al. |
| 5,796,128 A | 8/1998 | Tran et al. |
| 5,796,624 A | 8/1998 | Sridhar et al. |
| 5,798,298 A | 8/1998 | Yang et al. |
| 5,814,844 A | 9/1998 | Nagata et al. |
| 5,825,203 A | 10/1998 | Kusunoki et al. |
| 5,834,851 A | 11/1998 | Ikeda et al. |
| 5,838,594 A | 11/1998 | Kojima |
| 5,841,663 A | 11/1998 | Sharma et al. |
| 5,847,421 A | 12/1998 | Yamaguchi |
| 5,850,362 A | 12/1998 | Sakuma et al. |
| 5,852,562 A | 12/1998 | Shinomiya et al. |
| 5,858,580 A | 1/1999 | Wang et al. |
| 5,898,194 A | 4/1999 | Gheewala |
| 5,900,340 A | 5/1999 | Reich et al. |
| 5,905,287 A | 5/1999 | Hirata |
| 5,908,827 A | 6/1999 | Sirna |
| 5,915,199 A | 6/1999 | Hsu |
| 5,917,207 A | 6/1999 | Colwell et al. |
| 5,920,486 A | 7/1999 | Beahm et al. |
| 5,923,059 A | 7/1999 | Gheewala |
| 5,923,060 A | 7/1999 | Gheewala |
| 5,929,469 A | 7/1999 | Mimoto et al. |
| 5,930,163 A | 7/1999 | Hara et al. |
| 5,935,763 A | 8/1999 | Caterer et al. |
| 5,949,101 A | 9/1999 | Aritome |
| 5,973,507 A | 10/1999 | Yamazaki |
| 5,977,305 A | 11/1999 | Wigler et al. |
| 5,977,574 A | 11/1999 | Schmitt et al. |
| 5,998,879 A | 12/1999 | Iwaki et al. |
| 6,009,251 A | 12/1999 | Ho et al. |
| 6,026,223 A | 2/2000 | Scepanovic et al. |
| 6,037,613 A | 3/2000 | Mariyama |
| 6,037,617 A | 3/2000 | Kumagai |
| 6,044,007 A | 3/2000 | Capodieci |
| 6,054,872 A | 4/2000 | Fudanuki et al. |
| 6,063,132 A | 5/2000 | DeCamp et al. |
| 6,077,310 A | 6/2000 | Yamamoto et al. |
| 6,080,206 A | 6/2000 | Tadokoro et al. |
| 6,084,255 A | 7/2000 | Ueda |
| 6,084,437 A | 7/2000 | Sako |
| 6,091,845 A | 7/2000 | Pierrat et al. |
| 6,099,584 A | 8/2000 | Arnold et al. |
| 6,100,025 A | 8/2000 | Wigler et al. |
| 6,114,071 A | 9/2000 | Chen et al. |
| 6,144,227 A | 11/2000 | Sato |
| 6,159,839 A | 12/2000 | Jeng et al. |
| 6,166,415 A | 12/2000 | Sakemi et al. |
| 6,166,560 A | 12/2000 | Ogura et al. |
| 6,174,742 B1 | 1/2001 | Sudhindranath et al. |
| 6,182,272 B1 | 1/2001 | Andreev et al. |
| 6,194,104 B1 | 2/2001 | Hsu |
| 6,194,252 B1 | 2/2001 | Yamaguchi |
| 6,194,912 B1 | 2/2001 | Or-Bach |
| 6,209,123 B1 | 3/2001 | Maziasz et al. |
| 6,230,299 B1 | 5/2001 | McSherry et al. |
| 6,232,173 B1 | 5/2001 | Hsu et al. |
| 6,240,542 B1 | 5/2001 | Kapur |
| 6,249,902 B1 | 6/2001 | Igusa et al. |
| 6,255,600 B1 | 7/2001 | Schaper |
| 6,255,845 B1 | 7/2001 | Wong et al. |
| 6,262,487 B1 | 7/2001 | Igarashi et al. |
| 6,269,472 B1 | 7/2001 | Garza et al. |
| 6,275,973 B1 | 8/2001 | Wein |
| 6,282,696 B1 | 8/2001 | Garza et al. |
| 6,291,276 B1 | 9/2001 | Gonzalez |
| 6,297,668 B1 | 10/2001 | Schober |
| 6,297,674 B1 | 10/2001 | Kono et al. |
| 6,303,252 B1 | 10/2001 | Lin |
| 6,331,733 B1 | 12/2001 | Or-Bach et al. |
| 6,331,791 B1 | 12/2001 | Huang |
| 6,335,250 B1 | 1/2002 | Egi |
| 6,338,972 B1 | 1/2002 | Sudhindranath et al. |
| 6,347,062 B2 | 2/2002 | Nii et al. |
| 6,356,112 B1 | 3/2002 | Tran et al. |
| 6,359,804 B2 | 3/2002 | Kuriyama et al. |
| 6,370,679 B1 | 4/2002 | Chang et al. |
| 6,378,110 B1 | 4/2002 | Ho |
| 6,380,592 B2 | 4/2002 | Tooher et al. |
| 6,388,296 B1 | 5/2002 | Hsu |
| 6,393,601 B1 | 5/2002 | Tanaka et al. |
| 6,399,972 B1 | 6/2002 | Masuda et al. |
| 6,400,183 B2 | 6/2002 | Yamashita et al. |
| 6,408,427 B1 | 6/2002 | Cong et al. |
| 6,415,421 B2 | 7/2002 | Anderson et al. |
| 6,416,907 B1 | 7/2002 | Winder et al. |
| 6,417,549 B1 | 7/2002 | Oh |
| 6,421,820 B1 | 7/2002 | Mansfield et al. |
| 6,425,112 B1 | 7/2002 | Bula et al. |
| 6,425,117 B1 | 7/2002 | Pasch et al. |
| 6,426,269 B1 | 7/2002 | Haffner et al. |
| 6,436,805 B1 | 8/2002 | Trivedi |
| 6,445,049 B1 | 9/2002 | Iranmanesh |
| 6,445,065 B1 | 9/2002 | Gheewala et al. |
| 6,467,072 B1 | 10/2002 | Yang et al. |
| 6,469,328 B2 | 10/2002 | Yanai et al. |
| 6,470,489 B1 | 10/2002 | Chang et al. |
| 6,476,493 B2 | 11/2002 | Or-Bach et al. |

(56) References Cited

U.S. PATENT DOCUMENTS

| | | |
|---|---|---|
| 6,477,695 B1 | 11/2002 | Gandhi |
| 6,480,032 B1 | 11/2002 | Aksamit |
| 6,480,989 B2 | 11/2002 | Chan et al. |
| 6,492,066 B1 | 12/2002 | Capodieci et al. |
| 6,496,965 B1 | 12/2002 | van Ginneken et al. |
| 6,504,186 B2 | 1/2003 | Kanamoto et al. |
| 6,505,327 B2 | 1/2003 | Lin |
| 6,505,328 B1 | 1/2003 | van Ginneken et al. |
| 6,507,941 B1 | 1/2003 | Leung et al. |
| 6,509,952 B1 | 1/2003 | Govil et al. |
| 6,514,849 B1 | 2/2003 | Hui et al. |
| 6,516,459 B1 | 2/2003 | Sahouria |
| 6,523,156 B2 | 2/2003 | Cirit |
| 6,525,350 B1 | 2/2003 | Kinoshita et al. |
| 6,536,028 B1 | 3/2003 | Katsioulas et al. |
| 6,543,039 B1 | 4/2003 | Watanabe |
| 6,553,544 B2 | 4/2003 | Tanaka et al. |
| 6,553,559 B2 | 4/2003 | Liebmann et al. |
| 6,553,562 B2 | 4/2003 | Capodieci et al. |
| 6,566,720 B2 | 5/2003 | Aldrich |
| 6,570,234 B1 | 5/2003 | Gardner |
| 6,571,140 B1 | 5/2003 | Wewalaarachchi |
| 6,571,379 B2 | 5/2003 | Takayama |
| 6,574,786 B1 | 6/2003 | Pohlenz et al. |
| 6,578,190 B2 | 6/2003 | Ferguson et al. |
| 6,583,041 B1 | 6/2003 | Capodieci |
| 6,588,005 B1 | 7/2003 | Kobayashi et al. |
| 6,590,289 B2 | 7/2003 | Shively |
| 6,591,207 B2 | 7/2003 | Naya et al. |
| 6,609,235 B2 | 8/2003 | Ramaswamy et al. |
| 6,610,607 B1 | 8/2003 | Armbrust et al. |
| 6,617,621 B1 | 9/2003 | Gheewala et al. |
| 6,620,561 B2 | 9/2003 | Winder et al. |
| 6,621,132 B2 | 9/2003 | Onishi et al. |
| 6,632,741 B1 | 10/2003 | Clevenger et al. |
| 6,633,182 B2 | 10/2003 | Pileggi et al. |
| 6,635,935 B2 | 10/2003 | Makino |
| 6,642,744 B2 | 11/2003 | Or-Bach et al. |
| 6,643,831 B2 | 11/2003 | Chang et al. |
| 6,650,014 B2 | 11/2003 | Kariyazaki |
| 6,661,041 B2 | 12/2003 | Keeth |
| 6,662,350 B2 | 12/2003 | Fried et al. |
| 6,664,587 B2 | 12/2003 | Guterman et al. |
| 6,673,638 B1 | 1/2004 | Bendik et al. |
| 6,677,649 B2 | 1/2004 | Minami et al. |
| 6,687,895 B2 | 2/2004 | Zhang |
| 6,690,206 B2 | 2/2004 | Rikino et al. |
| 6,691,297 B1 | 2/2004 | Misaka et al. |
| 6,700,405 B1 | 3/2004 | Hirairi |
| 6,703,170 B1 | 3/2004 | Pindo |
| 6,709,880 B2 | 3/2004 | Yamamoto et al. |
| 6,714,903 B1 | 3/2004 | Chu et al. |
| 6,732,334 B2 | 5/2004 | Nakatsuka |
| 6,732,338 B2 | 5/2004 | Crouse et al. |
| 6,732,344 B2 | 5/2004 | Sakamoto et al. |
| 6,734,506 B2 | 5/2004 | Oyamatsu |
| 6,737,199 B1 | 5/2004 | Hsieh |
| 6,737,318 B2 | 5/2004 | Murata et al. |
| 6,737,347 B1 | 5/2004 | Houston et al. |
| 6,745,372 B2 | 6/2004 | Cote et al. |
| 6,745,380 B2 | 6/2004 | Bodendorf et al. |
| 6,749,972 B2 | 6/2004 | Yu |
| 6,750,555 B2 | 6/2004 | Satomi et al. |
| 6,760,269 B2 | 7/2004 | Nakase et al. |
| 6,765,245 B2 | 7/2004 | Bansal |
| 6,777,138 B2 | 8/2004 | Pierrat et al. |
| 6,777,146 B1 | 8/2004 | Samuels |
| 6,787,823 B2 | 9/2004 | Shibutani |
| 6,789,244 B1 | 9/2004 | Dasasathyan et al. |
| 6,789,246 B1 | 9/2004 | Mohan et al. |
| 6,792,591 B2 | 9/2004 | Shi et al. |
| 6,792,593 B2 | 9/2004 | Takashima et al. |
| 6,794,677 B2 | 9/2004 | Tamaki et al. |
| 6,794,914 B2 | 9/2004 | Sani et al. |
| 6,795,332 B2 | 9/2004 | Yamaoka et al. |
| 6,795,358 B2 | 9/2004 | Tanaka et al. |
| 6,795,952 B1 | 9/2004 | Stine et al. |
| 6,795,953 B2 | 9/2004 | Bakarian et al. |
| 6,800,883 B2 | 10/2004 | Furuya et al. |
| 6,807,663 B2 | 10/2004 | Cote et al. |
| 6,809,399 B2 | 10/2004 | Ikeda et al. |
| 6,812,574 B2 | 11/2004 | Tomita et al. |
| 6,818,389 B2 | 11/2004 | Fritze et al. |
| 6,818,929 B2 | 11/2004 | Tsutsumi et al. |
| 6,819,136 B2 | 11/2004 | Or-Bach |
| 6,820,248 B1 | 11/2004 | Gan, II |
| 6,826,738 B2 | 11/2004 | Cadouri |
| 6,834,375 B1 | 12/2004 | Stine et al. |
| 6,841,880 B2 | 1/2005 | Matsumoto et al. |
| 6,850,854 B2 | 2/2005 | Naya et al. |
| 6,854,096 B2 | 2/2005 | Eaton et al. |
| 6,854,100 B1 | 2/2005 | Chuang et al. |
| 6,867,073 B1 | 3/2005 | Enquist |
| 6,871,338 B2 | 3/2005 | Yamauchi |
| 6,872,990 B1 | 3/2005 | Kang |
| 6,877,144 B1 | 4/2005 | Rittman et al. |
| 6,881,523 B2 | 4/2005 | Smith |
| 6,884,712 B2 | 4/2005 | Yelehanka et al. |
| 6,885,045 B2 | 4/2005 | Hidaka |
| 6,889,370 B1 | 5/2005 | Kerzman et al. |
| 6,897,517 B2 | 5/2005 | Houdt et al. |
| 6,897,536 B2 | 5/2005 | Nomura et al. |
| 6,898,770 B2 | 5/2005 | Boluki et al. |
| 6,904,582 B1 | 6/2005 | Rittman et al. |
| 6,918,104 B2 | 7/2005 | Pierrat et al. |
| 6,920,079 B2 | 7/2005 | Shibayama |
| 6,921,982 B2 | 7/2005 | Joshi et al. |
| 6,922,354 B2 | 7/2005 | Ishikura et al. |
| 6,924,560 B2 | 8/2005 | Wang et al. |
| 6,928,635 B2 | 8/2005 | Pramanik et al. |
| 6,931,617 B2 | 8/2005 | Sanie et al. |
| 6,953,956 B2 | 10/2005 | Or-Bach et al. |
| 6,954,918 B2 | 10/2005 | Houston |
| 6,957,402 B2 | 10/2005 | Templeton et al. |
| 6,968,527 B2 | 11/2005 | Pierrat |
| 6,974,978 B1 | 12/2005 | Possley |
| 6,977,856 B2 | 12/2005 | Tanaka et al. |
| 6,978,436 B2 | 12/2005 | Cote et al. |
| 6,978,437 B1 | 12/2005 | Rittman et al. |
| 6,980,211 B2 | 12/2005 | Lin et al. |
| 6,992,394 B2 | 1/2006 | Park |
| 6,992,925 B2 | 1/2006 | Peng |
| 6,993,741 B2 | 1/2006 | Liebmann et al. |
| 6,994,939 B1 | 2/2006 | Ghandehari et al. |
| 6,998,722 B2 | 2/2006 | Madurawe |
| 7,003,068 B2 | 2/2006 | Kushner et al. |
| 7,009,862 B2 | 3/2006 | Higeta et al. |
| 7,016,214 B2 | 3/2006 | Kawamata |
| 7,022,559 B2 | 4/2006 | Barnak et al. |
| 7,028,285 B2 | 4/2006 | Cote et al. |
| 7,041,568 B2 | 5/2006 | Goldbach et al. |
| 7,052,972 B2 | 5/2006 | Sandhu et al. |
| 7,053,424 B2 | 5/2006 | Ono |
| 7,063,920 B2 | 6/2006 | Baba-Ali |
| 7,064,068 B2 | 6/2006 | Chou et al. |
| 7,065,731 B2 | 6/2006 | Jacques et al. |
| 7,079,413 B2 | 7/2006 | Tsukamoto et al. |
| 7,079,989 B2 | 7/2006 | Wimer |
| 7,093,208 B2 | 8/2006 | Williams et al. |
| 7,093,228 B2 | 8/2006 | Andreev et al. |
| 7,103,870 B2 | 9/2006 | Misaka et al. |
| 7,105,871 B2 | 9/2006 | Or-Bach et al. |
| 7,107,551 B1 | 9/2006 | de Dood et al. |
| 7,115,343 B2 | 10/2006 | Gordon et al. |
| 7,115,920 B2 | 10/2006 | Bernstein et al. |
| 7,120,882 B2 | 10/2006 | Kotani et al. |
| 7,124,386 B2 | 10/2006 | Smith et al. |
| 7,126,837 B1 | 10/2006 | Banachowicz et al. |
| 7,132,203 B2 | 11/2006 | Pierrat |
| 7,137,092 B2 | 11/2006 | Maeda |
| 7,141,853 B2 | 11/2006 | Campbell et al. |
| 7,143,380 B1 | 11/2006 | Anderson et al. |
| 7,149,999 B2 | 12/2006 | Kahng et al. |
| 7,152,215 B2 | 12/2006 | Smith et al. |

(56) References Cited

U.S. PATENT DOCUMENTS

| | | | |
|---|---|---|---|
| 7,155,685 B2 | 12/2006 | Mori et al. |
| 7,155,689 B2 | 12/2006 | Pierrat et al. |
| 7,159,197 B2 | 1/2007 | Falbo et al. |
| 7,174,520 B2 | 2/2007 | White et al. |
| 7,175,940 B2 | 2/2007 | Laidig et al. |
| 7,176,508 B2 | 2/2007 | Joshi et al. |
| 7,177,215 B2 | 2/2007 | Tanaka et al. |
| 7,183,611 B2 | 2/2007 | Bhattacharyya |
| 7,185,294 B2 | 2/2007 | Zhang |
| 7,188,322 B2 | 3/2007 | Cohn et al. |
| 7,194,712 B2 | 3/2007 | Wu |
| 7,200,835 B2 | 4/2007 | Zhang et al. |
| 7,202,517 B2 | 4/2007 | Dixit et al. |
| 7,205,191 B2 | 4/2007 | Kobayashi |
| 7,208,794 B2 | 4/2007 | Hofmann et al. |
| 7,214,579 B2 | 5/2007 | Widdershoven et al. |
| 7,219,326 B2 | 5/2007 | Reed et al. |
| 7,221,031 B2 | 5/2007 | Ryoo et al. |
| 7,225,423 B2 | 5/2007 | Bhattacharya et al. |
| 7,227,183 B2 | 6/2007 | Donze et al. |
| 7,228,510 B2 | 6/2007 | Ono |
| 7,231,628 B2 | 6/2007 | Pack et al. |
| 7,235,424 B2 | 6/2007 | Chen et al. |
| 7,243,316 B2 | 7/2007 | White et al. |
| 7,252,909 B2 | 8/2007 | Shin et al. |
| 7,257,017 B2 | 8/2007 | Liaw |
| 7,264,990 B2 | 9/2007 | Rueckes et al. |
| 7,266,787 B2 | 9/2007 | Hughes et al. |
| 7,269,803 B2 | 9/2007 | Khakzadi et al. |
| 7,278,118 B2 | 10/2007 | Pileggi et al. |
| 7,279,727 B2 | 10/2007 | Ikoma et al. |
| 7,287,320 B2 | 10/2007 | Wang et al. |
| 7,294,534 B2 | 11/2007 | Iwaki |
| 7,302,651 B2 | 11/2007 | Allen et al. |
| 7,308,669 B2 | 12/2007 | Buehler et al. |
| 7,312,003 B2 | 12/2007 | Cote et al. |
| 7,315,994 B2 | 1/2008 | Aller et al. |
| 7,327,591 B2 | 2/2008 | Sadra et al. |
| 7,329,938 B2 | 2/2008 | Kinoshita |
| 7,335,966 B2 | 2/2008 | Ihme et al. |
| 7,337,421 B2 | 2/2008 | Kamat |
| 7,338,896 B2 | 3/2008 | Vanhaelemeersch et al. |
| 7,345,909 B2 | 3/2008 | Chang et al. |
| 7,346,885 B2 | 3/2008 | Semmler |
| 7,350,183 B2 | 3/2008 | Cui et al. |
| 7,353,492 B2 | 4/2008 | Gupta et al. |
| 7,358,131 B2 | 4/2008 | Bhattacharyya |
| 7,360,179 B2 | 4/2008 | Smith et al. |
| 7,360,198 B2 | 4/2008 | Rana et al. |
| 7,366,997 B1 | 4/2008 | Rahmat et al. |
| 7,367,008 B2 | 4/2008 | White et al. |
| 7,376,931 B2 | 5/2008 | Kokubun |
| 7,383,521 B2 | 6/2008 | Smith et al. |
| 7,397,260 B2 | 7/2008 | Chanda et al. |
| 7,400,627 B2 | 7/2008 | Wu et al. |
| 7,402,848 B2 | 7/2008 | Chang et al. |
| 7,404,154 B1 | 7/2008 | Venkatraman et al. |
| 7,404,173 B2 | 7/2008 | Wu et al. |
| 7,411,252 B2 | 8/2008 | Anderson et al. |
| 7,421,678 B2 | 9/2008 | Barnes et al. |
| 7,423,298 B2 | 9/2008 | Mariyama et al. |
| 7,424,694 B2 | 9/2008 | Ikeda |
| 7,424,695 B2 | 9/2008 | Tamura et al. |
| 7,424,696 B2 | 9/2008 | Vogel et al. |
| 7,426,710 B2 | 9/2008 | Zhang et al. |
| 7,432,562 B2 | 10/2008 | Bhattacharyya |
| 7,434,185 B2 | 10/2008 | Dooling et al. |
| 7,441,211 B1 | 10/2008 | Gupta et al. |
| 7,442,630 B2 | 10/2008 | Kelberlau et al. |
| 7,444,609 B2 | 10/2008 | Charlebois et al. |
| 7,446,352 B2 | 11/2008 | Becker et al. |
| 7,449,371 B2 | 11/2008 | Kemerling et al. |
| 7,458,045 B2 | 11/2008 | Cote et al. |
| 7,459,792 B2 | 12/2008 | Chen |
| 7,465,973 B2 | 12/2008 | Chang et al. |
| 7,466,607 B2 | 12/2008 | Hollis et al. |
| 7,469,396 B2 | 12/2008 | Hayashi et al. |
| 7,480,880 B2 | 1/2009 | Visweswariah et al. |
| 7,480,891 B2 | 1/2009 | Sezginer |
| 7,484,197 B2 | 1/2009 | Allen et al. |
| 7,485,934 B2 | 2/2009 | Liaw |
| 7,487,475 B1 | 2/2009 | Kriplani et al. |
| 7,492,013 B2 | 2/2009 | Correale, Jr. |
| 7,500,211 B2 | 3/2009 | Komaki |
| 7,502,275 B2 | 3/2009 | Nii et al. |
| 7,503,026 B2 | 3/2009 | Ichiryu et al. |
| 7,504,184 B2 | 3/2009 | Hung et al. |
| 7,506,300 B2 | 3/2009 | Sezginer et al. |
| 7,508,238 B2 | 3/2009 | Yamagami |
| 7,509,621 B2 | 3/2009 | Melvin, III |
| 7,509,622 B2 | 3/2009 | Sinha et al. |
| 7,512,017 B2 | 3/2009 | Chang |
| 7,512,921 B2 | 3/2009 | Shibuya |
| 7,514,959 B2 | 4/2009 | Or-Bach et al. |
| 7,523,429 B2 | 4/2009 | Kroyan et al. |
| 7,527,900 B2 | 5/2009 | Zhou et al. |
| 7,538,368 B2 | 5/2009 | Yano |
| 7,543,262 B2 | 6/2009 | Wang et al. |
| 7,563,701 B2 | 7/2009 | Chang et al. |
| 7,564,134 B2 | 7/2009 | Lee et al. |
| 7,568,174 B2 | 7/2009 | Sezginer et al. |
| 7,569,309 B2 | 8/2009 | Blatchford et al. |
| 7,569,310 B2 | 8/2009 | Wallace et al. |
| 7,569,894 B2 | 8/2009 | Suzuki |
| 7,575,973 B2 | 8/2009 | Mokhlesi et al. |
| 7,598,541 B2 | 10/2009 | Okamoto et al. |
| 7,598,558 B2 | 10/2009 | Hashimoto et al. |
| 7,614,030 B2 | 11/2009 | Hsu |
| 7,625,790 B2 | 12/2009 | Yang |
| 7,632,610 B2 | 12/2009 | Wallace et al. |
| 7,640,522 B2 | 12/2009 | Gupta et al. |
| 7,646,651 B2 | 1/2010 | Lee et al. |
| 7,653,884 B2 | 1/2010 | Furnish et al. |
| 7,665,051 B2 | 2/2010 | Ludwig et al. |
| 7,700,466 B2 | 4/2010 | Booth et al. |
| 7,712,056 B2 | 5/2010 | White et al. |
| 7,739,627 B2 | 6/2010 | Chew et al. |
| 7,749,662 B2 | 7/2010 | Matthew et al. |
| 7,755,110 B2 | 7/2010 | Gliese et al. |
| 7,770,144 B2 | 8/2010 | Dellinger |
| 7,791,109 B2 | 9/2010 | Wann et al. |
| 7,802,219 B2 | 9/2010 | Tomar et al. |
| 7,825,437 B2 | 11/2010 | Pillarisetty et al. |
| 7,842,975 B2 | 11/2010 | Becker et al. |
| 7,873,929 B2 | 1/2011 | Kahng et al. |
| 7,882,456 B2 | 2/2011 | Zach |
| 7,888,705 B2 | 2/2011 | Becker et al. |
| 7,898,040 B2 | 3/2011 | Nawaz |
| 7,906,801 B2 | 3/2011 | Becker et al. |
| 7,908,578 B2 | 3/2011 | Becker et al. |
| 7,910,958 B2 | 3/2011 | Becker et al. |
| 7,910,959 B2 | 3/2011 | Becker et al. |
| 7,917,877 B2 | 3/2011 | Singh et al. |
| 7,917,879 B2 | 3/2011 | Becker et al. |
| 7,923,266 B2 | 4/2011 | Thijs et al. |
| 7,923,337 B2 | 4/2011 | Chang et al. |
| 7,923,757 B2 | 4/2011 | Becker et al. |
| 7,932,544 B2 | 4/2011 | Becker et al. |
| 7,932,545 B2 | 4/2011 | Becker et al. |
| 7,934,184 B2 | 4/2011 | Zhang |
| 7,939,443 B2 | 5/2011 | Fox et al. |
| 7,943,966 B2 | 5/2011 | Becker et al. |
| 7,943,967 B2 | 5/2011 | Becker et al. |
| 7,948,012 B2 | 5/2011 | Becker et al. |
| 7,948,013 B2 | 5/2011 | Becker et al. |
| 7,952,119 B2 | 5/2011 | Becker et al. |
| 7,956,421 B2 | 6/2011 | Becker |
| 7,958,465 B2 | 6/2011 | Lu et al. |
| 7,962,867 B2 | 6/2011 | White et al. |
| 7,962,879 B2 | 6/2011 | Tang et al. |
| 7,964,267 B1 | 6/2011 | Lyons et al. |
| 7,971,160 B2 | 6/2011 | Osawa et al. |
| 7,989,847 B2 | 8/2011 | Becker et al. |
| 7,989,848 B2 | 8/2011 | Becker et al. |

(56) References Cited

U.S. PATENT DOCUMENTS

| | | |
|---|---|---|
| 7,992,122 B1 | 8/2011 | Burstein et al. |
| 7,994,583 B2 | 8/2011 | Inaba |
| 8,004,042 B2 | 8/2011 | Yang et al. |
| 8,022,441 B2 | 9/2011 | Becker et al. |
| 8,030,689 B2 | 10/2011 | Becker et al. |
| 8,035,133 B2 | 10/2011 | Becker et al. |
| 8,044,437 B1 | 10/2011 | Venkatraman et al. |
| 8,058,671 B2 | 11/2011 | Becker et al. |
| 8,058,690 B2 | 11/2011 | Chang |
| 8,072,003 B2 | 12/2011 | Becker et al. |
| 8,072,053 B2 | 12/2011 | Li |
| 8,088,679 B2 | 1/2012 | Becker et al. |
| 8,088,680 B2 | 1/2012 | Becker et al. |
| 8,088,681 B2 | 1/2012 | Becker et al. |
| 8,088,682 B2 | 1/2012 | Becker et al. |
| 8,089,098 B2 | 1/2012 | Becker et al. |
| 8,089,099 B2 | 1/2012 | Becker et al. |
| 8,089,100 B2 | 1/2012 | Becker et al. |
| 8,089,101 B2 | 1/2012 | Becker et al. |
| 8,089,102 B2 | 1/2012 | Becker et al. |
| 8,089,103 B2 | 1/2012 | Becker et al. |
| 8,089,104 B2 | 1/2012 | Becker et al. |
| 8,101,975 B2 | 1/2012 | Becker et al. |
| 8,110,854 B2 | 2/2012 | Becker et al. |
| 8,129,750 B2 | 3/2012 | Becker et al. |
| 8,129,751 B2 | 3/2012 | Becker et al. |
| 8,129,752 B2 | 3/2012 | Becker et al. |
| 8,129,754 B2 | 3/2012 | Becker et al. |
| 8,129,755 B2 | 3/2012 | Becker et al. |
| 8,129,756 B2 | 3/2012 | Becker et al. |
| 8,129,757 B2 | 3/2012 | Becker et al. |
| 8,129,819 B2 | 3/2012 | Becker et al. |
| 8,130,529 B2 | 3/2012 | Tanaka |
| 8,134,183 B2 | 3/2012 | Becker et al. |
| 8,134,184 B2 | 3/2012 | Becker et al. |
| 8,134,185 B2 | 3/2012 | Becker et al. |
| 8,134,186 B2 | 3/2012 | Becker et al. |
| 8,138,525 B2 | 3/2012 | Becker et al. |
| 8,161,427 B2 | 4/2012 | Morgenshtein et al. |
| 8,178,905 B2 | 5/2012 | Toubou |
| 8,178,909 B2 | 5/2012 | Venkatraman et al. |
| 8,198,656 B2 | 6/2012 | Becker et al. |
| 8,207,053 B2 | 6/2012 | Becker et al. |
| 8,214,778 B2 | 7/2012 | Quandt et al. |
| 8,217,428 B2 | 7/2012 | Becker et al. |
| 8,225,239 B2 | 7/2012 | Reed et al. |
| 8,225,261 B2 | 7/2012 | Hong et al. |
| 8,245,180 B2 | 8/2012 | Smayling et al. |
| 8,247,846 B2 | 8/2012 | Becker |
| 8,253,172 B2 | 8/2012 | Becker et al. |
| 8,253,173 B2 | 8/2012 | Becker et al. |
| 8,258,547 B2 | 9/2012 | Becker et al. |
| 8,258,548 B2 | 9/2012 | Becker et al. |
| 8,258,549 B2 | 9/2012 | Becker et al. |
| 8,258,550 B2 | 9/2012 | Becker et al. |
| 8,258,551 B2 | 9/2012 | Becker et al. |
| 8,258,552 B2 | 9/2012 | Becker et al. |
| 8,264,007 B2 | 9/2012 | Becker et al. |
| 8,264,008 B2 | 9/2012 | Becker et al. |
| 8,264,009 B2 | 9/2012 | Becker et al. |
| 8,283,701 B2 | 10/2012 | Becker et al. |
| 8,294,212 B2 | 10/2012 | Wang et al. |
| 8,316,327 B2 | 11/2012 | Herold |
| 8,356,268 B2 | 1/2013 | Becker et al. |
| 8,378,407 B2 | 2/2013 | Audzeyeu et al. |
| 8,395,224 B2 | 3/2013 | Becker et al. |
| 8,402,397 B2 | 3/2013 | Robles et al. |
| 8,405,163 B2 | 3/2013 | Becker et al. |
| 8,422,274 B2 | 4/2013 | Tomita et al. |
| 8,436,400 B2 | 5/2013 | Becker et al. |
| 8,453,094 B2 | 5/2013 | Kornachuk et al. |
| 8,575,706 B2 | 11/2013 | Becker et al. |
| 8,667,443 B2 | 3/2014 | Smayling et al. |
| 8,701,071 B2 | 4/2014 | Kornachuk et al. |
| 8,735,995 B2 | 5/2014 | Becker et al. |
| 8,756,551 B2 | 6/2014 | Becker et al. |
| 8,836,045 B2 | 9/2014 | Becker et al. |
| 8,839,162 B2 | 9/2014 | Amundson et al. |
| 8,839,175 B2 | 9/2014 | Smayling et al. |
| 8,847,329 B2 | 9/2014 | Becker et al. |
| 8,863,063 B2 | 10/2014 | Becker et al. |
| 2001/0049813 A1 | 12/2001 | Chan et al. |
| 2002/0003270 A1 | 1/2002 | Makino |
| 2002/0015899 A1 | 2/2002 | Chen et al. |
| 2002/0030510 A1 | 3/2002 | Kono et al. |
| 2002/0063582 A1 | 5/2002 | Rikino |
| 2002/0068423 A1 | 6/2002 | Park et al. |
| 2002/0079927 A1 | 6/2002 | Katoh et al. |
| 2002/0149392 A1 | 10/2002 | Cho |
| 2002/0166107 A1 | 11/2002 | Capodieci et al. |
| 2002/0194575 A1 | 12/2002 | Allen et al. |
| 2003/0042930 A1 | 3/2003 | Pileggi et al. |
| 2003/0046653 A1 | 3/2003 | Liu |
| 2003/0061592 A1 | 3/2003 | Agrawal et al. |
| 2003/0088839 A1 | 5/2003 | Watanabe |
| 2003/0088842 A1 | 5/2003 | Cirit |
| 2003/0103176 A1 | 6/2003 | Abe et al. |
| 2003/0106037 A1 | 6/2003 | Moniwa et al. |
| 2003/0117168 A1 | 6/2003 | Uneme et al. |
| 2003/0124847 A1 | 7/2003 | Houston et al. |
| 2003/0125917 A1 | 7/2003 | Rich et al. |
| 2003/0126569 A1 | 7/2003 | Rich et al. |
| 2003/0145288 A1 | 7/2003 | Wang et al. |
| 2003/0145299 A1 | 7/2003 | Fried et al. |
| 2003/0177465 A1 | 9/2003 | MacLean et al. |
| 2003/0185076 A1 | 10/2003 | Worley |
| 2003/0203287 A1 | 10/2003 | Miyagawa |
| 2003/0229868 A1 | 12/2003 | White et al. |
| 2003/0229875 A1 | 12/2003 | Smith et al. |
| 2004/0029372 A1 | 2/2004 | Jang et al. |
| 2004/0049754 A1 | 3/2004 | Liao et al. |
| 2004/0063038 A1 | 4/2004 | Shin et al. |
| 2004/0115539 A1 | 6/2004 | Broeke et al. |
| 2004/0139412 A1 | 7/2004 | Ito et al. |
| 2004/0145028 A1 | 7/2004 | Matsumoto et al. |
| 2004/0153979 A1 | 8/2004 | Chang |
| 2004/0161878 A1 | 8/2004 | Or-Bach et al. |
| 2004/0164360 A1 | 8/2004 | Nishida et al. |
| 2004/0169201 A1 | 9/2004 | Hidaka |
| 2004/0194050 A1 | 9/2004 | Hwang et al. |
| 2004/0196705 A1 | 10/2004 | Ishikura et al. |
| 2004/0229135 A1 | 11/2004 | Wang et al. |
| 2004/0232444 A1 | 11/2004 | Shimizu |
| 2004/0243966 A1 | 12/2004 | Dellinger |
| 2004/0262640 A1 | 12/2004 | Suga |
| 2005/0009312 A1 | 1/2005 | Butt et al. |
| 2005/0009344 A1 | 1/2005 | Hwang et al. |
| 2005/0012157 A1 | 1/2005 | Cho et al. |
| 2005/0044522 A1 | 2/2005 | Maeda |
| 2005/0055828 A1 | 3/2005 | Wang et al. |
| 2005/0076320 A1 | 4/2005 | Maeda |
| 2005/0087806 A1 | 4/2005 | Hokazono |
| 2005/0093147 A1 | 5/2005 | Tu |
| 2005/0101112 A1 | 5/2005 | Rueckes et al. |
| 2005/0110130 A1 | 5/2005 | Kitabayashi et al. |
| 2005/0135134 A1 | 6/2005 | Yen |
| 2005/0136340 A1 | 6/2005 | Baselmans et al. |
| 2005/0138598 A1 | 6/2005 | Kokubun |
| 2005/0156200 A1 | 7/2005 | Kinoshita |
| 2005/0185325 A1 | 8/2005 | Hur |
| 2005/0189604 A1 | 9/2005 | Gupta et al. |
| 2005/0189614 A1 | 9/2005 | Ihme et al. |
| 2005/0196685 A1 | 9/2005 | Wang et al. |
| 2005/0205894 A1 | 9/2005 | Sumikawa et al. |
| 2005/0212018 A1 | 9/2005 | Schoellkopf et al. |
| 2005/0224982 A1 | 10/2005 | Kemerling et al. |
| 2005/0229130 A1 | 10/2005 | Wu et al. |
| 2005/0251771 A1 | 11/2005 | Robles |
| 2005/0264320 A1 | 12/2005 | Chan et al. |
| 2005/0264324 A1 | 12/2005 | Nakazato |
| 2005/0266621 A1 | 12/2005 | Kim |
| 2005/0268256 A1 | 12/2005 | Tsai et al. |
| 2005/0278673 A1 | 12/2005 | Kawachi |
| 2005/0280031 A1 | 12/2005 | Yano |

(56) References Cited

U.S. PATENT DOCUMENTS

| | | |
|---|---|---|
| 2006/0038234 A1 | 2/2006 | Liaw |
| 2006/0063334 A1 | 3/2006 | Donze et al. |
| 2006/0070018 A1 | 3/2006 | Semmler |
| 2006/0084261 A1 | 4/2006 | Iwaki |
| 2006/0091550 A1 | 5/2006 | Shimazaki et al. |
| 2006/0095872 A1 | 5/2006 | McElvain |
| 2006/0101370 A1 | 5/2006 | Cui et al. |
| 2006/0112355 A1 | 5/2006 | Pileggi et al. |
| 2006/0113533 A1 | 6/2006 | Tamaki et al. |
| 2006/0113567 A1 | 6/2006 | Ohmori et al. |
| 2006/0120143 A1 | 6/2006 | Liaw |
| 2006/0121715 A1 | 6/2006 | Chang et al. |
| 2006/0123376 A1 | 6/2006 | Vogel et al. |
| 2006/0125024 A1 | 6/2006 | Ishigaki |
| 2006/0131609 A1 | 6/2006 | Kinoshita et al. |
| 2006/0136848 A1 | 6/2006 | Ichiryu et al. |
| 2006/0146638 A1 | 7/2006 | Chang et al. |
| 2006/0151810 A1 | 7/2006 | Ohshige |
| 2006/0158270 A1 | 7/2006 | Gibet et al. |
| 2006/0177744 A1 | 8/2006 | Bodendorf et al. |
| 2006/0181310 A1 | 8/2006 | Rhee |
| 2006/0195809 A1 | 8/2006 | Cohn et al. |
| 2006/0195810 A1 | 8/2006 | Morton |
| 2006/0197557 A1 | 9/2006 | Chung |
| 2006/0206854 A1 | 9/2006 | Barnes et al. |
| 2006/0223302 A1 | 10/2006 | Chang et al. |
| 2006/0248495 A1 | 11/2006 | Sezginer |
| 2007/0001304 A1 | 1/2007 | Liaw |
| 2007/0002617 A1 | 1/2007 | Houston |
| 2007/0007574 A1 | 1/2007 | Ohsawa |
| 2007/0038973 A1 | 2/2007 | Li et al. |
| 2007/0074145 A1 | 3/2007 | Tanaka |
| 2007/0094634 A1 | 4/2007 | Seizginer et al. |
| 2007/0101305 A1 | 5/2007 | Smith et al. |
| 2007/0105023 A1 | 5/2007 | Zhou et al. |
| 2007/0106971 A1 | 5/2007 | Lien et al. |
| 2007/0113216 A1 | 5/2007 | Zhang |
| 2007/0172770 A1 | 7/2007 | Witters et al. |
| 2007/0186196 A1 | 8/2007 | Tanaka |
| 2007/0196958 A1 | 8/2007 | Bhattacharya et al. |
| 2007/0209029 A1 | 9/2007 | Ivonin et al. |
| 2007/0210391 A1 | 9/2007 | Becker et al. |
| 2007/0234252 A1 | 10/2007 | Visweswariah et al. |
| 2007/0234262 A1 | 10/2007 | Uedi et al. |
| 2007/0241810 A1 | 10/2007 | Onda |
| 2007/0256039 A1 | 11/2007 | White |
| 2007/0257277 A1 | 11/2007 | Takeda et al. |
| 2007/0274140 A1 | 11/2007 | Joshi et al. |
| 2007/0277129 A1 | 11/2007 | Allen et al. |
| 2007/0288882 A1 | 12/2007 | Kniffin et al. |
| 2007/0290361 A1 | 12/2007 | Chen |
| 2007/0294652 A1 | 12/2007 | Bowen |
| 2007/0297249 A1 | 12/2007 | Chang et al. |
| 2008/0001176 A1 | 1/2008 | Gopalakrishnan |
| 2008/0005712 A1 | 1/2008 | Charlebois et al. |
| 2008/0021689 A1 | 1/2008 | Yamashita et al. |
| 2008/0022247 A1 | 1/2008 | Kojima et al. |
| 2008/0046846 A1 | 2/2008 | Chew et al. |
| 2008/0081472 A1 | 4/2008 | Tanaka |
| 2008/0082952 A1 | 4/2008 | O'Brien |
| 2008/0086712 A1 | 4/2008 | Fujimoto |
| 2008/0097641 A1 | 4/2008 | Miyashita et al. |
| 2008/0098334 A1 | 4/2008 | Pileggi et al. |
| 2008/0098341 A1* | 4/2008 | Kobayashi et al. ............... 716/9 |
| 2008/0099795 A1 | 5/2008 | Bernstein et al. |
| 2008/0127000 A1 | 5/2008 | Majumder et al. |
| 2008/0127029 A1 | 5/2008 | Graur et al. |
| 2008/0134128 A1 | 6/2008 | Blatchford et al. |
| 2008/0144361 A1 | 6/2008 | Wong |
| 2008/0148216 A1 | 6/2008 | Chan et al. |
| 2008/0163141 A1 | 7/2008 | Scheffer et al. |
| 2008/0168406 A1 | 7/2008 | Rahmat et al. |
| 2008/0211028 A1 | 9/2008 | Suzuki |
| 2008/0216207 A1 | 9/2008 | Tsai |
| 2008/0244494 A1 | 10/2008 | McCullen |
| 2008/0251779 A1 | 10/2008 | Kakoschke et al. |
| 2008/0265290 A1 | 10/2008 | Nielsen et al. |
| 2008/0276105 A1 | 11/2008 | Hoberman et al. |
| 2008/0283910 A1 | 11/2008 | Dreeskornfeld et al. |
| 2008/0285331 A1 | 11/2008 | Torok et al. |
| 2008/0308848 A1 | 12/2008 | Inaba |
| 2008/0308880 A1 | 12/2008 | Inaba |
| 2008/0315258 A1 | 12/2008 | Masuda et al. |
| 2009/0014811 A1 | 1/2009 | Becker et al. |
| 2009/0024974 A1 | 1/2009 | Yamada |
| 2009/0031261 A1 | 1/2009 | Smith et al. |
| 2009/0032898 A1 | 2/2009 | Becker et al. |
| 2009/0032967 A1 | 2/2009 | Becker et al. |
| 2009/0037864 A1 | 2/2009 | Becker et al. |
| 2009/0057780 A1 | 3/2009 | Wong et al. |
| 2009/0075485 A1 | 3/2009 | Ban et al. |
| 2009/0077524 A1 | 3/2009 | Nagamura |
| 2009/0085067 A1 | 4/2009 | Hayashi et al. |
| 2009/0087991 A1 | 4/2009 | Yatsuda et al. |
| 2009/0101940 A1 | 4/2009 | Barrows et al. |
| 2009/0106714 A1 | 4/2009 | Culp et al. |
| 2009/0155990 A1 | 6/2009 | Yanagidaira et al. |
| 2009/0181314 A1 | 7/2009 | Shyu et al. |
| 2009/0187871 A1 | 7/2009 | Cork |
| 2009/0206443 A1 | 8/2009 | Juengling |
| 2009/0224408 A1 | 9/2009 | Fox |
| 2009/0228853 A1 | 9/2009 | Hong et al. |
| 2009/0228857 A1 | 9/2009 | Kornachuk et al. |
| 2009/0273100 A1 | 11/2009 | Aton et al. |
| 2009/0280582 A1 | 11/2009 | Thijs et al. |
| 2009/0302372 A1 | 12/2009 | Chang et al. |
| 2009/0319977 A1 | 12/2009 | Saxena et al. |
| 2010/0001321 A1 | 1/2010 | Becker et al. |
| 2010/0006897 A1 | 1/2010 | Becker et al. |
| 2010/0006898 A1 | 1/2010 | Becker et al. |
| 2010/0006899 A1 | 1/2010 | Becker et al. |
| 2010/0006900 A1 | 1/2010 | Becker et al. |
| 2010/0006901 A1 | 1/2010 | Becker et al. |
| 2010/0006902 A1 | 1/2010 | Becker et al. |
| 2010/0006903 A1 | 1/2010 | Becker et al. |
| 2010/0006947 A1 | 1/2010 | Becker et al. |
| 2010/0006948 A1 | 1/2010 | Becker et al. |
| 2010/0006950 A1 | 1/2010 | Becker et al. |
| 2010/0006951 A1 | 1/2010 | Becker et al. |
| 2010/0006986 A1 | 1/2010 | Becker et al. |
| 2010/0011327 A1 | 1/2010 | Becker et al. |
| 2010/0011328 A1 | 1/2010 | Becker et al. |
| 2010/0011329 A1 | 1/2010 | Becker et al. |
| 2010/0011330 A1 | 1/2010 | Becker et al. |
| 2010/0011331 A1 | 1/2010 | Becker et al. |
| 2010/0011332 A1 | 1/2010 | Becker et al. |
| 2010/0011333 A1 | 1/2010 | Becker et al. |
| 2010/0012981 A1 | 1/2010 | Becker et al. |
| 2010/0012982 A1 | 1/2010 | Becker et al. |
| 2010/0012983 A1 | 1/2010 | Becker et al. |
| 2010/0012984 A1 | 1/2010 | Becker et al. |
| 2010/0012985 A1 | 1/2010 | Becker et al. |
| 2010/0012986 A1 | 1/2010 | Becker et al. |
| 2010/0017766 A1 | 1/2010 | Becker et al. |
| 2010/0017767 A1 | 1/2010 | Becker et al. |
| 2010/0017768 A1 | 1/2010 | Becker et al. |
| 2010/0017769 A1 | 1/2010 | Becker et al. |
| 2010/0017770 A1 | 1/2010 | Becker et al. |
| 2010/0017771 A1 | 1/2010 | Becker et al. |
| 2010/0017772 A1 | 1/2010 | Becker et al. |
| 2010/0019280 A1 | 1/2010 | Becker et al. |
| 2010/0019281 A1 | 1/2010 | Becker et al. |
| 2010/0019282 A1 | 1/2010 | Becker et al. |
| 2010/0019283 A1 | 1/2010 | Becker et al. |
| 2010/0019284 A1 | 1/2010 | Becker et al. |
| 2010/0019285 A1 | 1/2010 | Becker et al. |
| 2010/0019286 A1 | 1/2010 | Becker et al. |
| 2010/0019287 A1 | 1/2010 | Becker et al. |
| 2010/0019288 A1 | 1/2010 | Becker et al. |
| 2010/0019308 A1 | 1/2010 | Chan et al. |
| 2010/0023906 A1 | 1/2010 | Becker et al. |
| 2010/0023907 A1 | 1/2010 | Becker et al. |
| 2010/0023908 A1 | 1/2010 | Becker et al. |
| 2010/0023911 A1 | 1/2010 | Becker et al. |

(56) References Cited

U.S. PATENT DOCUMENTS

| | | | |
|---|---|---|---|
| 2010/0025731 A1 | 2/2010 | Becker et al. |
| 2010/0025732 A1 | 2/2010 | Becker et al. |
| 2010/0025733 A1 | 2/2010 | Becker et al. |
| 2010/0025734 A1 | 2/2010 | Becker et al. |
| 2010/0025735 A1 | 2/2010 | Becker et al. |
| 2010/0025736 A1 | 2/2010 | Becker et al. |
| 2010/0032722 A1 | 2/2010 | Becker et al. |
| 2010/0032723 A1 | 2/2010 | Becker et al. |
| 2010/0032724 A1 | 2/2010 | Becker et al. |
| 2010/0032726 A1 | 2/2010 | Becker et al. |
| 2010/0037194 A1 | 2/2010 | Becker et al. |
| 2010/0037195 A1 | 2/2010 | Becker et al. |
| 2010/0096671 A1 | 4/2010 | Becker et al. |
| 2010/0203689 A1 | 8/2010 | Bernstein et al. |
| 2010/0224943 A1 | 9/2010 | Kawasaki |
| 2010/0229140 A1 | 9/2010 | Strolenberg et al. |
| 2010/0232212 A1 | 9/2010 | Anderson et al. |
| 2010/0252865 A1 | 10/2010 | Van Der Zanden |
| 2010/0264468 A1 | 10/2010 | Xu |
| 2010/0270681 A1 | 10/2010 | Bird et al. |
| 2010/0287518 A1 | 11/2010 | Becker |
| 2011/0016909 A1 | 1/2011 | Mirza et al. |
| 2011/0108890 A1 | 5/2011 | Becker et al. |
| 2011/0108891 A1 | 5/2011 | Becker et al. |
| 2011/0154281 A1 | 6/2011 | Zach |
| 2011/0207298 A1 | 8/2011 | Anderson et al. |
| 2011/0260253 A1 | 10/2011 | Inaba |
| 2011/0298025 A1 | 12/2011 | Haensch et al. |
| 2011/0317477 A1 | 12/2011 | Liaw |
| 2012/0012932 A1 | 1/2012 | Perng et al. |
| 2012/0273841 A1 | 11/2012 | Quandt et al. |
| 2013/0097574 A1 | 4/2013 | Balabanov et al. |
| 2013/0200465 A1 | 8/2013 | Becker et al. |
| 2013/0200469 A1 | 8/2013 | Becker et al. |
| 2013/0207198 A1 | 8/2013 | Becker et al. |
| 2013/0207199 A1 | 8/2013 | Becker et al. |
| 2013/0254732 A1 | 9/2013 | Kornachuk et al. |
| 2014/0197543 A1 | 7/2014 | Kornachuk et al. |

FOREIGN PATENT DOCUMENTS

| | | |
|---|---|---|
| EP | 1394858 | 3/2004 |
| EP | 1670062 | 6/2006 |
| EP | 1833091 | 8/2007 |
| EP | 1730777 | 9/2007 |
| EP | 2251901 | 11/2010 |
| FR | 2860920 | 4/2005 |
| JP | 58-182242 | 10/1983 |
| JP | 61-182244 | 8/1986 |
| JP | S63-310136 A | 12/1988 |
| JP | H01284115 | 11/1989 |
| JP | 03-165061 | 7/1991 |
| JP | H05152937 A | 6/1993 |
| JP | H05211437 | 8/1993 |
| JP | H05218362 | 8/1993 |
| JP | H07-153927 A | 6/1995 |
| JP | 2684980 | 7/1995 |
| JP | 1995-302706 | 11/1995 |
| JP | 1997-09289251 A | 11/1997 |
| JP | 10-116911 | 5/1998 |
| JP | 1999-045948 | 2/1999 |
| JP | 2001-068558 | 3/2001 |
| JP | 2001-168707 | 6/2001 |
| JP | 2002-026125 | 1/2002 |
| JP | 2002-026296 A | 1/2002 |
| JP | 2002-184870 A | 6/2002 |
| JP | 2001-056463 | 9/2002 |
| JP | 2002-258463 | 9/2002 |
| JP | 2002-289703 | 10/2002 |
| JP | 2001-272228 | 3/2003 |
| JP | 2003-100872 | 4/2003 |
| JP | 2003-264231 | 9/2003 |
| JP | 2004-013920 | 1/2004 |
| JP | 2004-200300 | 7/2004 |
| JP | 2004-241529 | 8/2004 |
| JP | 2004-342757 A | 12/2004 |
| JP | 2005-020008 | 1/2005 |
| JP | 2003-359375 | 5/2005 |
| JP | 2005-135971 A | 5/2005 |
| JP | 2005-149265 | 6/2005 |
| JP | 2005-183793 | 7/2005 |
| JP | 2005-203447 | 7/2005 |
| JP | 2005-268610 | 9/2005 |
| JP | 2005-114752 | 10/2006 |
| JP | 2006-303022 A | 11/2006 |
| JP | 2007-012855 | 1/2007 |
| JP | 2007-013060 | 1/2007 |
| JP | 2007-043049 | 2/2007 |
| KR | 10-0417093 | 6/1997 |
| KR | 10-1998-087485 | 12/1998 |
| KR | 1998-0084215 A | 12/1998 |
| KR | 10-1999-0057943 A | 7/1999 |
| KR | 2000-0005660 | 1/2000 |
| KR | 10-2000-0028830 A | 5/2000 |
| KR | 10-2002-0034313 | 5/2002 |
| KR | 10-2002-0070777 | 9/2002 |
| KR | 2003-0022006 | 3/2003 |
| KR | 10-2005-0030347 A | 3/2005 |
| KR | 2005-0037965 A | 4/2005 |
| KR | 2006-0108233 A | 10/2006 |
| TW | 386288 | 4/2000 |
| TW | 200709309 | 3/2007 |
| TW | 200709565 | 3/2007 |
| TW | 200811704 A | 3/2008 |
| WO | WO 2005/104356 | 11/2005 |
| WO | WO 2006/014849 | 2/2006 |
| WO | WO 2006/052738 | 5/2006 |
| WO | WO 2007/014053 | 2/2007 |
| WO | WO 2007/103587 | 9/2007 |

OTHER PUBLICATIONS

Acar, et al., "A Linear-Centric Simulation Framework for Parametric Fluctuations", 2002, IEEE, Carnegie Mellon University USA, pp. 1-8, Jan. 28, 2002.

Amazawa, et al., "Fully Planarized Four-Level Interconnection with Stacked VLAS Using CMP of Selective CVD-Al and Insulator and its Application to Quarter Micron Gate Array LSIs", 1995, IEEE, Japan, pp. 473-476, Dec. 10, 1995.

Axelrad et al. "Efficient Full-Chip Yield Analysis Methodology for OPC-Corrected VLSI Design", 2000, International Symposium on Quality Electronic Design (ISQED), Mar. 20, 2000.

Balasinski et al. "Impact of Subwavelength CD Tolerance on Device Performance", 2002, SPIE vol. 4692, Jul. 11, 2002.

Burkhardt, et al., "Dark Field Double Dipole Lithography (DDL) for Back-End-Of-Line Processes", 2007, SPIE Proceeding Series, vol. 6520; Mar. 26, 2007.

Capetti, et al., "Sub k1=0.25 Lithography with Double Patterning Technique for 45nm Technology Node Flash Memory Devices at λ=193nm", 2007, SPIE Proceeding Series, vol. 6520; Mar. 27, 2007.

Capodieci, L., et al., "Toward a Methodology for Manufacturability-Driven Design Rule Exploration," DAC 2004, Jun. 7, 2004, San Diego, CA.

Chandra, et al., "An Interconnect Channel Design Methodology for High Performance Integrated Circuits", 2004, IEEE, Carnegie Mellon University, pp. 1-6, Feb. 16, 2004.

Cheng, et al., "Feasibility Study of Splitting Pitch Technology on 45nm Contact Patterning with 0.93 NA", 2007, SPIE Proceeding Series, vol. 6520; Feb. 25, 2007.

Chow, et al., "The Design of a SRAM-Based Field-Programmable Gate Array—Part II: Circuit Design and Layout", 1999, IEEE, vol. 7 # 3 pp. 321-330, Sep. 1, 1999.

Clark et al. "Managing Standby and Active Mode Leakage Power in Deep Sub-Micron Design", Aug. 9, 2004, ACM.

Cobb et al. "Using OPC to Optimize for Image Slope and Improve Process Window", 2003, SPIE vol. 5130, Apr. 16, 2003.

Devgan "Leakage Issues in IC Design: Part 3", 2003, ICCAD, Nov. 9, 2003.

DeVor, et al., "Statistical Quality Design and Control", 1992, Macmillan Publishing Company, pp. 264-267, Jan. 3, 1992.

(56) References Cited

OTHER PUBLICATIONS

Dictionary.com, "channel," in Collins English Dictionary—Complete & Unabridged 10th Edition. Source location: HarperCollins Publishers. Sep. 3, 2009.
Dusa, et al. "Pitch Doubling Through Dual Patterning Lithography Challenges in Integration and Litho Budgets", 2007, SPIE Proceeding Series, vol. 6520; Feb. 25, 2007.
El-Gamal, "Fast, Cheap and Under Control: The Next Implementation Fabric", Jun. 2, 2003, ACM Press, pp. 354-355.
Firedberg, et al., "Modeling Within-Field Gate Length Spatial Variation for Process-Design Co-Optimization," 2005 Proc. of SPIE vol. 5756, pp. 178-188, Feb. 27, 2005.
Frankel, "Quantum State Control Interference Lithography and Trim Double Patterning for 32-16nm Lithography", 2007, SPIE Proceeding Series, vol. 6520; Feb. 27, 2007.
Garg, et al. "Lithography Driven Layout Design", 2005, IEEE VLSI Design 2005, Jan. 3, 2005.
Grobman et al. "Reticle Enhancement Technology Trends: Resource and Manufacturability Implications for the Implementation of Physical Designs" Apr. 1, 2001, ACM.
Grobman et al. "Reticle Enhancement Technology: Implications and Challenges for Physical Design" Jun. 18, 2001, ACM.
Gupta et al. "Enhanced Resist and Etch CD Control by Design Perturbation", Oct. 4, 2006, Society of Photo-Optical Instrumentation Engineers.
Gupta et al. "A Practical Transistor-Level Dual Threshold Voltage Assignment Methodology", 2005, Sixth International Symposium on Quality Electronic Design (ISQED), Mar. 21, 2005.
Gupta et al. "Detailed Placement for Improved Depth of Focus and CD Control", 2005, ACM, Jan. 18, 2005.
Gupta et al. "Joining the Design and Mask Flows for Better and Cheaper Masks", Oct. 14, 2004, Society of Photo-Optical Instrumentation Engineers.
Gupta et al. "Manufacturing-Aware Physical Design", ICCAD 2003, Nov. 9, 2003.
Gupta et al. "Selective Gate-Length Biasing for Cost-Effective Runtime Leakage Control", Jun. 7, 2004, ACM.
Gupta et al. "Wafer Topography-Aware Optical Proximity Correction for Better DOF Margin and CD Control", Apr. 13, 2005, SPIE.
Gupta, Puneet, et al., "Manufacturing-aware Design Methodology for Assist Feature Correctness," SPIE vol. 5756, May 13, 2005.
Ha et al., "Reduction in the Mask Error Factor by Optimizing the Diffraction Order of a Scattering Bar in Lithography," Journal of the Korean Physical Society, vol. 46, No. 5, May 5, 2005, pp. 1213-1217.
Hakko, et al., "Extension of the 2D-TCC Technique to Optimize Mask Pattern Layouts," 2008 Proc. of SPIE vol. 7028, 11 pages, Apr. 16, 2008.
Halpin et al., "Detailed Placement with Net Length Constraints," Publication Year 2003, Proceedings of the 3rd IEEE International Workshop on System-on-Chip for Real-Time Applications, pp. 22-27, Jun. 30, 2003.
Hayashida, et al., "Manufacturable Local Interconnect technology Fully Compatible with Titanium Salicide Process", Jun. 11, 1991, VMIC Conference.
Heng, et al., "A VLSI Artwork Legalization Technique Base on a New Criterion of Minimum Layout Perturbation", Proceedings of 1997 International Symposium on Physical Design, pp. 116-121, Apr. 14, 1997.
Heng, et al., "Toward Through-Process Layout Quality Metrics", Mar. 3, 2005, Society of Photo-Optical Instrumentation Engineers.
Hu, et al., "Synthesis and Placement Flow for Gain-Based Programmable Regular Fabrics", Apr. 6, 2003, ACM Press, pp. 197-203.
Hur et al., "Mongrel: Hybrid Techniques for Standard Cell Placement," Publication Year 2000, IEEE/ACM International Conference on Computer Aided Design, ICCAD-2000, pp. 165-170, Nov. 5, 2000.
Hutton, et al., "A Methodology for FPGA to Structured-ASIC Synthesis and Verification", 2006, EDAA, pp. 64-69, Mar. 6, 2006.
Intel Core Microarchitecture White Paper "Introducing the 45 nm Next-Generation Intel Core Microarchitecture," Intel Corporation, 2007 (best available publication date).
Jayakumar, et al., "A Metal and VIA Maskset Programmable VLSI Design Methodology using PLAs", 2004, IEEE, pp. 590-594, Nov. 7, 2004.
Jhaveri, T. et al., Maximization of Layout Printability/Manufacturability by Extreme Layout Regularity, Proc. of the SPIE vol. 6156, Feb. 19, 2006.
Kang, S.M., Metal-Metal Matrix (M3) for High-Speed MOS VLSI Layout, IEEE Trans. on CAD, vol. CAD-6, No. 5, Sep. 1, 1987.
Kawashima, et al., "Mask Optimization for Arbitrary Patterns with 2D-TCC Resolution Enhancement Technique," 2008 Proc. of SPIE vol. 6924, 12 pages, Feb. 24, 2008.
Kheterpal, et al., "Design Methodology for IC Manufacturahility Based on Regular Logic-Bricks", DAC, Jun. 13, 2005, IEEE/AMC, vol. 6520.
Kheterpal, et al., "Routing Architecture Exploration for Regular Fabrics", DAC, Jun. 7, 2004, ACM Press, pp. 204-207.
Kim, et al., "Double Exposure Using 193nm Negative Tone Photoresist", 2007, SPIE Proceeding Series, vol. 6520; Feb. 25, 2007.
Kim, et al., "Issues and Challenges of Double Patterning Lithography in DRAM", 2007, SPIE Proceeding Series, vol. 6520; Feb. 25, 2007.
Koorapaty, et al., "Exploring Logic Block Granularity for Regular Fabrics", 2004, IEEE, pp. 1-6, Feb. 16, 2004.
Koorapaty, et al., "Heterogeneous Logic Block Architectures for Via-Patterned Programmable Fabric", 13th International Conference on Field Programmable Logic and Applications (FPL) 2003, Lecture Notes in Computer Science (LNCS), Sep. 1, 2003, Springer-Verlag, vol. 2778, pp. 426-436.
Koorapaty, et al., "Modular, Fabric-Specific Synthesis for Programmable Architectures", 12th International Conference on Field Programmable Logic and Applications (FPL_2002, Lecture Notes in Computer Science (LNCS)), Sep. 2, 2002, Springer-Verlag, vol. 2438 pp. 132-141.
Kuh et al., "Recent Advances in VLSI Layout," Proceedings of the IEEE, vol. 78, Issue 2, pp. 237-263, Feb. 1, 1990.
Lavin et al. "Backend DAC Flows for "Restrictive Design Rules"", 2004, IEEE, Nov. 7, 2004.
Li, et al., "A Linear-Centric Modeling Approach to Harmonic Balance Analysis", 2002, IEEE, pp. 1-6, Mar. 4, 2002.
Li, et al., "Nonlinear Distortion Analysis via Linear-Centric Models", 2003, IEEE, pp. 897-903, Jan. 21, 2003.
Liebmann et al., "Integrating DfM Components into a Cohesive Design-to-Silicon Solution," Proc. SPIE 5756, Design and Process Integration for Microelectronic Manufacturing III, Feb. 27, 2005.
Liebmann et al., "Optimizing Style Options for Sub-Resolution Assist Features," Proc. of SPIE vol. 4346, Feb. 25, 2001, pp. 141-152.
Liebmann, et al., "High-Performance Circuit Design for the RET-Enabled 65nm Technology Node", Feb. 26, 2004, SPIE Proceeding Series, vol. 5379 pp. 20-29.
Liebmann, L. W., Layout Impact of Resolution Enhancement Techniques: Impediment or Opportunity?, International Symposium on Physical Design, Apr. 6, 2003.
Liu et al., "Double Patterning with Multilayer Hard Mask Shrinkage for Sub 0.25 k1 Lithography," Proc. SPIE 6520, Optical Microlithography XX, Feb. 25, 2007.
Mansfield et al., "Lithographic Comparison of Assist Feature Design Strategies," Proc. of SPIE vol. 4000, Feb. 27, 2000, pp. 63-76.
Miller, "Manufacturing-Aware Design Helps Boost IC Yield", Sep. 9, 2004, http://www.eetimes.com/showArticle.jhtml?articleID=47102054.
Mishra, P., et al., "FinFET Circuit Design," Nanoelectronic Circuit Design, pp. 23-54, Dec. 21, 2010.
Mo, et al., "Checkerboard: A Regular Structure and its Synthesis, International Workshop on Logic and Synthesis", Department of Electrical Engineering and Computer Sciences, UC Berkeley, California, pp. 1-7, Jun. 1, 2003.
Mo, et al., "PLA-Based Regular Structures and Their Synthesis", Department of Electrical Engineering and Computer Sciences, IEEE, pp. 723-729, Jun. 1, 2003.
Mo, et al., "Regular Fabrics in Deep Sub-Micron Integrated-Circuit Design", Kluwer Academic Publishers, Entire Book, Jun. 1, 2002.

(56) References Cited

OTHER PUBLICATIONS

Moore, Samuel K., "Intel 45-nanometer Penryn Processors Arrive," Nov. 13, 2007, IEEE Spectrum, http://spectrum.ieee.org/semiconductors/design/intel-45nanometer-penryn-processors-arrive.

Mutoh et al. "1-V Power Supply High-Speed Digital Circuit Technology with Multithreshold-Voltage CMOS", 1995, IEEE, Aug. 1, 1995.

Op de Beek, et al., "Manufacturability issues with Double Patterning for 50nm half pitch damascene applications, using RELACS® shrink and corresponding OPC", 2007, SPIE Proceeding Series, vol. 6520; Feb. 25, 2007.

Or-Bach, "Programmable Circuit Fabrics", Sep. 18, 2001, e-ASIC, pp. 1-36.

Otten, et al., "Planning for Performance", DAC 1998, ACM Inc., pp. 122-127, Jun. 15, 1998.

Pack et al. "Physical & Timing Verification of Subwavelength-Scale Designs-Part I: Lithography Impact on MOSFETs", 2003, SPIE vol. 5042, Feb. 23, 2003.

Pandini, et al., "Congestion-Aware Logic Synthesis", 2002, IEEE, pp. 1-8, Mar. 4, 2002.

Pandini, et al., "Understanding and Addressing the Impact of Wiring Congestion During Technology Mapping", ISPD Apr. 7, 2002, ACM Press, pp. 131-136.

Patel, et al., "An Architectural Exploration of via Patterned Gate Arrays, ISPD 2003", Apr. 6, 2003, pp. 184-189.

Pham, D., et al., "FINFET Device Junction Formation Challenges," 2006 International Workshop on Junction Technology, pp. 73-77, Aug. 1, 2006.

Pileggi, et al., "Exploring Regular Fabrics to Optimize the Performance-Cost Trade-Offs, Proceedings of the 40th ACM/IEEE Design Automation Conference (DAC) 2003", Jun. 2, 2003, ACM Press, pp. 782-787.

Poonawala, et al., "ILT for Double Exposure Lithography with Conventional and Novel Materials", 2007, SPIE Proceeding Series, vol. 6520; Feb. 25, 2007.

Qian et al. "Advanced Physical Models for Mask Data Verification and Impacts on Physical Layout Synthesis" 2003 IEEE, Mar. 24, 2003.

Ran, et al., "An Integrated Design Flow for a Via-Configurable Gate Array", 2004, IEEE, pp. 582-589, Nov. 7, 2004.

Ran, et al., "Designing a Via-Configurable Regular Fabric", Custom Integrated Circuits Conference (CICC). Proceedings of the IEEE, Oct. 1, 2004, pp. 423-426.

Ran, et al., "On Designing Via-Configurable Cell Blocks for Regular Fabrics" Proceedings of the Design Automation Conference (DAC) 2004, Jun. 7, 2004, ACM Press, s 198-203.

Ran, et al., "The Magic of a Via-Configurable Regular Fabric", Proceedings of the IEEE International Conference on Computer Design (ICCD) Oct. 11, 2004.

Ran, et al., "Via-Configurable Routing Architectures and Fast Design Mappability Estimation for Regular Fabrics", 2005, IEEE, pp. 25-32, Sep. 1, 2006.

Reis, et al., "Physical Design Methodologies for Performance Predictability and Manufacturability", Apr. 14, 2004, ACM Press, pp. 390-397.

Robertson, et al., "The Modeling of Double Patterning Lithographic Processes", 2007, SPIE Proceeding Series, vol. 6520; Feb. 25, 2007.

Rosenbluth, et al., "Optimum Mask and Source Patterns to Print a Given Shape," 2001 Proc. of SPIE vol. 4346, pp. 486-502, Feb. 25, 2001.

Rovner, "Design for Manufacturability in Via Programmable Gate Arrays", May 1, 2003, Graduate School of Carnegie Mellon University.

Sengupta, "An Integrated CAD Framework Linking VLSI Layout Editors and Process Simulators", 1998, Thesis for Rice University, pp. 1-101, Nov. 1, 1998.

Sengupta, et al., "An Integrated CAD Framework Linking VLSI Layout Editors and Process Simulators", 1996, SPIE Proceeding Series, vol. 2726; pp. 244-252, Mar. 10, 1996.

Sherlekar, "Design Considerations for Regular Fabrics", Apr. 18, 2004, ACM Press, pp. 97-102.

Shi et al., "Understanding the Forbidden Pitch and Assist Feature Placement," Proc. of SPIE vol. 4562, pp. 968-979, Mar. 11, 2002.

Smayling et al., "APF Pitch Halving for 22 nm Logic Cells Using Gridded Design Rules," Proceedings of SPIE, USA, vol. 6925, Jan. 1, 2008, pp. 69251E-1-69251E-7.

Socha, et al., "Simultaneous Source Mask Optimization (SMO)," 2005 Proc. of SPIE vol. 5853, pp. 180-193, Apr. 13, 2005.

Sreedhar et al. "Statistical Yield Modeling for Sub-Wavelength Lithography", 2008 IEEE, Oct. 28, 2008.

Stapper, "Modeling of Defects in Integrated Circuit Photolithographic Patterns", Jul. 1, 1984, IBM, vol. 28 # 4, pp. 461-475.

Taylor, et al., "Enabling Energy Efficiency in Via-Patterned Gate Array Devices", Jun. 7, 2004, ACM Press, pp. 874-877.

Tian et al. "Model-Based Dummy Feature Placement for Oxide Chemical_Mechanical Polishing Manufacturability" IEEE, vol. 20, Issue 7, Jul. 1, 2001.

Tong, et al., "Regular Logic Fabrics for a via Patterned Gate Array (VPGA), Custom Integrated Circuits Conference", Sep. 21, 2003, Proceedings of the IEEE, pp. 53-56.

Vanleenhove, et al., "A Litho-Only Approach to Double Patterning", 2007, SPIE Proceeding Series, vol. 6520; Feb. 25, 2007.

Wang, et al., "Performance Optimization for Gridded-Layout Standard Cells", vol. 5567 SPIE, Sep. 13, 2004.

Wang, J. et al., Standard Cell Layout with Regular Contact Placement, IEEE Trans. on Semicon. Mfg., vol. 17, No. 3, Aug. 9, 2004.

Webb, Clair, "45nm Design for Manufacturing," Intel Technology Journal, vol. 12, Issue 02, Jun. 17, 2008, ISSN 1535-864X, pp. 121-130.

Webb, Clair, "Layout Rule Trends and Affect upon CPU Design", vol. 6156 SPIE, Feb. 19, 2006.

Wenren, et al., "The Improvement of Photolithographic Fidelity of Two-dimensional Structures Though Double Exposure Method", 2007, SPIE Proceeding Series, vol. 6520; Feb. 25, 2007.

Wilcox, et al., "Design for Manufacturability: A Key to Semiconductor Manufacturing Excellence", 1998 IEEE, pp. 308-313, Sep. 23, 1998.

Wong, et al., "Resolution Enhancement Techniques and Design for Manufacturability: Containing and Accounting for Variabilities in Integrated Circuit Creation," J. Micro/Nanolith. MEMS MOEMS, Sep. 27, 2007, vol. 6(3), 2 pages.

Wu, et al., "A Study of Process Window Capabilities for Two-dimensional Structures under Double Exposure Condition", 2007, SPIE Proceeding Series, vol. 6520; Feb. 25, 2007.

Xiong, et al., "The Constrained Via Minimization Problem for PCB and VLSI Design", 1988 ACM Press/IEEE, pp. 573-578, Jun. 12, 1998.

Yamamoto, et al., "New Double Exposure Technique without Alternating Phase Shift Mask", SPIE Proceeding Series, vol. 6520; Feb. 25, 2007.

Yamazoe, et al., "Resolution Enhancement by Aerial Image Approximation with 2D-TCC," 2007 Proc. of SPIE vol. 6730, 12 pages, Sep. 17, 2007.

Yang, et al., "Interconnection Driven VLSI Module Placement Based on Quadratic Programming and Considering Congestion Using LFF Principles", 2004 IEEE, pp. 1243-1247, Jun. 27, 2004.

Yao, et al., "Multilevel Routing With Redundant via Insertion", Oct. 23, 2006, IEEE, pp. 1148-1152.

Yu, et al., "True Process Variation Aware Optical Proximity Correction with Variational Lithography Modeling and Model Calibration," J. Micro/Nanolith. MEMS MOEMS, Sep. 11, 2007, vol. 6(3), 16 pages.

Zheng, et al."Modeling and Analysis of Regular Symmetrically Structured Power/Ground Distribution Networks", DAC, Jun. 10, 2002, ACM Press, pp. 395-398.

Zhu, et al., "A Stochastic Integral Equation Method for Modeling the Rough Surface Effect on Interconnect Capacitance", 2004 IEEE, Nov. 7, 2004.

Zhu, et al., "A Study of Double Exposure Process Design with Balanced Performance Parameters for Line/Space Applications", 2007, SPIE Proceeding Series, vol. 6520; Feb. 25, 2007.

(56) References Cited

OTHER PUBLICATIONS

Zuchowski, et al., "A Hybrid ASIC and FPGA Architecture", 2003 IEEE, pp. 187-194, Nov. 10, 2002.
Alam, Syed M. et al., "A Comprehensive Layout Methodology and Layout-Specific Circuit Analyses for Three-Dimensional Integrated Circuits," Mar. 21, 2002.
Alam, Syed M. et al., "Layout-Specific Circuit Evaluation in 3-D Integrated Circuits," May 1, 2003.
Aubusson, Russel, "Wafer-Scale Integration of Semiconductor Memory," Apr. 1, 1979.
Bachtold, "Logic Circuits with Carbon," Nov. 9, 2001.
Baker, R. Jacob, "CMOS: Circuit Design, Layout, and Simulation (2nd Edition)," Nov. 1, 2004.
Baldi et al., "A Scalable Single Poly EEPROM Cell for Embedded Memory Applications," pp. 1-4, Fig. 1, Sep. 1, 1997.
Cao, Ke, "Design for Manufacturing (DFM) in Submicron VLSI Design," Aug. 1, 2007.
Capodieci, Luigi, "From Optical Proximity Correction to Lithography-Driven Physical Design (1996-2006): 10 years of Resolution Enhancement Technology and the roadmap enablers for the next decade," Proc. SPIE 6154, Optical Microlithography XIX, 615401, Mar. 20, 2006.
Chang, Leland et al., "Stable SRAM Cell Design for the 32 nm Node and Beyond," Jun. 16, 2005.
Cheung, Peter, "Layout Design," Apr. 4, 2004.
Chinnery, David, "Closing the Gap Between ASIC & Custom: Tools and Techniques for High-Performance ASIC Design," Jun. 30, 2002.
Chou, Dyiann et al., "Line End Optimization through Optical Proximity Correction (OPC): A Case Study," Feb. 19, 2006.
Clein, Dan, "CMOS IC Layout: Concepts, Methodologies, and Tools," Dec. 22, 1999.
Cowell, "Exploiting Non-Uniform Access Time," Jul. 1, 2003.
Das, Shamik, "Design Automation and Analysis of Three-Dimensional Integrated Circuits," May 1, 2004.
Dehaene, W. et al., "Technology-Aware Design of SRAM Memory Circuits," Mar. 1, 2007.
Deng, Liang et al., "Coupling-aware Dummy Metal Insertion for Lithography," p. 1, col. 2, Jan. 23, 2007.
Devoivre et al., "Validated 90nm CMOS Technology Platform with Low-k Copper Interconnects for Advanced System-on-Chip (SoC)," Jul. 12, 2002.
Enbody, R. J., "Near-Optimal n-Layer Channel Routing," Jun. 29, 1986.
Ferretti, Marcos et al., "High Performance Asynchronous ASIC Back-End Design Flow Using Single-Track Full-Buffer Standard Cells," Apr. 23, 2004.
Garg, Manish et al., "Litho-driven Layouts for Reducing Performance Variability," p. 2, Figs. 2b-2c, May 23, 2005.
Greenway, Robert et al., "32nm 1-D Regular Pitch SRAM Bitcell Design for Interference-Assisted Lithography," Oct. 6, 2008.
Gupta et al., "Modeling Edge Placement Error Distribution in Standard Cell Library," Feb. 23, 2006.
Grad, Johannes et al., "A standard cell library for student projects," Proceedings of the 2003 IEEE International Conference on Microelectronic Systems Education, Jun. 2, 2003.
Hartono, Roy et al., "Active Device Generation for Automatic Analog Layout Retargeting Tool," May 13, 2004.
Hartono, Roy et al., "IPRAIL—Intellectual Property Reuse-based Analog IC Layout Automation," Mar. 17, 2003.
Hastings, Alan, "The Art of Analog Layout (2nd Edition)," Jul. 4, 2005.
Hurat et al., "A Genuine Design Manufacturability Check for Designers," Feb. 19, 2006.
Institute of Microelectronic Systems, "Digital Subsystem Design," Oct. 13, 2006.
Ishida, M. et al., "A Novel 6T-SRAM Cell Technology Designed with Rectangular Patterns Scalable beyond 0.18 pm Generation and Desirable for Ultra High Speed Operation," IEDM 1998, Dec. 6, 1998.
Jakusovszky, "Linear IC Parasitic Element Simulation Methodology," Oct. 1, 1993.
Jangkrajarng, Nuttorn et al., "Template-Based Parasitic-Aware Optimization and Retargeting of Analog and RF Integrated Circuit Layouts," Nov. 5, 2006.
Kahng, Andrew B., "Design Optimizations DAC-2006 DFM Tutorial, part V)," Jul. 24, 2006.
Kang, Sung-Mo et al., "CMOS Digital Integrated Circuits Analysis & Design," Oct. 29, 2002.
Kottoor, Mathew Francis, "Development of a Standard Cell Library based on Deep Sub-Micron SCMOS Design Rules using Open Source Software (MS Thesis)," Aug. 1, 2005.
Kubicki, "Intel 65nm and Beyond (or Below): IDF Day 2 Coverage (available at http://www.anandtech.com/show/1468/4)," Sep. 9, 2004.
Kuhn, Kelin J., "Reducing Variation in Advanced Logic Technologies: Approaches to Process and Design for Manufacturability of Nanoscale CMOS," p. 27, Dec. 12, 2007.
Kurokawa, Atsushi et al., "Dummy Filling Methods for Reducing Interconnect Capacitance and Number of Fills, Proc. of ISQED," pp. 586-591, Mar. 21, 2005.
Lavin, Mark, "Open Access Requirements from RDR Design Flows," Nov. 11, 2004.
Liebmann, Lars et al., "Layout Methodology Impact of Resolution Enhancement Techniques," pp. 5-6, Apr. 6, 2003.
Liebmann, Lars et al., "TCAD development for lithography resolution enhancement," Sep. 1, 2001.
Lin, Chung-Wei et al., "Recent Research and Emerging Challenges in Physical Design for Manufacturability/Reliability," Jan. 26, 2007.
McCullen, Kevin W., "Layout Techniques for Phase Correct and Gridded Wiring," pp. 13, 17, Fig. 5, Dec. 1, 2006.
MOSIS, "Design Rules MOSIS Scalable CMOS (SCMOS) (Revision 8.00)," Oct. 4, 2004.
MOSIS, "MOSIS Scalable CMOS (SCMOS) Design Rules (Revision 7.2)," Jan. 1, 1995.
Muta et al., "Manufacturability-Aware Design of Standard Cells," pp. 2686-2690, Figs. 3, 12, Dec. 1, 2007.
Na, Kee-Yeol et al., "A Novel Single Polysilicon EEPROM Cell With a Polyfinger Capacitor," Nov. 30, 2007.
Pan et al., "Redundant Via Enhanced Maze Routing for Yield Improvement," DAC 2005, Jan. 18, 2005.
Park, Tae Hong, "Characterization and Modeling of Pattern Dependencies in Copper Interconnects for Integrated Circuits," Ph.D. Thesis, MIT, May 24, 2002.
Patel, Chetan, "An Architectural Exploration of via Patterned Gate Arrays (CMU Master's Project)," May 1, 2003.
Pease, R. Fabian et al., "Lithography and Other Patterning Techniques for Future Electronics," IEEE 2008, vol. 96, Issue 2, Jan. 16, 2008.
Serrano, Diego Emilio, Pontificia Universidad Javeriana Facultad De Ingenieria, Departamento De Electronica, "Diseño De Multiplicador 4 X 8 en VLSI, Introduccion al VLSI," 2006 (best available publication date).
Pramanik, "Impact of layout on variability of devices for sub 90nm technologies," 2004 (best available publication date).
Pramanik, Dipankar et al., "Lithography-driven layout of logic cells for 65-nm node (SPIE Proceedings vol. 5042)," Jul. 10, 2003.
Roy et al., "Extending Aggressive Low-K1 Design Rule Requirements for 90 and 65 Nm Nodes Via Simultaneous Optimization of Numerical Aperture, Illumination and Optical Proximity Correction," J.Micro/Nanolith, MEMS MOEMS, 4(2), 023003, Apr. 26, 2005.
Saint, Christopher et al., "IC Layout Basics: A Practical Guide," Chapter 3, Nov. 5, 2001.
Saint, Christopher et al., "IC Mask Design: Essential Layout Techniques," May 24, 2002.
Scheffer, "Physical CAD Changes to Incorporate Design for Lithography and Manufacturability," Feb. 4, 2004.
Smayling, Michael C., "Part 3: Test Structures, Test Chips, In-Line Metrology & Inspection," Jul. 24, 2006.
Spence, Chris, "Full-Chip Lithography Simulation and Design Analysis: How OPC is changing IC Design, Emerging Lithographic Technologies IX," May 6, 2005.

(56) References Cited

OTHER PUBLICATIONS

Subramaniam, Anupama R., "Design Rule Optimization of Regular layout for Leakage Reduction in Nanoscale Design," pp. 474-478, Mar. 24, 2008.
Tang, C. W. et al., "A compact large signal model of LDMOS," Solid-State Electronics 46(2002) 2111-2115, May 17, 2002.
Taylor, Brian et al., "Exact Combinatorial Optimization Methods for Physical Design of Regular Logic Bricks," Jun. 8, 2007.
Tian, Ruiqi et al., "Dummy Feature Placement for Chemical-Mechanical Uniformity in a Shallow Trench Isolation Process," IEEE Trans. on Computer-Aided Design of Integrated Circuits and Systems, vol. 21, No. 1, pp. 63-71, Jan. 1, 2002.
Tian, Ruiqi et al., "Proximity Dummy Feature Placement and Selective Via Sizing for Process Uniformity in a Trench-First-Via-Last Dual-Inlaid Metal Process," Proc. of IITC, pp. 48-50, Jun. 6, 2001.
Torres, J. A. et al., "RET Compliant Cell Generation for sub-130nm Processes," SPIE vol. 4692, Mar. 6, 2002.
Uyemura, John P., "Introduction to VLSI Circuits and Systems," Chapters 2, 3, 5, and Part 3, Jul. 30, 2001.
Uyemura, John, "Chip Design for Submicron VLSI: CMOS Layout and Simulation," Chapters 2-5, 7-9, Feb. 8, 2005.
Verhaegen et al., "Litho Enhancements for 45nm-nod MuGFETs," Aug. 1, 2005.
Wong, Ban P., "Bridging the Gap between Dreams and Nano-Scale Reality (DAC-2006 DFM Tutorial)," Jul. 28, 2006.
Wang, Dunwei et al., "Complementary Symmetry Silicon Nanowire Logic: Power-Efficient Inverters with Gain," Aug. 17, 2006.
Wang, Jun et al., "Effects of grid-placed contacts on circuit performance," pp. 135-139, Figs. 2, 4-8, Feb. 28, 2003.
Wang, Jun et al., "Standard cell design with regularly placed contacts and gates (SPIE vol. 5379)," Feb. 22, 2004.
Wang, Jun et al., "Standard cell design with resolution-enhancement-technique-driven regularly placed contacts and gates," J. Micro/Nanolith, MEMS MOEMS, 4(1), 013001, Mar. 16, 2005.
Watson, Bruce, "Challenges and Automata Applications in Chip-Design Software," pp. 38-40, Jul. 16, 2007.
Weste, Neil et al., "CMOS VLSI Design: A Circuits and Systems Perspective, 3rd Edition," May 21, 2004.
Wingerden, Johannes van, "Experimental verification of improved printability for litho-driven designs," Mar. 14, 2005.
Wong, Alfred K., "Microlithography: Trends, Challenges, Solutions and Their Impact on Design," Micro IEEE vol. 23, Issue 2, Apr. 29, 2003.
Xu, Gang, "Redundant-Via Enhanced Maze Routing for Yield Improvement," Proceedings of ASP-DAC 2005, Jan. 18, 2005.
Yang, Jie, "Manufacturability Aware Design," pp. 93, 102, Fig. 5.2, Jan. 16, 2008.
Yongshun, Wang et al., "Static Induction Devices with Planar Type Buried Gate," Chinese Journal of Semiconductors, vol. 25, No. 2, Feb. 1, 2004.
Zobrist, George (editor), "Progress in Computer Aided VLSI Design: Implementations (Ch. 5)," Ablex Publishing Corporation, Feb. 1, 1990.
Petley, Graham, "VLSI and ASIC Technology Standard Cell Library Design," from website www.vlsitechnology.org, Jan. 11, 2005.
Liebmann, Lars, et al., "Layout Optimization at the Pinnacle of Optical Lithography," Design and Process Integration for Microelectronic Manufacturing II, Proceedings of SPIE vol. 5042, Jul. 8, 2003.
Kawasaki, H., et al., "Challenges and Solutions of FinFET Integration in an SRAM Cell and a Logic Circuit for 22 nm node and beyond," Electron Devices Meeting (IEDM), 2009 IEEE International, IEEE, Piscataway, NJ, USA, Dec. 7, 2009, pp. 1-4.

* cited by examiner

US 9,202,779 B2

ENFORCEMENT OF SEMICONDUCTOR STRUCTURE REGULARITY FOR LOCALIZED TRANSISTORS AND INTERCONNECT

CLAIM OF PRIORITY

This application is a continuation application under 35 U.S.C. 120 of prior U.S. application Ser. No. 13/897,307, filed May 17, 2013, which is a divisional application under 35 U.S.C. 121 of prior U.S. application Ser. No. 12/363,705, filed Jan. 30, 2009, issued as U.S. Pat. No. 8,453,094, on May 28, 2013, which claims priority under 35 U.S.C. 119(e) to U.S. Provisional Patent Application No. 61/024,980, filed Jan. 31, 2008. The disclosure of each above-identified patent application is incorporated herein by reference.

BACKGROUND

FIG. 1 shows a typical CMOS transistor configuration, in accordance with the prior art. In the example of FIG. 1, a preferred direction for an interconnect level (metal-1) is parallel to that for gate electrode (gate) wires, as seen for metal-1 wire 105 and gate wire 103. Gate wire 103 overlaps a diffusion shape 101, forming a transistor with a source or drain (S/D) node that is connected to metal-1 wire 105 by a contact 106. Wire 105 requires a non-rectangular shape, i.e., a shape with a bend, to allow it to overlap a contact 102 which connects to a gate wire 107. FIG. 1 also shows a gate electrode wire 104 that requires a bend to overlap a gate contact 108, which connects to a metal-1 wire 109.

The typical CMOS transistor configuration of FIG. 1 illustrates a number of features that may increase manufacturing difficulty. For example, contacts for S/D and gate connections are not aligned, gate and metal wire widths are variable, spacing between wire shapes is variable, wire center lines are variably spaced apart, and a ratio of filled to non-filled space for gate and metal-1 levels is variable. These features may cause parametric and defect yield loss in advanced semiconductor processes due to associated lithographic effects, CMP (chemical mechanical planarization) dishing, and/or other manufacturing imperfections. Therefore, it is of interest to define a semiconductor device layout methodology that accounts for layout characteristics which adversely affect manufacturability.

SUMMARY

In one embodiment, a method is disclosed for defining a layout for a portion of a given semiconductor chip level. The method includes an operation for defining a preferred routing direction for a given chip level. The method also includes an operation for identifying each contact level related to the given chip level, wherein each contact level includes at least one interfacing contact defined to physically connect with a structure corresponding to a layout shape to be placed in the given chip level. An operation is then performed to define a global placement grating (GPG) for the given chip level to include a set of parallel and evenly spaced virtual lines. At least one virtual line of the GPG is positioned to intersect each interfacing contact within each contact level related to the given chip level. A determination is then made as to whether a perpendicular spacing between adjacent virtual lines of the GPG provides for enforcement of layout shape pattern regularity within the given chip level as necessary to ensure manufacturability of layout shapes within the given chip level. If it is determined that the perpendicular spacing between adjacent virtual lines of the GPG is acceptable, the method proceeds with placement of layout shapes in alignment with the GPG for the given chip level. However, if it is determined that the perpendicular spacing between adjacent virtual lines of the GPG is not acceptable, the method proceeds with an operation for adjusting placement of one or more interfacing contacts within one or more contact levels related to the given chip level. The method then reverts back to the operation for defining the GPG for the given chip level.

In another embodiment, a method is disclosed for defining a layout for a portion of a given semiconductor chip level. In the method, a GPG is defined for a given chip level. The GPG is defined by a set of parallel and evenly spaced virtual lines. The method includes identifying all connection lines within the GPG. A connection line is a virtual line of the GPG that is spatially coincident with a virtual line of a related contact level. A subgrating is defined for the given chip level as a set of evenly spaced connection lines, such that a spacing between adjacent connection lines in the subgrating is at least as large as a minimum spacing required to support a common run length of layout shapes on the adjacent connection lines in the subgrating. Definition of subgratings is repeated until each connection line within the GPG is associated with at least one subgrating. The method further includes placement of layout shapes in alignment with the defined subgratings, such that each layout shape is associated with any one subgrating.

In another embodiment, a method is disclosed for defining a layout for a portion of a given semiconductor chip level. The method includes an operation for defining a GPG for a given chip level. The GPG is defined by a set of parallel and evenly spaced virtual lines. All connection lines within the GPG are identified. A connection line is a virtual line of the GPG that is spatially coincident with a virtual line of a related contact level. The method also includes an operation for defining a subgrating for the given chip level as a set of evenly spaced connection lines, such that a spacing between adjacent connection lines in the subgrating is at least as large as a minimum spacing required to support a common run length of layout shapes on the adjacent connection lines in the subgrating. The operation for defining the subgrating is repeated until each connection line within the GPG is associated with at least one subgrating. The layout for the given chip level is then partitioned into a number of subgrating regions. Each subgrating region is defined as a contiguous area within the layout for the given chip level. Subgratings are allocated to the number of subgrating regions such that only one subgrating is allocated to any one subgrating region. The method further includes an operation for placing functional layout shapes for the given chip level in alignment to the subgratings allocated to the subgrating regions. Following placement of the functional layout shapes, a non-standard spacing is identified within the layout of the given chip level. The method includes an operation for resolving the non-standard spacing so as to ensure manufacturability of structures corresponding to the functional layout shapes.

Other aspects and advantages of the invention will become more apparent from the following detailed description, taken in conjunction with the accompanying drawings, illustrating by way of example the present invention.

DETAILED DESCRIPTION

Figure 1:
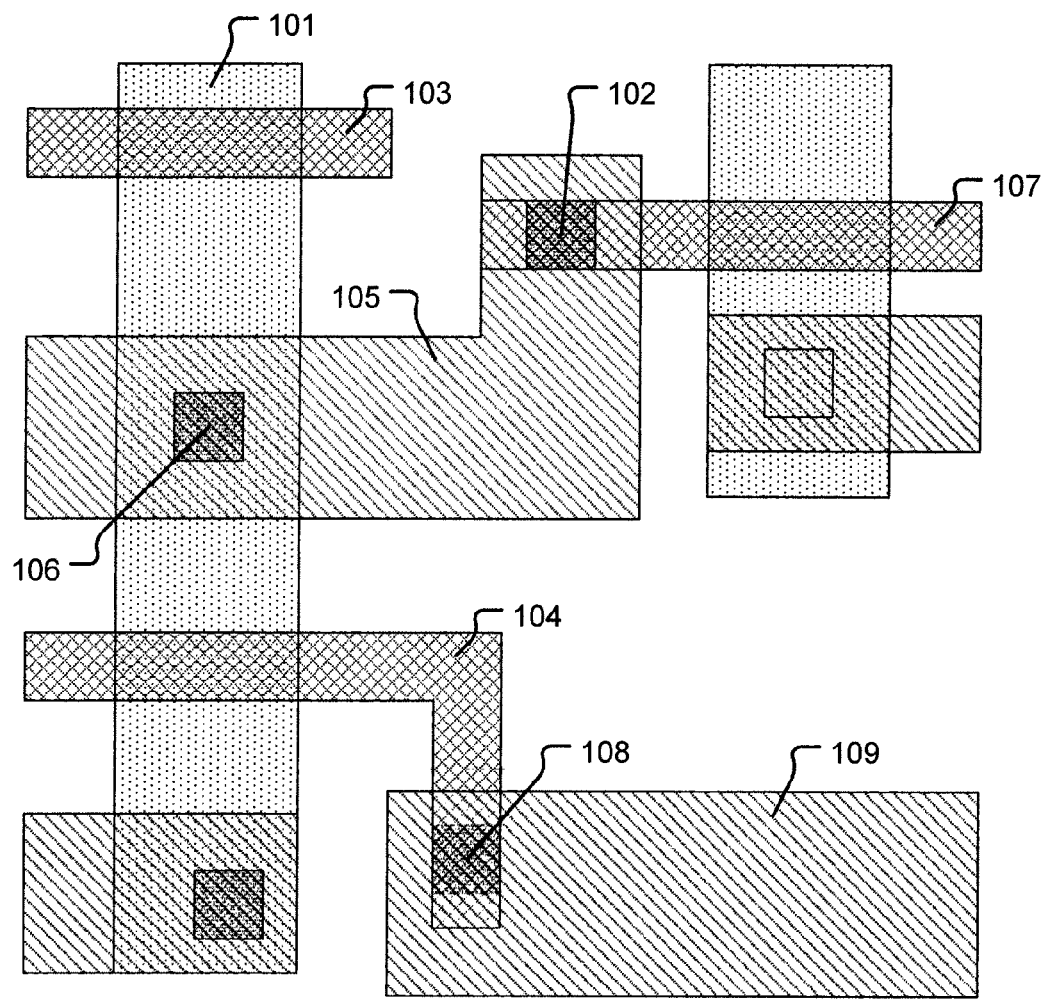
FIG. 1 shows a typical CMOS transistor configuration, in accordance with the prior art.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Within the context of the present invention, a global placement grating (GPG) is defined by a set of parallel and evenly spaced virtual lines extending across a semiconductor chip ("chip" hereafter) level. The even, i.e., equal, perpendicular spacing between adjacent virtual lines of a GPG is referred to at the GPG pitch (GPGP). Layout shapes within a portion of a given chip level can be placed in accordance with the GPG of the given chip level. For example, layout shapes within a portion of a given chip level may be centered upon or in some way indexed to virtual lines of the GPG of the given chip level. Also, the virtual lines of the GPG of a given chip level are oriented to extend in a preferred routing direction of the given chip level, wherein the preferred routing direction corresponds to a direction in which layout shapes are defined to extend.

In one embodiment, the layout shapes placed in accordance with the GPG are defined as linear layout shapes. Each linear layout shape has a substantially rectangular cross-section when viewed in an as-drawn state. In one embodiment, the linear layout shape does allow for small deviations from the rectangular cross-section. For example, a linear layout shape may include one or more expanded regions along its rectangular cross-section length so as to accommodate contact placements and connections thereto. In another embodiment, strict adherence to a substantially rectangular cross-section may be specified for the linear layout shapes. It should be understood that a degree of rectangularity of the linear layout shapes can vary between embodiments, depending on the requirements for design and layout of a particular embodiment. In one embodiment, each linear layout shape placed in a portion of a given chip level is placed such that a length of its substantially rectangular cross-section is parallel with the GPG of the given chip level. Therefore, in this embodiment, the linear layout shapes extend in the preferred routing direction of the given chip level which is parallel to the virtual lines of the GPG.

Also, in one embodiment, each linear layout shape is initially placed in a centered manner such that its centerline extending in the preferred routing direction is substantially centered upon a virtual line of the GPG. It should be understood, however, that following initial placement of a given layout shape in the centered manner, a width of the given layout shape may be adjusted, or the given layout shape may be stretched in its width direction, such that a final version of the given layout shape is no longer centered upon a virtual line of the GPG.

Figure 2:
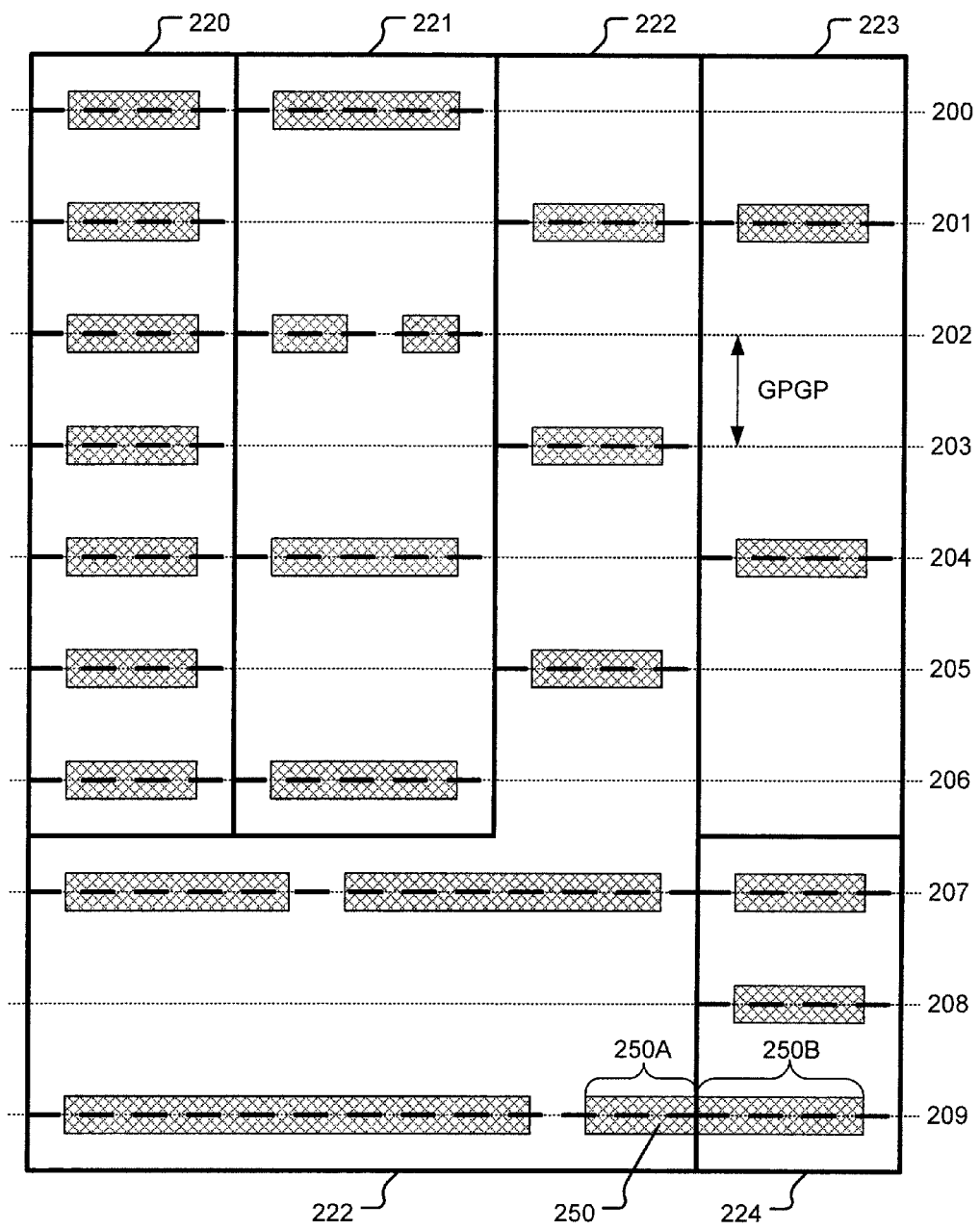
FIG. 2 shows a portion of a layout for a given chip level in which a GPG is defined and in which linear layout shapes are placed in alignment with the GPG, in accordance with one embodiment of the present invention.

FIG. 2 shows a portion of a layout for a given chip level in which a GPG is defined and in which linear layout shapes are placed in alignment with the GPG, in accordance with one embodiment of the present invention. The GPG of FIG. 2 is defined by virtual lines 200-209, with adjacent virtual lines evenly spaced at the GPG pitch (GPGP). The virtual lines 200-209 of the GPG extend in the preferred routing direction of the given chip level. FIG. 2 depicts layout shapes as shaded rectangular shapes. The layout shapes within the portion of the given chip level are defined as linear layout shapes and are placed so as to be substantially centered upon a virtual line of the GPG.

FIG. 2 further illustrates concepts of the present invention referred to as subgrating and subgrating regions. A subgrating is defined as a set of evenly spaced GPG lines having a subgrating pitch that is an integer multiple of the GPG pitch. A subgrating region is defined as a layout area of a portion of a given chip level within which layout shapes are placed according to a single subgrating. In one embodiment, a subgrating is defined to accommodate a common run length of layout shapes having a specified uniform width, wherein the common run length refers to side-by-side existence of layout shapes on adjacent subgrating virtual lines.

FIG. 2 shows by way of example five separate subgrating regions 220-224, where a periphery of each subgrating region 220-224 is delineated by bold solid lines. Each of subgrating regions 220-224 is associated with a particular subgrating. The subgrating within each subgrating region 220-224 is delineated by bold dashed lines. The subgratings for each of subgrating regions 220 and 224 include each virtual line of the GPG (GPG virtual lines 200-206 for subgrating region 220, and GPG virtual lines 207-209 for subgrating region 224). The subgrating for subgrating region 221 includes every other even numbered virtual line of the GPG (GPG virtual lines 200, 202, 204, 206), such that the corresponding subgrating pitch is 2*GPGP. The subgrating for subgrating region 222 includes every other odd numbered virtual line of the GPG (GPG virtual lines 201, 203, 205, 207, 209), such that the corresponding subgrating pitch is 2*GPGP. The subgrating for subgrating region 223 includes every third virtual line of the GPG, (GPG virtual lines 201 and 204), such that the corresponding subgrating pitch is 3*GPGP.

As shown in FIG. 2, linear layout shapes are initially placed in a centered manner on the subgrating of the subgrating region in which the linear layout shape is placed. Also, it should be appreciated from the example of FIG. 2 that layout shapes of uniform width placed in accordance with the same subgrating can have a common run length. Also, layout shapes that are placed on the same virtual line of the GPG in adjacent subgrating regions may, if necessary, be extended through the interface between the adjacent subgrating regions so as to combine and form single contiguous layout shape that spans the interface between the adjacent subgrating regions. For example, FIG. 2 shows layout shapes 250A and 250B extending through the interface between adjacent subgrating regions 222 and 224 so as to form a single layout shape 250.

It should be understood that a subgrating region is defined as a contiguous area within a layout of a portion of a given chip level in which layout shapes are aligned to a common subgrating. It should also be understood that a subgrating region can be defined to have an arbitrary shape. However, in one embodiment, an effort is made to define subgrating regions such that a minimal number of boundary segments are used to define a periphery of each subgrating region. Also, in one embodiment, when possible, layout shapes having related functions are grouped together within a subgrating region so as to maximize subgrating region area and minimize the number of boundary segments between adjacent subgrating regions. Moreover, it is likely that connection points utilizing the same subgrating will have related or identical functions. Also, in one embodiment, fill shapes neighboring a given subgrating region are placed in accordance with the given subgrating region so as to further maximize the area of the given subgrating region.

Figure 3A:
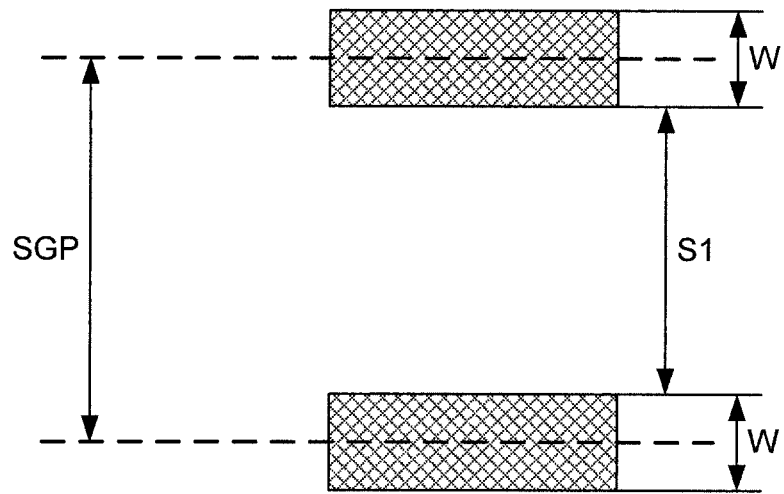
FIG. 3A shows an example in which a subgrating pitch results in a ratio of side-to-side spacing to layout shape width that is too large to maintain sufficient shape density for proper manufacturing.

When layout shapes are placed according to a subgrating, a situation may arise in which the subgrating pitch and the layout shape width result in a side-to-side spacing between adjacently placed layout shapes that is too large to ensure proper manufacturability of the layout shapes. FIG. 3A shows an example in which a subgrating pitch (SGP) results in a ratio of side-to-side spacing (S1) to layout shape width (W) that is too large to maintain sufficient shape density for proper manufacturing.

Figure 3B:
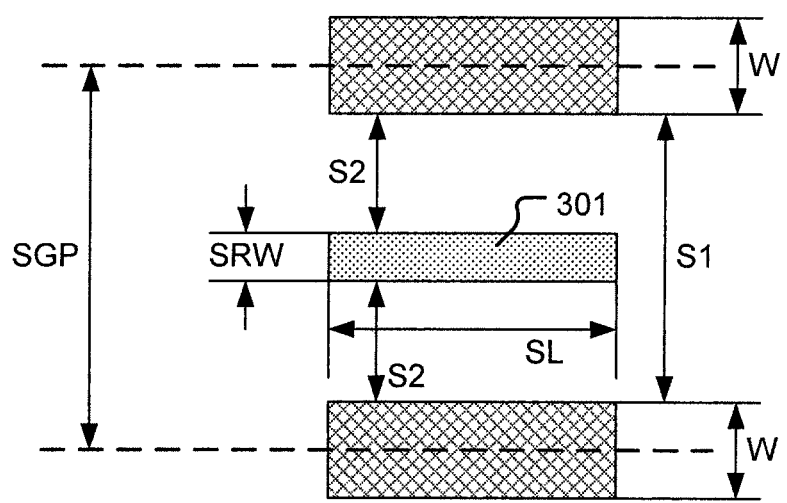
FIG. 3B shows a modification of the layout of FIG. 3A in which a subresolution shape is used to mitigate the unacceptably large side-to-side spacing to width ratio, in accordance with one embodiment of the present invention.

FIG. 3B shows a modification of the layout of FIG. 3A in which a subresolution shape 301 is used to mitigate the unacceptably large ratio (S1/W), in accordance with one embodiment of the present invention. The subresolution shape 301 is defined to have a width (SRW) that is small enough to ensure that subresolution shape 301 will not be manufactured. Also, the subresolution shape 301 is placed such that a side-to-side spacing (S2) with its neighboring layout shapes is optimized for manufacturability of the neighboring layout shapes. Also, in some embodiments, because the width (SRW) of the subresolution shape 301 primarily governs whether or not the subresolution shape 301 will actually resolve, i.e., be manufactured, a length (SL) of the subresolution shape 301 can be made as large as necessary without increasing a likelihood that the subresolution shape 301 is inadvertently manufactured. The presence of the subresolution shape 301 will serve to enhance manufacturability of its neighboring layout shapes during a lithographic manufacturing process. It should be understood, however, that subresolution shapes are not intended to be manufactured and should not be placed or sized to cause their manufacture. Moreover, the likelihood of subresolution shape being manufactured can be dependent upon a layout shape density in its surrounding neighborhood. Therefore, the placement and sizing of a given subresolution shape should consider the layout shape density around the given subresolution shape.

In one embodiment, a subresolution shape can be placed within a subgrating region without regard to the corresponding subgrating for the purpose of enhancing manufacturability of layout shapes within the subgrating region. In another embodiment, a subresolution shape can be placed within a subgrating region in accordance with the corresponding subgrating for the purpose of enhancing manufacturability of layout shapes within the subgrating region.

Figure 4:
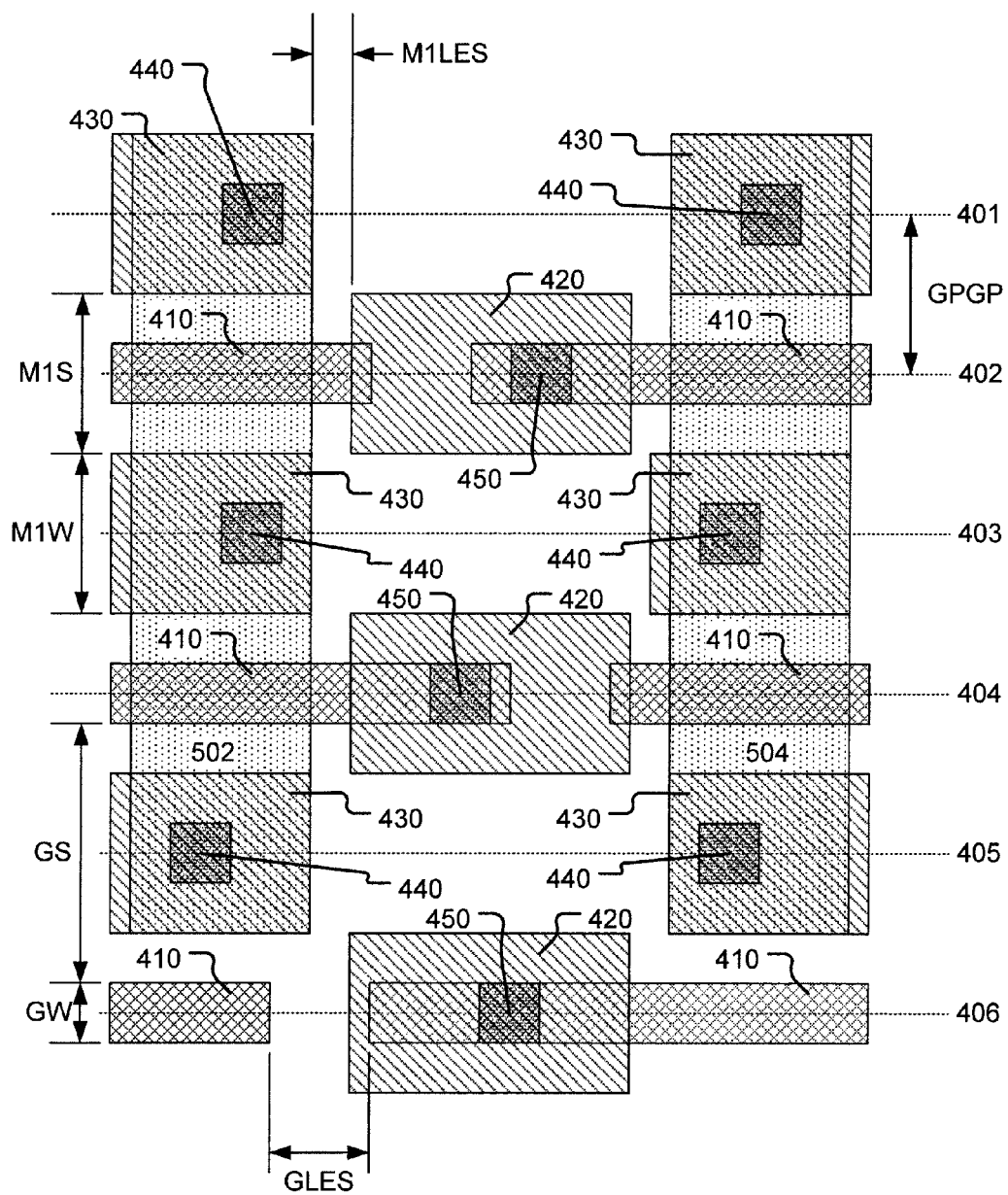
FIG. 4 shows an example layout in which a GPG is used to place layout shapes for gate electrode wires, interconnect wires, diffusion contacts, and gate contacts, in accordance with one embodiment of the present invention.

FIG. 4 shows an example layout in which a GPG is used to place layout shapes for gate electrode wires ("gates" hereafter), interconnect wires, diffusion contacts, and gate contacts, in accordance with one embodiment of the present invention. The GPG is defined by virtual lines 401-406 evenly spaced at GPG pitch (GPGP). Gate wires 410 are placed according to a subgrating SG-A within the gate chip level that includes every other even numbered virtual line of the GPG (GPG virtual lines 402, 404, 406), such that the corresponding subgrating pitch is 2*GPGP. Interconnect wires 420 are also placed according to the subgrating SG-A within a given interconnect chip level that includes every other even numbered virtual line of the GPG (GPG virtual lines 402, 404, 406). Interconnect wires 430 are placed according to a subgrating SG-B within the given interconnect chip level that includes every other odd numbered virtual line of the GPG (GPG virtual lines 401, 403, 405), such that the corresponding subgrating pitch is 2*GPGP. Diffusion contacts 440, i.e., source/drain contacts, are also placed according to the subgrating SG-B within the diffusion contact chip level that includes every other odd numbered virtual line of the GPG (GPG virtual lines 401, 403,

405). Gate contacts 450 are placed according to the subgrating SG-A within the gate contact chip level that includes every other even numbered virtual line of the GPG (GPG virtual lines 402, 404, 406).

In one embodiment, layout shapes and subgratings within a portion of a given chip level are defined to enable use of substantially uniform layout shapes widths, substantially uniform layout shape side-to-side spacings, and substantially uniform layout shape end-to-end spacings. For example, the embodiment of FIG. 4 shows use of a substantially uniform interconnect wire layout shape width (M1W) within the illustrated portion of the interconnect chip level. Also, FIG. 4 shows use of a substantially uniform interconnect layout shape side-to-side spacing (M1S) within the illustrated portion of the interconnect chip level. Also, FIG. 4 shows use of a substantially uniform interconnect layout shape end-to-end spacing (M1LES) within the illustrated portion of the interconnect chip level.

Additionally, FIG. 4 shows use of a substantially uniform gate wire layout shape width (GW) within the illustrated portion of the gate chip level. Also, FIG. 4 shows use of a substantially uniform gate layout shape side-to-side spacing (GS) within the illustrated portion of the gate chip level. Also, FIG. 4 shows use of a substantially uniform gate layout shape end-to-end spacing (GLES) within the illustrated portion of the gate chip level. In various embodiments, extension of a layout shape size through stretching of one or more of the layout shape's edges can be used to achieve the substantially constant layout shape widths, side-to-side spacings, and end-to-end spacings. Moreover, although manufacturing benefits (such as in lithography processes) may be achieved by using substantially constant layout shape widths, side-to-side spacings, and end-to-end spacings, it should be understood that use of GPGs, subgratings, and subgrating regions does not require use of substantially constant layout shape widths, side-to-side spacings, and end-to-end spacings.

Figure 5:
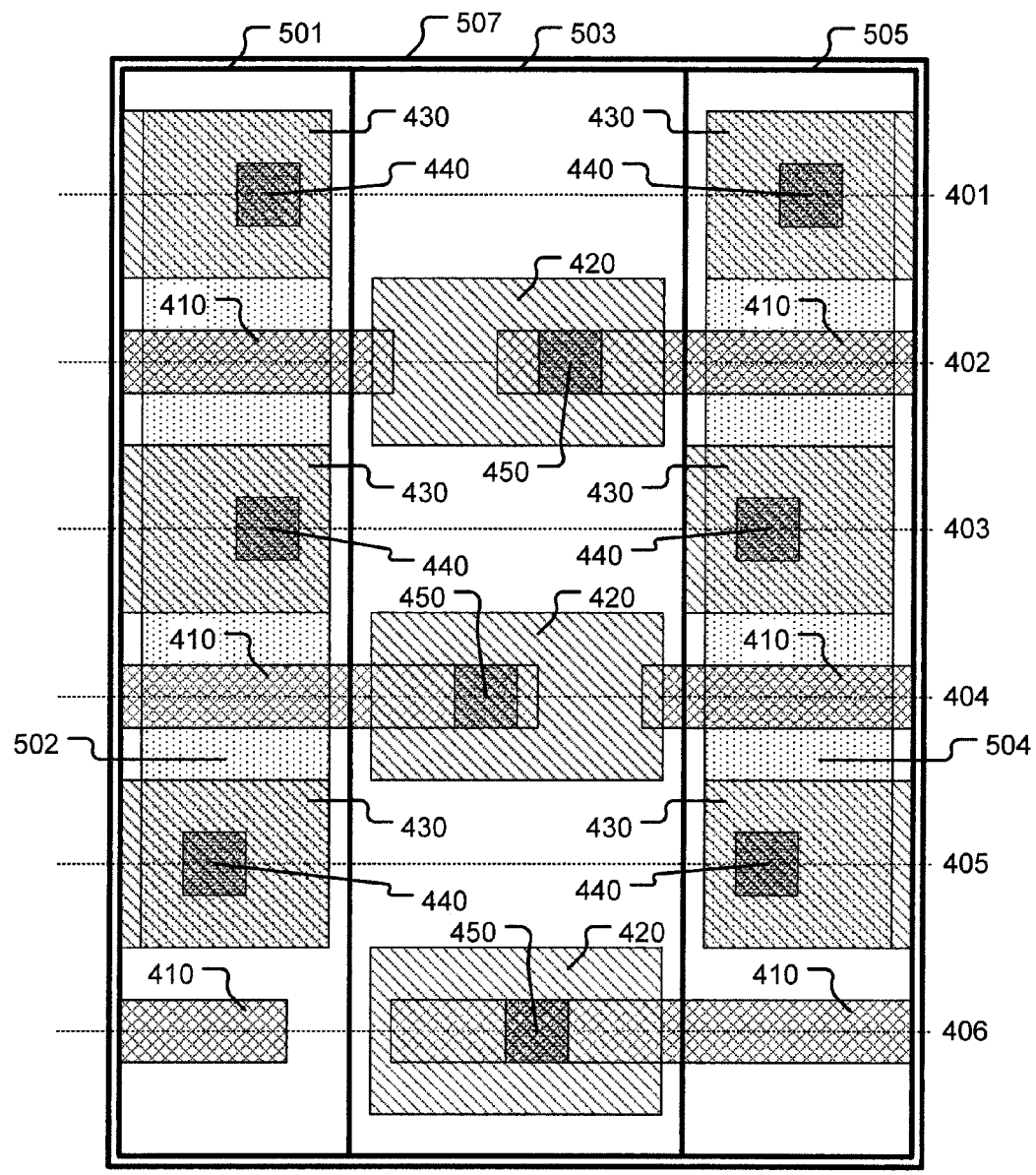
FIG. 5 shows an extension of the exemplary layout of FIG. 4 in which a number of subgrating regions are defined in various chip levels, in accordance with one embodiment of the present invention.

FIG. 5 shows an extension of the exemplary layout of FIG. 4 in which a number of subgrating regions are defined in various chip levels, in accordance with one embodiment of the present invention. A diffusion level of the exemplary layout includes diffusion regions 502 and 504. A gate level of the exemplary layout includes the gate wire layout shapes 410. A single subgrating region 507 is defined for the gate level, with the subgrating SG-A allocated thereto. Three subgrating regions 501, 503, 505 are defined for each of the diffusion contact level, gate contact level, and interconnect level with the subgratings SG-B, SG-A, SG-B allocated thereto, respectively. Therefore, each of the chip levels of the exemplary layout of FIG. 5 is partitioned into a number of subgrating regions, wherein each of these subgrating regions is defined as a contiguous area within the layout.

FIG. 5 also illustrates how layout shapes of related function can be placed together within a common subgrating region. For example, diffusion contacts 440 and their associated interconnect wires 430 are placed together in each of subgrating regions 501 and 505 in accordance with subgrating SG-B. Also, gate contacts 450 and their associated interconnect wires 420 are placed together in subgrating region 503 in accordance with subgrating SG-A. The gate wires 410 are placed in subgrating region 507 in accordance with subgrating SG-A. Based on the example of FIG. 5, it should be appreciated that allocation of a properly defined subgrating to a given subgrating region provides for placement of layout shapes having a common run length within the given subgrating region.

A layout shape in one subgrating region of a given chip level can connect with another layout shape in an adjacent subgrating region of the given level when the two layout shapes are placed along the same virtual line of the GPG, thereby forming a larger shape that traverses across the interface between the adjacent subgrating regions. This is illustrated above with regard to layout shapes 250A and 250B of FIG. 2 combining to form layout shape 250. Therefore, a layout shape can be defined to cross from one subgrating region to an adjacent subgrating region in a given level when the different subgratings in the adjacent subgrating regions align to a common GPG virtual line.

Figure 6:
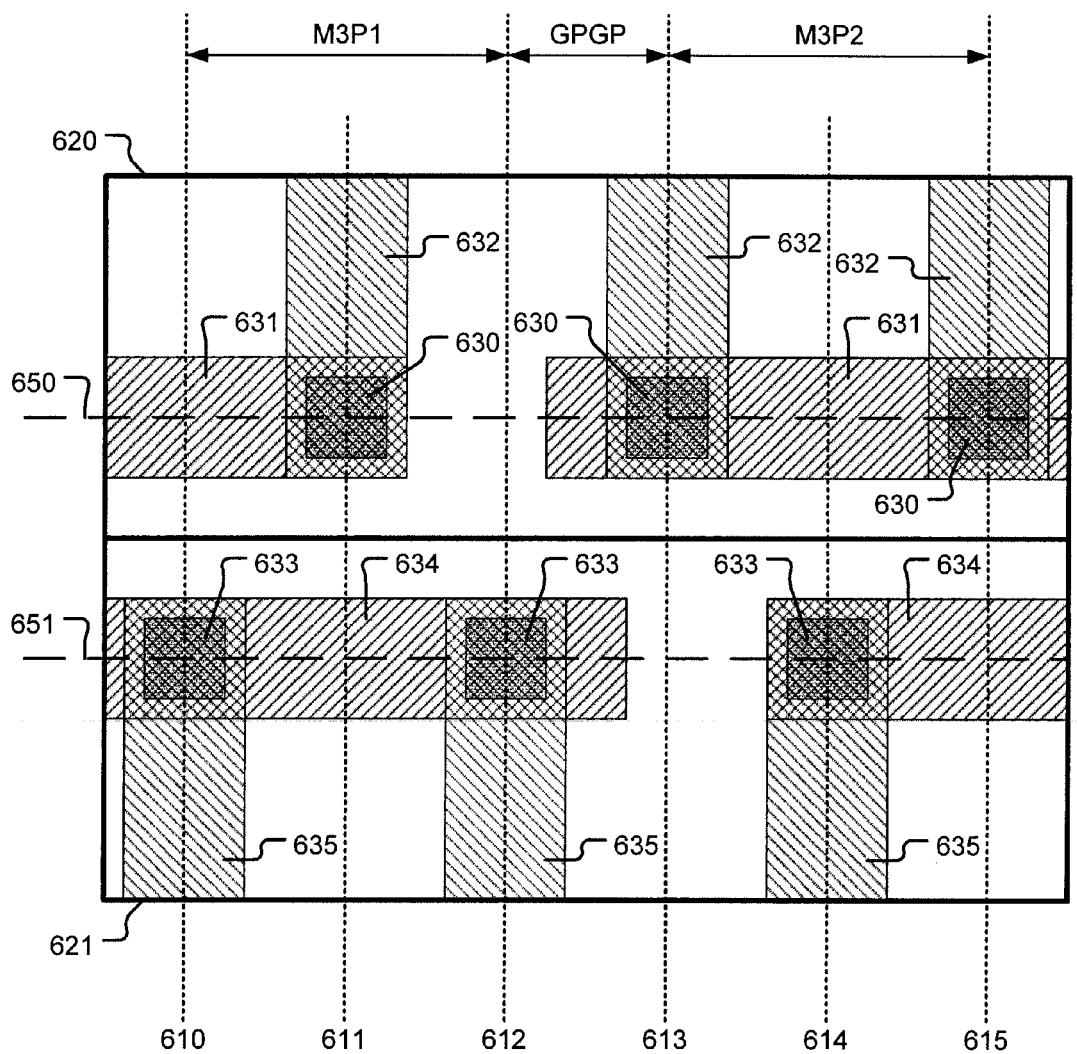
FIG. 6 shows an example layout that illustrates subgrating use among different vertically stacked chip levels, in accordance with one embodiment of the present invention.

The techniques described herein may be generalized to enable pattern regularity for any number of chip levels that are partitioned into subgrating regions. FIG. 6 shows an example layout that illustrates subgrating use among different vertically stacked chip levels, in accordance with one embodiment of the present invention. As shown in FIG. 6, a metal-3 subgrating region 620 includes vias 630 that connect to metal-2 wires 631 centered on horizontal GPG virtual line 650. The vias 630 and metal-3 wires 632 that overlap them are centered on odd numbered vertical GPG virtual lines 611, 613, 615, respectively, and have a horizontal pitch M3P2 that is twice the vertical GPG pitch GPG2. In another metal-3 subgrating region 621, vias 633 that connect to metal-2 wires 634 are centered on horizontal GPG virtual line 651, and the metal-3 wires 635 that overlap them are centered on even numbered vertical GPG virtual lines 610, 612, 614, respectively, and have a horizontal pitch M3P1 that is twice the vertical GPG pitch GPG2.

Figure 7:
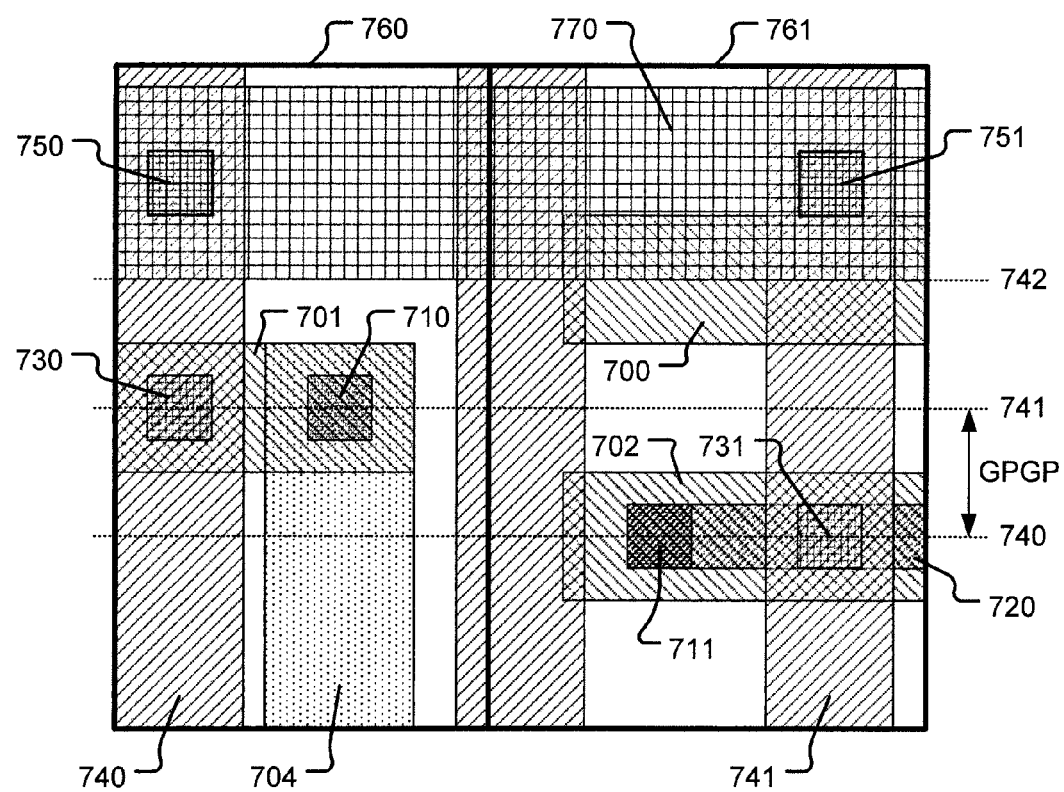
FIG. 7 shows an example layout in which a multi-level orthogonally routed connection is used to connect wires in a same chip level that cannot have a common run length, in accordance with one embodiment of the present invention.

FIG. 7 shows an example layout in which a multi-level orthogonally routed connection is used to connect wires in a same chip level that cannot have a common run length, in accordance with one embodiment of the present invention. Parallel metal-1 layout shapes 702, 701, 700 are centered on adjacent GPG virtual lines 740, 741, 742, respectively, and have insufficient clearance to run side-by-side, i.e., to have a common run length. Therefore, the metal-1 layout shapes 700, 701, 702 cannot traverse the boundary between the adjacent subgrating regions 760 and 761, and therefore cannot make a physical connection to each other within their chip level.

One solution is to use multiple chip levels with orthogonal routing directions to make the required connections. For example, as shown in FIG. 7, a diffusion shape 704 is connected to gate wire 720 by connecting through each of diffusion contact 710, metal-1 wire 701, via 730, metal-2 wire 740, via 750, metal-3 wire 770, via 751, metal-2 wire 741, via 731, metal-1 wire 702, and contact 711. This multiple chip level orthogonal routing connection solution can be generalized to form connections when layout shapes on a given level cannot traverse a subgrating region boundary that crosses their routing direction, i.e., when layout shapes on a given level cannot have a common run length.

Figure 8:
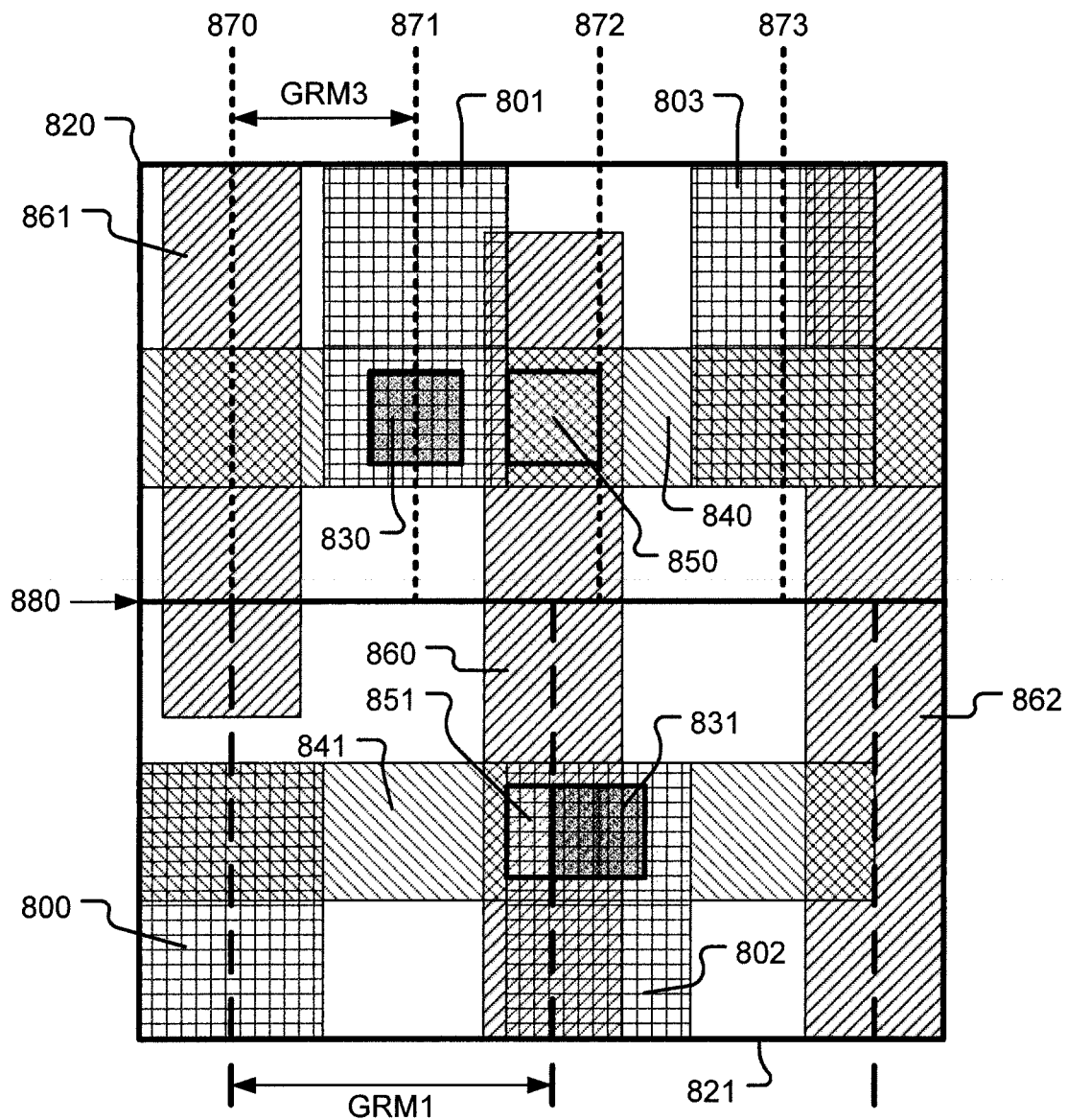
FIG. 8 shows another example layout in which a multi-level orthogonally routed connection is used to connect wires in a same chip level that cannot have a common run length, in accordance with one embodiment of the present invention.

FIG. 8 shows another example layout in which a multi-level orthogonally routed connection is used to connect wires in a same chip level that cannot have a common run length, in accordance with one embodiment of the present invention. Parallel metal-3 wires 800-803 centered on adjacent GPG lines 870-873 cannot traverse the boundary 880 between metal-3 subgrating regions 820 and 821. Therefore, due to the boundary 880, a direct connection cannot be made between metal-3 wires 801 and 802. However, a connection can be made between metal-3 wires 801 and 802 by connecting through each of the following elements: via 830, metal-2 wire 840, via 850, metal-1 wire 860, via 851, metal-2 wire 841, and via 831. FIG. 8 also shows that wires on different levels with identical routing directions such as metal-1 wires 860-862 and metal-3 wires 800-803 may be centered on different GPGs such as the GPG with pitch GRM3 for metal-3 and the GPG with pitch GRM1 for metal-1.

In one embodiment, the GPG and subgrating region techniques described above can be used to enforce the following layout shape pattern regularity conventions that are beneficial to manufacturing: 1) layout shapes are rectangular, i.e., linear-shaped, 2) wire layout shape pitch is substantially constant in the direction orthogonal to routing, 3) contact layout shape pitch is substantially constant in the direction orthogonal to routing, 4) wire layout shape width is substantially constant, 5) wire layout shape side-to-side spacing is substantially constant, 6) wire layout shape end-to-end spacing is substantially constant, and 7) overall layout shape density is as uniform as possible.

Figure 9A:
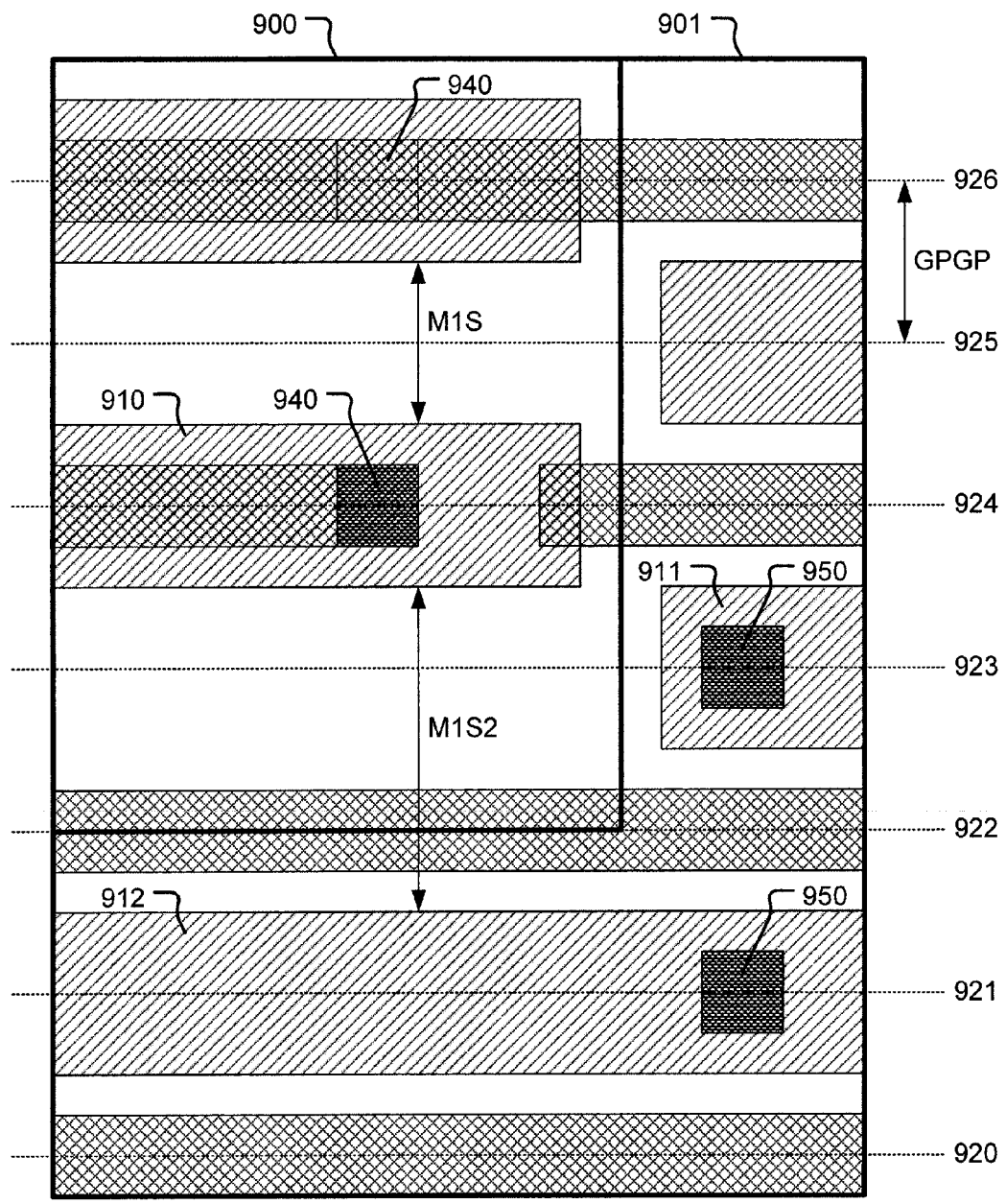
FIG. 9A shows an example layout that illustrates the occurrence of a non-standard spacing at an interface between adjacent subgrating regions, in accordance with one embodiment of the present invention.

FIG. 9A shows an example layout that illustrates the occurrence of a non-standard spacing at an interface between adjacent subgrating regions, in accordance with one embodiment of the present invention. In the example of FIG. 9A, a metal-1 subgrating region 900 that includes gate contacts 940 centered on even numbered GPG lines 924, 926, and a metal-1 subgrating region 901 that includes diffusion contacts 950 centered on odd GPG lines 921, 923. The metal-1 subgrating region 901 borders the metal-1 subgrating region 900 both vertically and horizontally. This introduces a non-standard spacing, M1S2, straddling the horizontal subgrating regional border located between the metal-1 wires 910 and 912.

Figure 9B:
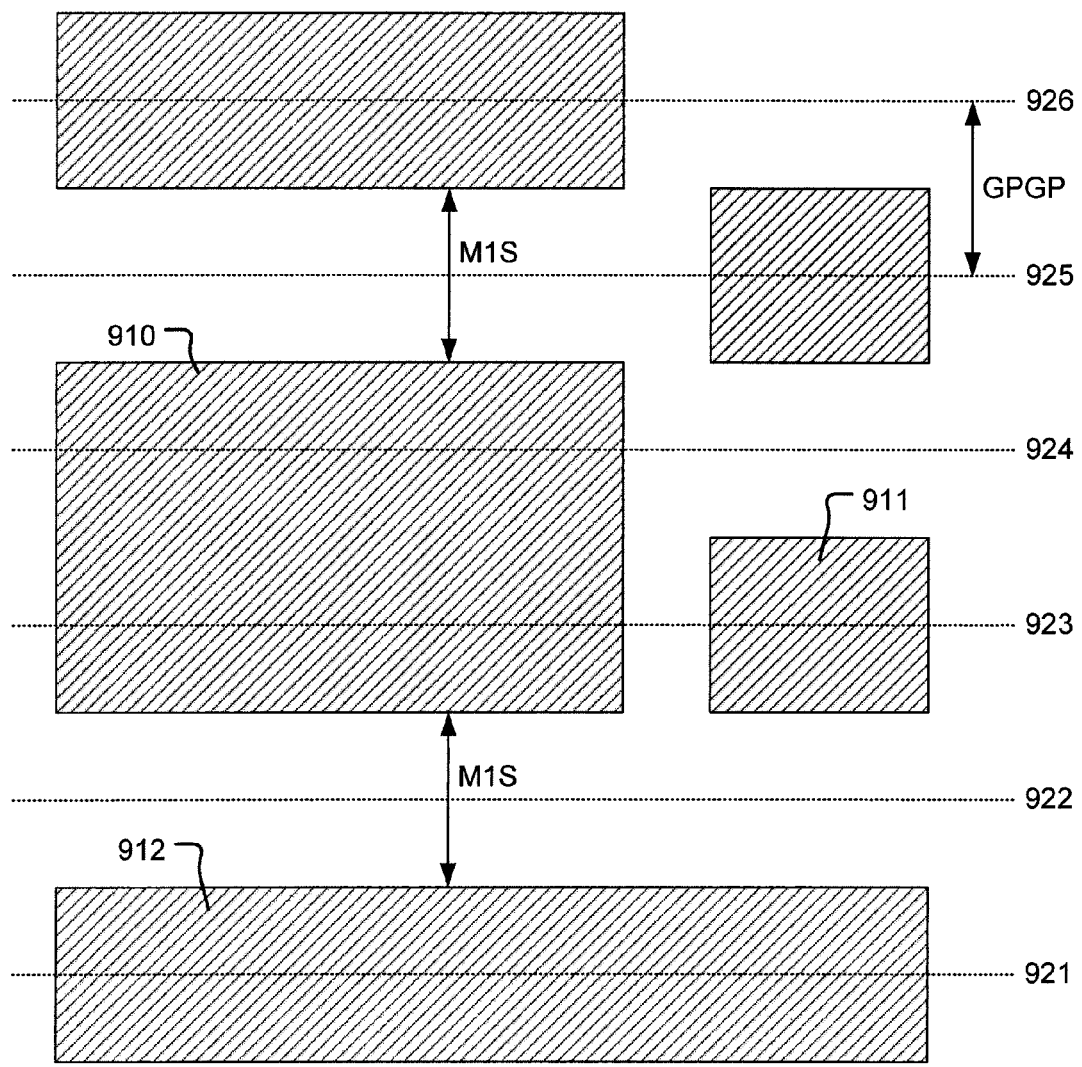
FIG. 9B shows a layout shape stretching technique for mitigating a non-standard spacing introduced at subgrating region borders that lie parallel to the routing direction, in accordance with one embodiment of the present invention.

FIG. 9B shows a layout shape stretching technique for mitigating a non-standard spacing introduced at subgrating region borders that lie parallel to the routing direction, in accordance with one embodiment of the present invention. The layout of FIG. 9B is a modified version of the metal-1 layout of FIG. 9A. In FIG. 9B, the edge of metal-1 wire 910 that faces the large gap is stretched until it is co-linear with the edge of a metal-1 wire 911, which faces the same gap but is centered on an alternate grating line 923. By stretching the metal-1 wire 910, wire spaces M1S are made constant, but the metal-1 wire 910 has non-standard width and is no longer centered on a GPG line. However, the stretching of the metal-1 wire 910 in favor of constant spacing provides an overall improvement in manufacturability.

Figure 10A:
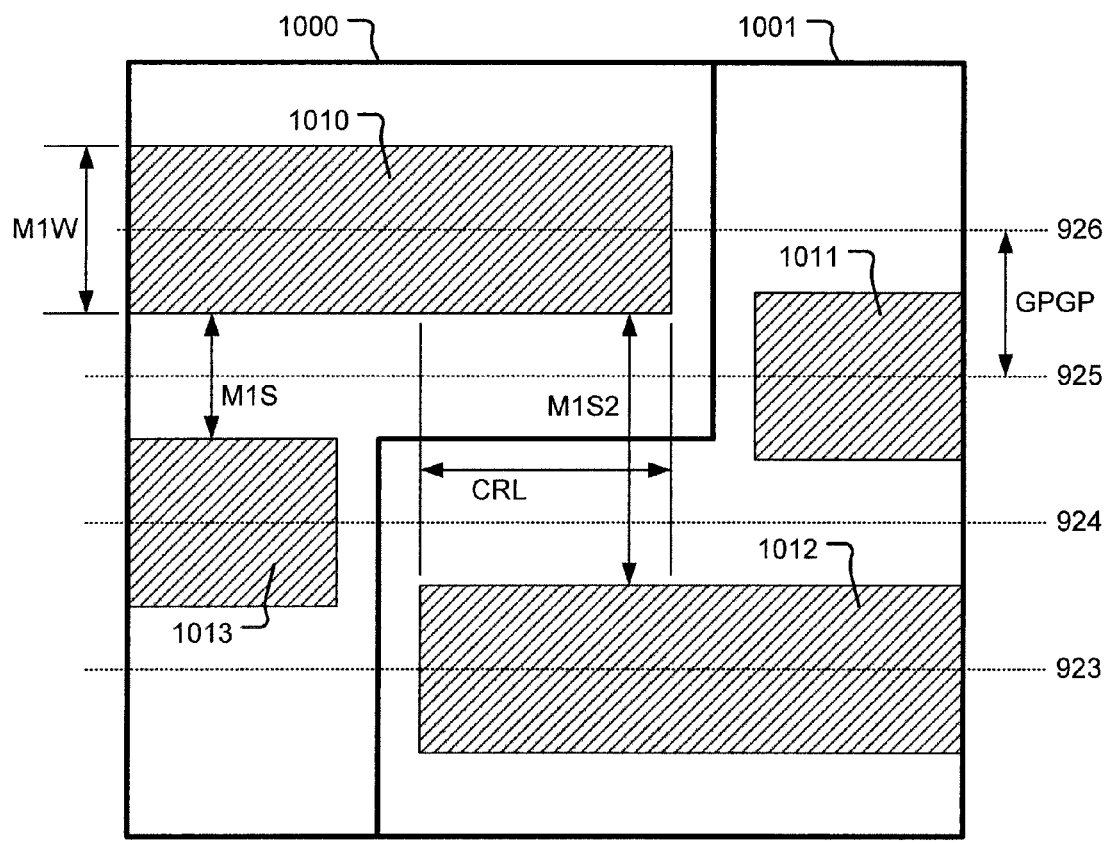
FIG. 10A shows an example layout that illustrates the occurrence of a non-standard spacing at an interface between adjacent subgrating regions, when the layout shape stretching technique of FIG. 9B is blocked, in accordance with one embodiment of the present invention.

FIG. 10A shows an example layout that illustrates the occurrence of a non-standard spacing at an interface between adjacent subgrating regions, when the layout shape stretching technique of FIG. 9B is blocked, in accordance with one embodiment of the present invention. In FIG. 10A, layout shape 1010 in subgrating region 1000 runs parallel to a layout shape 1012 in subgrating region 1001, wherein layout shapes 1010 and 1012 are aligned to different subgratings. The non-standard gap M1S2 extends along the common run length CRL of layout shapes 1010 and 1012. The layout shape 1010 cannot be stretched toward the layout shape 1012 to reduce M1S2 because it is blocked by another layout shape 1013 in the same subgrating region 1000.

Due to the application of a GPG and fixed layout shape widths, M1S2 is most likely limited to a fixed value. In the example of FIG. 10A, M1S2=3*GPGP−M1W. More specifically, the fixed value for M1S2 applies to regions of the chip that share the same GPGP and M1W values. Thus, it should be appreciated that even when non-standard gaps, e.g., M1S2, cannot be mitigated through layout shape modification (such as layout shape stretching), specification of a constant GPGP value and of a limited number of layout shape widths, e.g., M1W, will serve to limit the corresponding number of non-standard gap values that may occur in the layout. For instance, in the example of FIG. 10A, use of the constant GPGP value and the single layout shape width M1W serves to limit the number of non-standard gap values to one, i.e., to the M1S2 value. Therefore, through specification of a constant GPGP value and of a limited number of layout shape widths it is possible to optimize manufacturing processes to account for a controlled number of non-standard spacings that may occur in the layout. In contrast, it should be appreciated that such manufacturing process optimization is not feasible when an uncontrolled number of non-standard layout shape spacings may occur in a given layout.

Figure 10B:
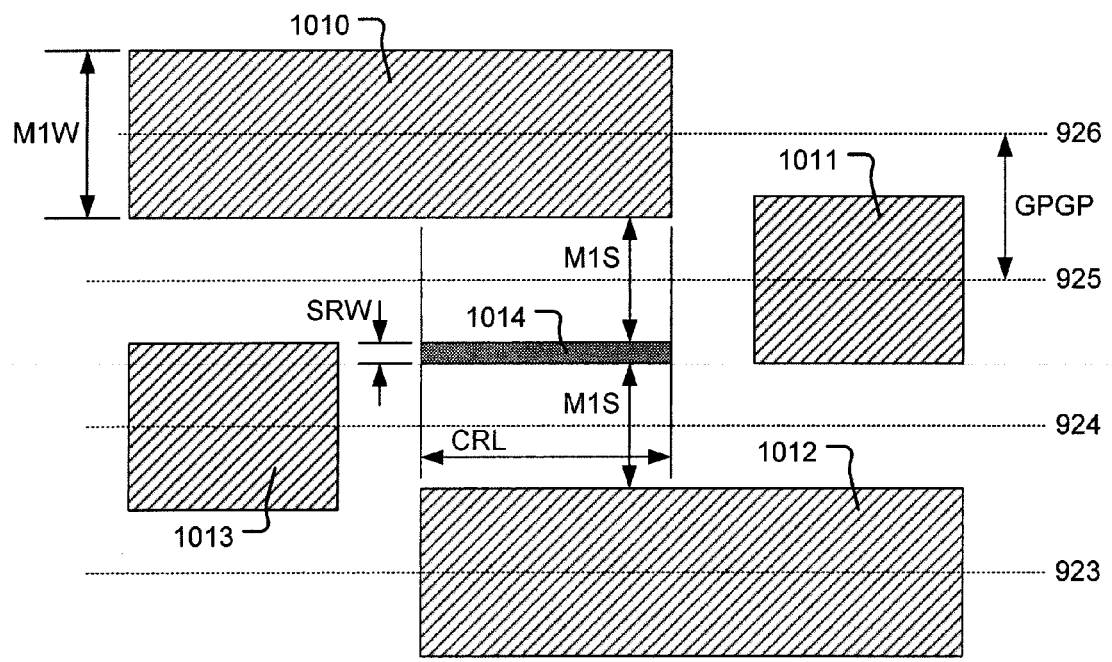
FIG. 10B illustrates use of a subresolution shape to mitigate a non-standard spacing at an interface between adjacent subgrating regions, when the layout shape stretching technique of FIG. 9B is blocked, in accordance with one embodiment of the present invention.

FIG. 10B illustrates use of a subresolution shape to mitigate a non-standard spacing at an interface between adjacent subgrating regions, as an alternative to the layout shape stretching technique of FIG. 9B is blocked, in accordance with one embodiment of the present invention. The layout of FIG. 10B is a modified version of the layout of FIG. 10A. In FIG. 10B, a subresolution layout shape 1014 is placed within the area corresponding to the non-standard spacing. As with the previous subresolution layout shape description of FIG. 3B, a width (SRW) of the subresolution layout shape 1014 should be small enough to ensure that the subresolution layout shape 1014 is not manufactured. It should be appreciated that overall layout shape density and layout shape side-to-side spacing M1S can be made substantially uniform through use of this subresolution layout shape insertion technique. It should be understood, however, that in some embodiments the presence of a non-standard spacing at subgrating region boundaries is acceptable and does not require mitigation.

Figure 11:
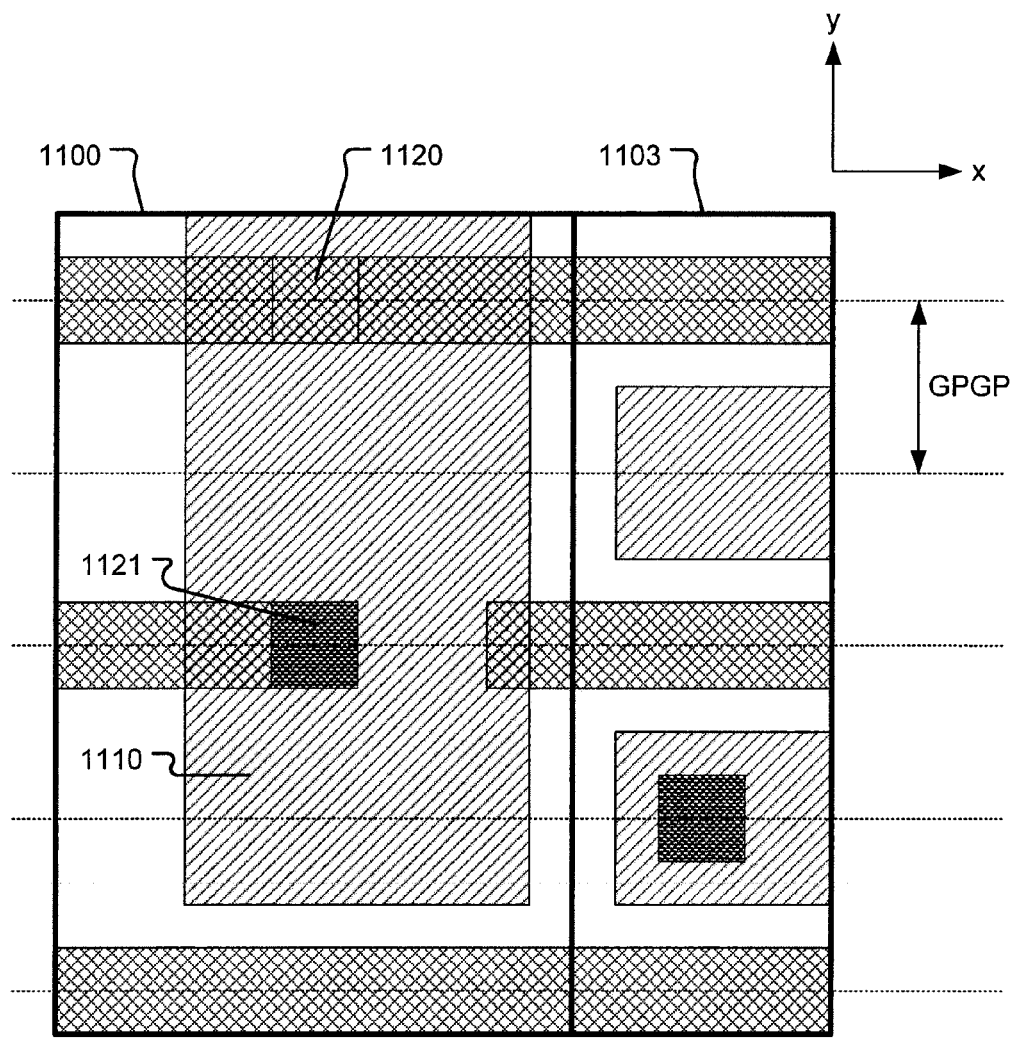
FIG. 11 shows an exemplary layout in which a layout shape is stretched to overlap multiple contacts and/or vias, in accordance with one embodiment of the present invention.

FIG. 11 shows an exemplary layout in which a layout shape is stretched to overlap multiple contacts and/or vias, in accordance with one embodiment of the present invention. In one embodiment, a linear layout shape of a wire can be stretched orthogonally to its preferred routing direction so that it overlaps multiple contacts and/or vias. For example, FIG. 11 shows a metal-1 wire 1110 having a preferred horizontal routing direction, i.e., preferred x-direction of routing. The metal-1 wire 1110 is placed in a subgrating region 1100 that is defined adjacent to a subgrating region 1103. The metal-1 wire 1110 needs to connect to each of contacts 1120 and 1121. While the metal-1 wire 1110 may have been initially placed in a centered manner on a GPG virtual line, the metal-1 wire 1110 is stretched orthogonal to its preferred routing direction, i.e., is stretched in the y-direction, so as to cover both of contacts 1120 and 1121. It should be understood that the linear layout shape stretching technique, exemplified by the metal-1 wire 1110 of FIG. 11, can be generalized to facilitate connection of layout shapes within different chip levels, within different subgrating regions of a given chip level, or within a same subgrating region of a given chip level.

Figure 12:
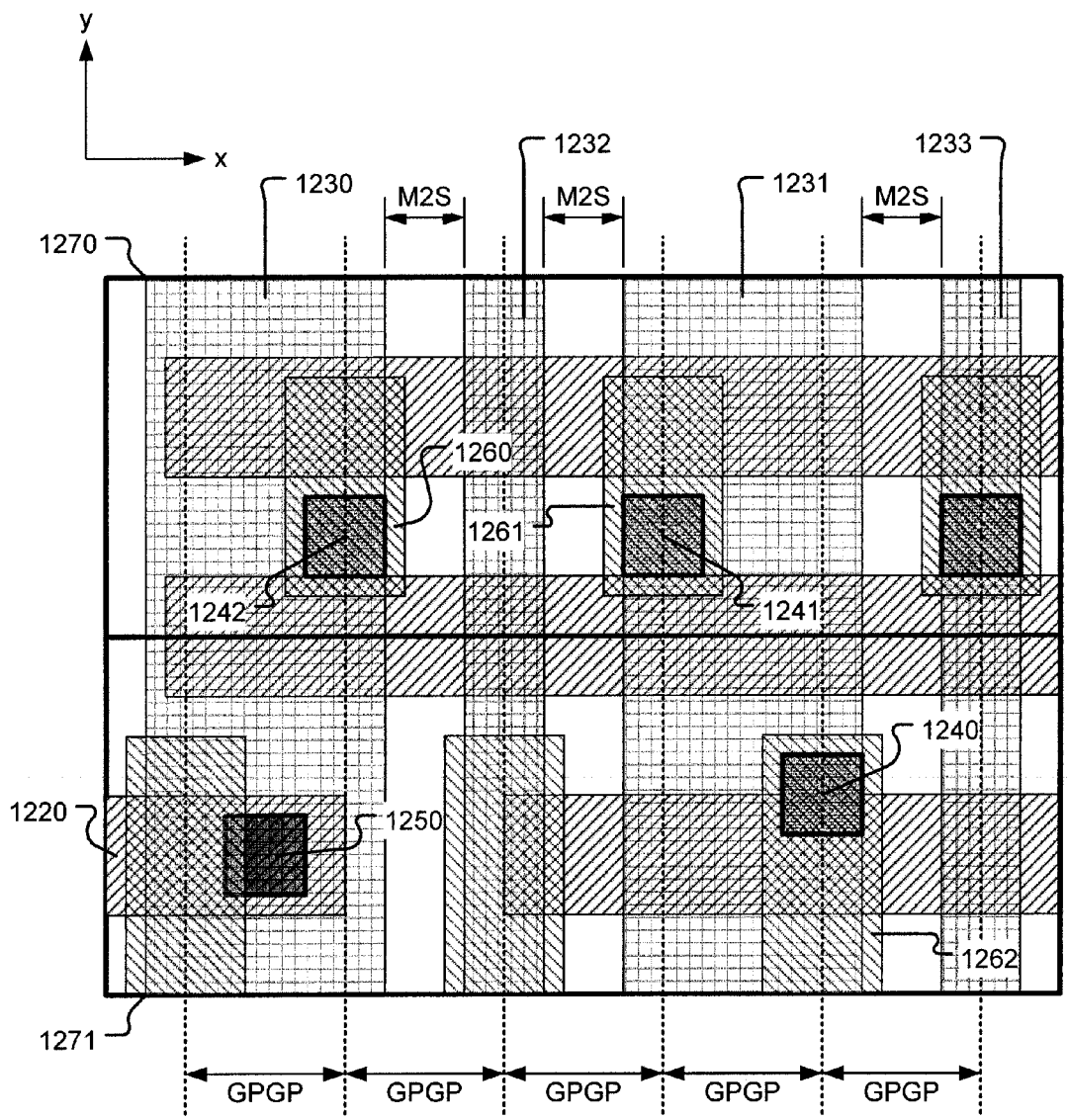
FIG. 12 shows another example in which layout shapes are stretched to overlap multiple contacts and/or vias, in accordance with one embodiment of the present invention.

FIG. 12 shows another example in which layout shapes are stretched to overlap multiple contacts and/or vias, in accordance with one embodiment of the present invention. In FIG. 12, a metal-2 wire layout shape 1231 is stretched in the x-direction, i.e., widened, such that both of its edges maintain a standard spacing M2S to adjacent wire layout shapes 1232 and 1233, and such that it overlaps and connects with a via 1240 and a via 1241. In this manner, the metal-2 wire 1231 serves to connect a metal-3 wire 1261 in a metal-3 subgrating region 1270 to a metal-3 wire 1262 in a metal-3 subgrating region 1271. Also, a metal-2 wire layout shape 1230 is similarly widened to overlap and connect with a via 1250 and a via 1242, which are respectively connected to a metal-1 wire 1220 and a metal-3 wire 1260.

Figure 13:
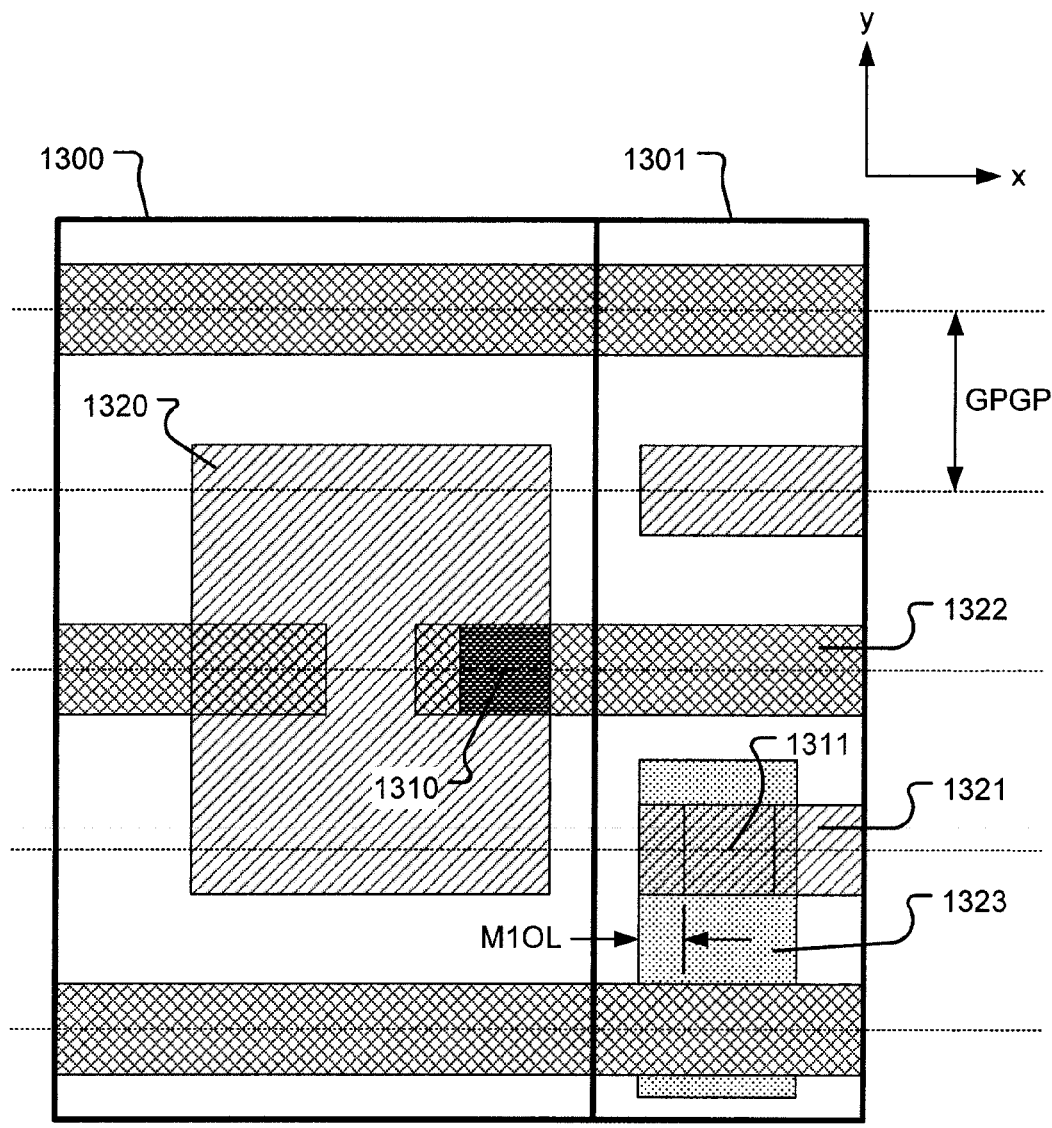
FIG. 13 shows an example in which layout shapes are extended relative to a contact and/or via so as to accommodate design requirements, in accordance with one embodiment of the present invention.

FIG. 13 shows an example in which layout shapes are extended relative to a contact and/or via so as to accommodate design requirements, in accordance with one embodiment of the present invention. Two adjacent subgrating regions 1300 and 1301 are defined for a metal-1 chip level. A diffusion contact 1311 is defined to connect a diffusion region 1323 to a metal-1 wire 1321. The diffusion contact 1311 is covered by the metal-1 wire 1321 layout shape. Given a lack of metal-1 wire 1321 overlap of the contact 1311 in the y-direction, a horizontal extension M1OL of the metal-1 wire 1321 layout shape in the x-direction is provided to enable compliance with design rules. Also, a gate contact 1310 is defined to connect a gate wire 1322 to a metal-1 wire 1320. The metal-1 wire 1320 layout shape can be defined to minimally overlap the gate contact 1310 in the x-direction due to the significant overlap of the gate contact 1310 by the metal-1 wire 1320 layout shape in the y-direction.

It should be understood that the manufacturability benefits of layout techniques described herein are preserved if dimensions referred to as substantially constant are allowed to vary slightly, so long as general layout pattern regularity is preserved. In one embodiment, the following layout method can be used for chip levels that are to be routed according to a GPG that is defined by a pitch too small to allow for common run lengths of shapes placed on adjacent GPG virtual lines. First, subgratings are defined. In one embodiment, alternate GPG lines are used for alternate functions when defining the subgratings. Then, layout shapes are organized according to subgrating regions. In one embodiment, layout shapes that use the same set of GPG virtual lines are grouped together in subgrating regions. Multiple chip levels can be utilized to make connections between layout shapes of a given chip level when required due to fragmentation of those layout shapes at subgrating region boundaries within the given chip level.

Additionally, after initial layout shape placement, layout shapes can be stretched, i.e., widened, so as to maintain substantially constant side-to-side spacing where necessary, such as at subgrating region boundaries that run parallel to the preferred routing direction. In some instances, non-standard spaces between layout shapes at subgrating region boundaries can be accepted when those non-standard spaces are predictable and fixed. Also, in some instances, non-standard spaces between layout shapes at subgrating region boundaries can be partially filled using subresolution layout shapes. Moreover, in some instances, layout shapes neighboring non-standard spaces at subgrating region boundaries can be stretched so as to mitigate the non-standard spaces. Furthermore, a layout shape can be stretched, i.e., widened, in the direction orthogonal to its preferred routing direction so as to allow for connection of multiple overlapping contacts and/or vias to the layout shape. Also, a layout shape can be stretched, i.e., widened, in the direction orthogonal to its preferred routing direction so as to allow for reduction of contact and/or via overlap/extension by the layout shape in the direction parallel to its preferred routing direction.

Figure 14:
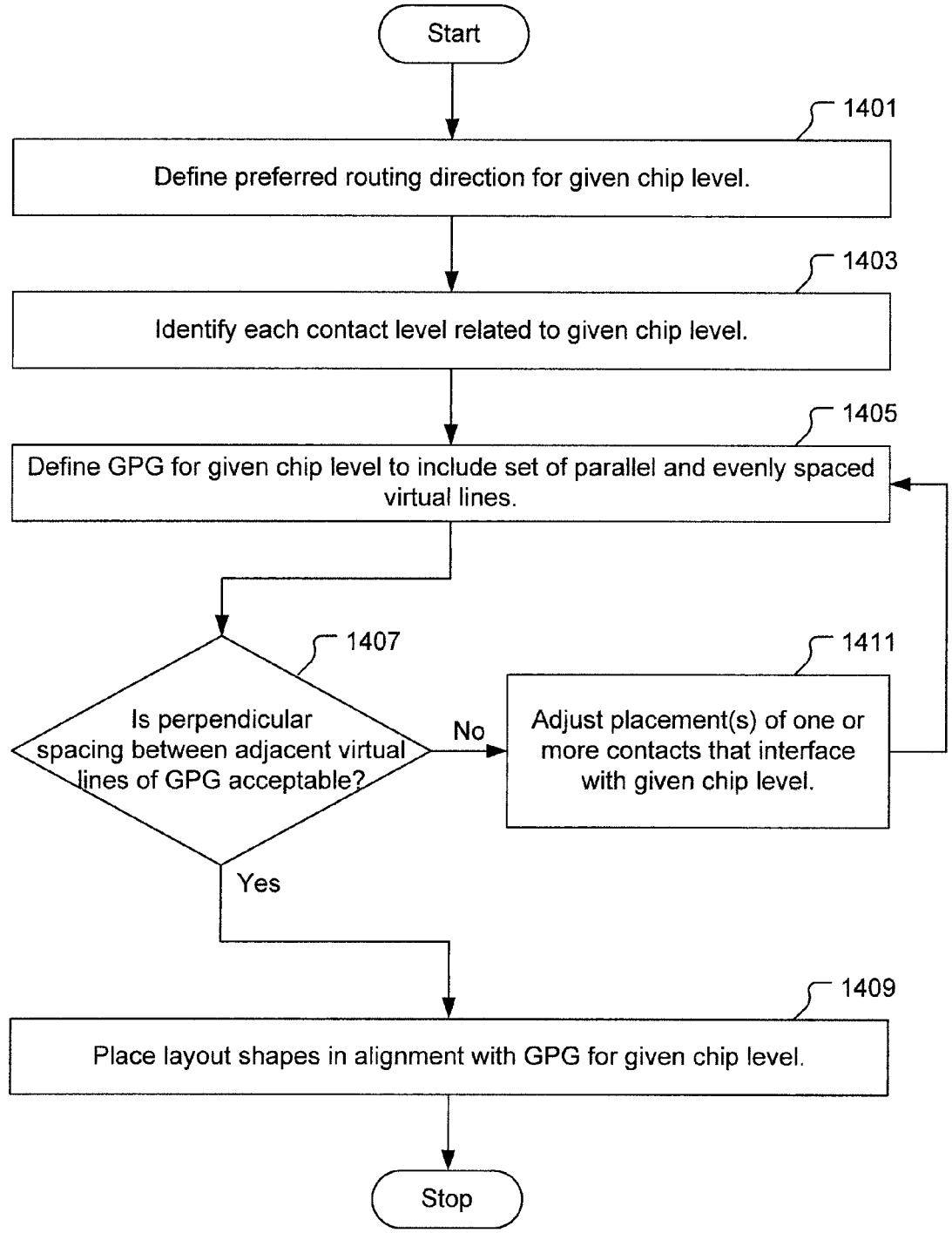
FIG. 14 shows a flowchart of a method for defining a layout for a portion of a given semiconductor chip level, in accordance with one embodiment of the present invention.

FIG. 14 shows a flowchart of a method for defining a layout for a portion of a given semiconductor chip level, in accordance with one embodiment of the present invention. The method includes an operation 1401 for defining a preferred routing direction for a given chip level. The method also includes an operation 1403 for identifying each contact level related to the given chip level, wherein such a related contact level includes at least one interfacing contact defined to physically connect with a structure corresponding to a layout shape to be placed in the given chip level. In various embodiments, contact levels related to the given chip level can include a gate contact level, a diffusion contact level, a via level, or a combination thereof.

The method further includes an operation 1405 for defining a global placement grating (GPG) for the given chip level to include a set of parallel and evenly spaced virtual lines. The GPG is defined such that at least one virtual line of the GPG is positioned to intersect each interfacing contact within each contact level that is related to the given chip level, as identified in operation 1403. An operation 1407 is then performed to determine whether a perpendicular spacing between adjacent virtual lines of the GPG, i.e., GPG pitch, provides for enforcement of layout shape pattern regularity within the given chip level as necessary to ensure manufacturability of layout shapes within the given chip level.

It should be understood that what constitutes sufficient layout shape pattern regularity can be dependent upon many factors, such as a critical dimension of structures to be defined in the chip, a spacing between structures to be defined in the chip, and/or a function of structures to be defined in the chip, among others. Thus, it should be understood that what constitutes sufficient layout shape pattern regularity can vary from one design to another. In one particular embodiment, enforcement of layout shape pattern regularity within a given chip level includes one or more of 1) a substantially constant layout shape width as measured perpendicular to the preferred routing direction, 2) a substantially constant spacing between adjacently placed layout shapes as measured perpendicular to the preferred routing direction, and 3) a substantially constant spacing between ends of adjacently placed layout shapes as measured parallel to the preferred routing direction. An example of this embodiment is illustrated in FIG. 4, as previously described.

If operation 1407 determines that the perpendicular spacing between adjacent virtual lines of the global placement grating is not acceptable, the method proceeds with an operation 1411 for adjustment of the placement(s) of one or more contacts that interface with the given chip level. Then, the method reverts back to operation 1405 and proceeds as described above.

If operation 1407 determines that the perpendicular spacing between adjacent virtual lines of the global placement grating is acceptable, the method proceeds with an operation 1409 in which layout shapes are placed in alignment with the GPG for the given chip level. In one embodiment, the layout shapes placed in alignment with the GPG are defined as linear layout shapes having a substantially rectangular cross-section when viewed in an as-drawn state. Also, in one embodiment, each linear layout shape is placed such that a length of its substantially rectangular cross-section is parallel with the preferred routing direction. Additionally, in one embodiment, each linear layout shape is initially placed such that its centerline extending in the preferred routing direction is substantially centered upon a virtual line of the GPG. It stood be understood, however, that after initial placement, some of the linear layout shapes may be stretched or otherwise modified to mitigate non-standard spacings within the layout so as to provide for sufficient layout shape pattern regularity as necessary to ensure manufacturability of layout shapes within the given chip level.

Figure 15A:
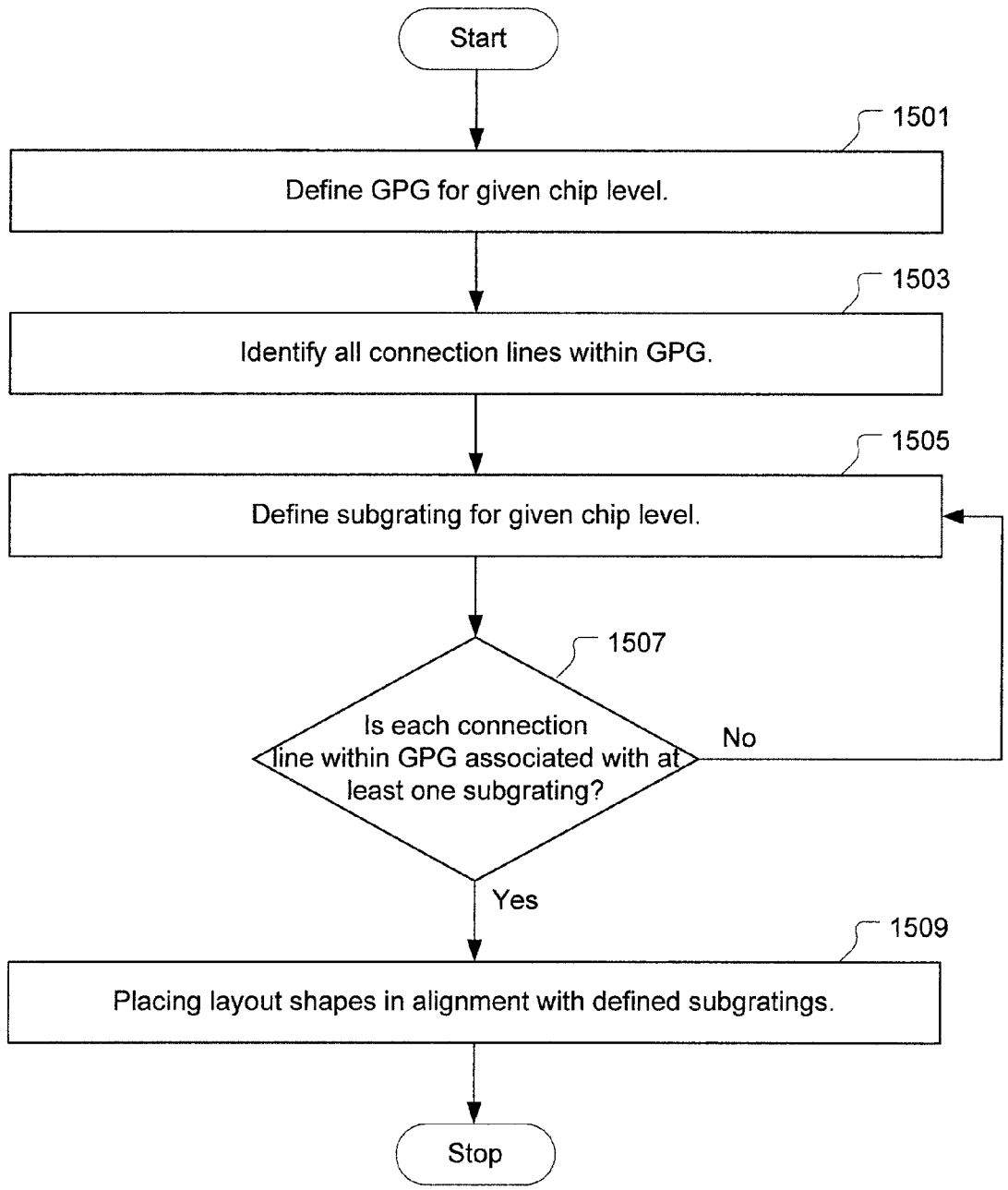
FIG. 15A shows a flowchart of a method for defining a layout for a portion of a given semiconductor chip level, in accordance with one embodiment of the present invention.

FIG. 15A shows a flowchart of a method for defining a layout for a portion of a given semiconductor chip level, in accordance with one embodiment of the present invention. The method includes an operation 1501 for defining a global placement grating (GPG) for a given chip level. The GPG is defined by a set of parallel and evenly spaced virtual lines. The method also includes an operation 1503 for identifying all connection lines within the GPG. A connection line is a virtual line of the GPG that is spatially coincident with a virtual line of a related contact level. A related contact level includes at least one contact that is defined to physically connect with a structure corresponding to a layout shape placed within the given chip level. The virtual lines of any given related contact level are defined as a set of parallel and equally spaced virtual lines to which contact layout shapes are aligned.

The method further includes an operation 1505 for defining a subgrating for the given chip level. A subgrating is defined as a set of evenly spaced connection lines, such that a spacing between adjacent connection lines in the subgrating is at least as large as a minimum spacing required to support a common run length of layout shapes on the adjacent connection lines in the subgrating. A common run length of two layout shapes occurs where the two layout shapes are placed in a side-by-side manner on adjacent connection lines in the subgrating. In one embodiment, defining a subgrating for a chip level includes associating the subgrating with a particular function to be performed by structures corresponding to layout shapes to be placed in accordance with the given subgrating. Also, in this embodiment, a perpendicular spacing between adjacent lines of the given subgrating is defined to accommodate placement of the layout shapes corresponding to the particular function.

Following operation 1505, the method proceeds with a decision operation 1507 for determining whether each connection line within the global placement grating is associated with at least one subgrating. If each connection line is not associated with at least one subgrating the method reverts back to proceed again with operation 1505. However, if each connection line is associated with at least one subgrating, the method proceeds with operation 1509 for placing layout shapes in alignment with the defined subgratings, such that each layout shape is associated with any one subgrating.

In one embodiment, each layout shape of the given chip level is placed in alignment with at least one subgrating for the given chip level and is defined as a linear layout shape having a substantially rectangular cross-section when viewed in an as-drawn state. Each linear layout shape is placed such that its lengthwise centerline extends parallel to the virtual lines of the GPG. Also, each linear layout shape is initially placed such that its lengthwise centerline is substantially centered upon a line of its subgrating.

Figure 15B:
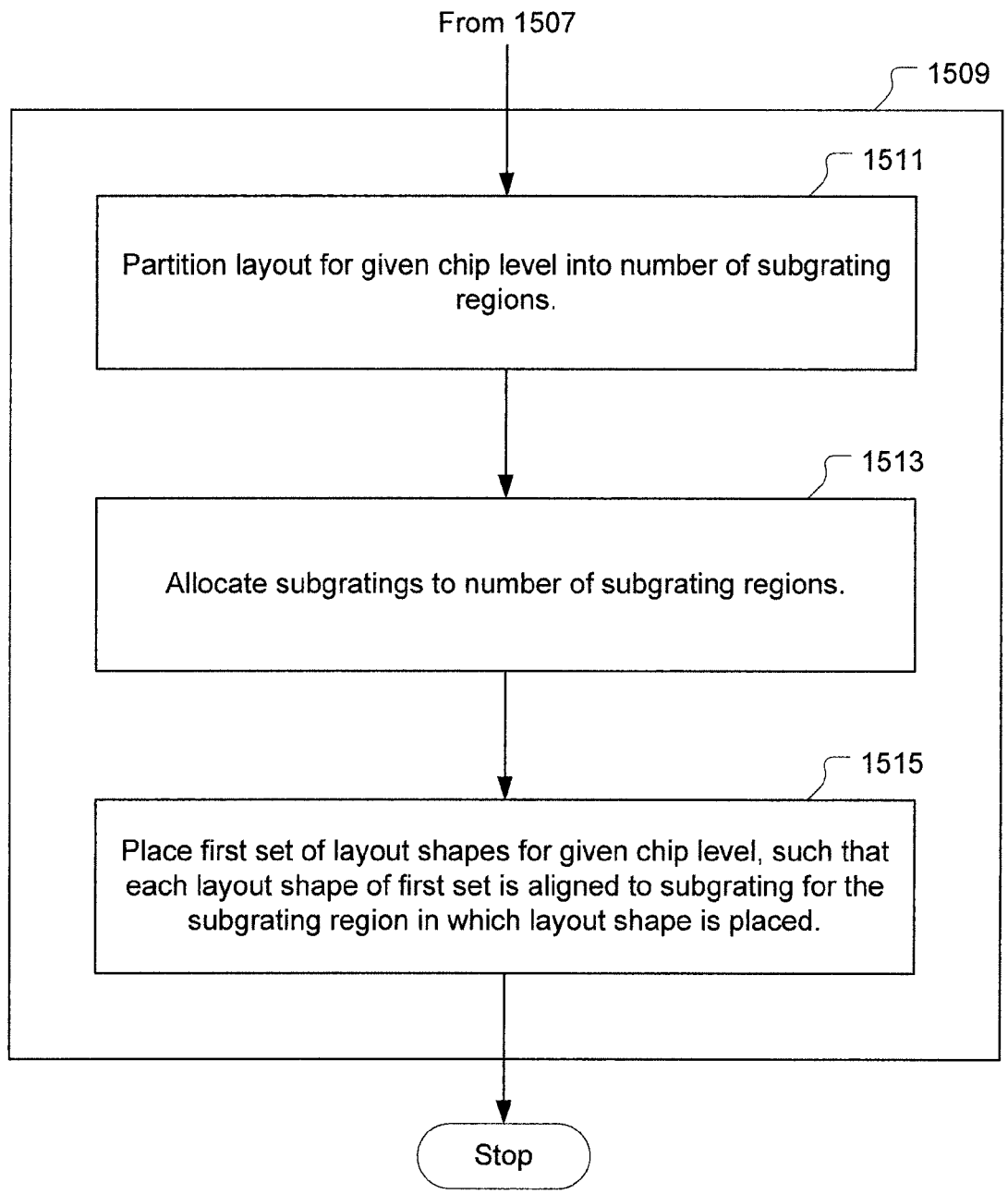
FIG. 15B shows an expanded view of operation 1509 of FIG. 15A, in accordance with one embodiment of the present invention.

FIG. 15B shows an expanded view of operation 1509, in accordance with one embodiment of the present invention. In an operation 1511, the layout for the given chip level is partitioned into a number of subgrating regions. Each subgrating region is defined as a contiguous area within the layout for the given chip level. An operation 1513 is performed to allocate subgratings to the number of subgrating regions, such that only one subgrating is allocated to any one subgrating region. It should be understood, however, that different subgrating regions can have different subgratings respectively allocated thereto. In one embodiment, each of the number of subgrating regions within the given chip level is defined such that a layout area of each subgrating region is made as large as possible while accommodating layout area requirements of every other subgrating region within the given chip level. Also in this embodiment, the subgrating regions within the given chip level are defined such that a minimal number of boundary segments are used to define a periphery of each subgrating region.

Once the subgrating regions are defined and have subgratings allocated thereto, the method proceeds with an operation 1515 for placing a first set of layout shapes for the given chip level. Each layout shape of the first set is aligned to the subgrating for the subgrating region in which the layout shape is placed. In one embodiment, each layout shape of the given chip level is placed according to the following specifications: 1) the layout shape is placed in alignment with at least one subgrating for the given chip level and is defined as a linear layout shape having a substantially rectangular cross-section when viewed in an as-drawn state, 2) the layout shape is placed such that its lengthwise centerline extends parallel to the virtual lines of the GPG, 3) the layout shape is initially placed such that its lengthwise centerline is substantially centered upon a line of its subgrating.

In one augmentation of the above-described embodiment, a particular linear layout shape of the given chip level is stretched in its widthwise direction extending perpendicular to the virtual lines of the GPG, after the initial placement of the particular linear layout shape, such that a structure corresponding to the particular linear layout shape will physically connect with multiple contacts (i.e., contacts and/or vias) within one or more related contact levels. An example of this is illustrated in FIG. 11 by the stretching of layout shape 1110 to cover and physically connect with contacts 1120 and 1121. In another augmentation of the above-described embodiment, a particular linear layout shape of the given chip level is stretched in its widthwise direction extending perpendicular to the virtual lines of the GPG, after the initial placement of the particular linear layout shape, such that a structure corresponding to the particular linear layout shape will sufficiently overlap one or more contacts (i.e., contacts and/or vias) within one or more related contact levels. An example of this is illustrated in FIG. 13 by the stretching of layout shape 1320 to sufficiently overlap contact 1310.

Additionally, in one embodiment, some layout shapes in adjacent subgrating regions that are placed on a common virtual line of the GPG are extended through a boundary between the adjacent subgrating regions so as to form a single contiguous layout shape. In yet another embodiment, two or more layout shapes respectively placed in adjacent subgrating regions of the given chip level and on different virtual lines of the GPG are electrically connected together by orthogonally routed structures that extend through multiple chip levels. In this embodiment, the subgratings of the adjacent subgrating regions may not accommodate a common run length of the two or more layout shapes.

Figure 15C:
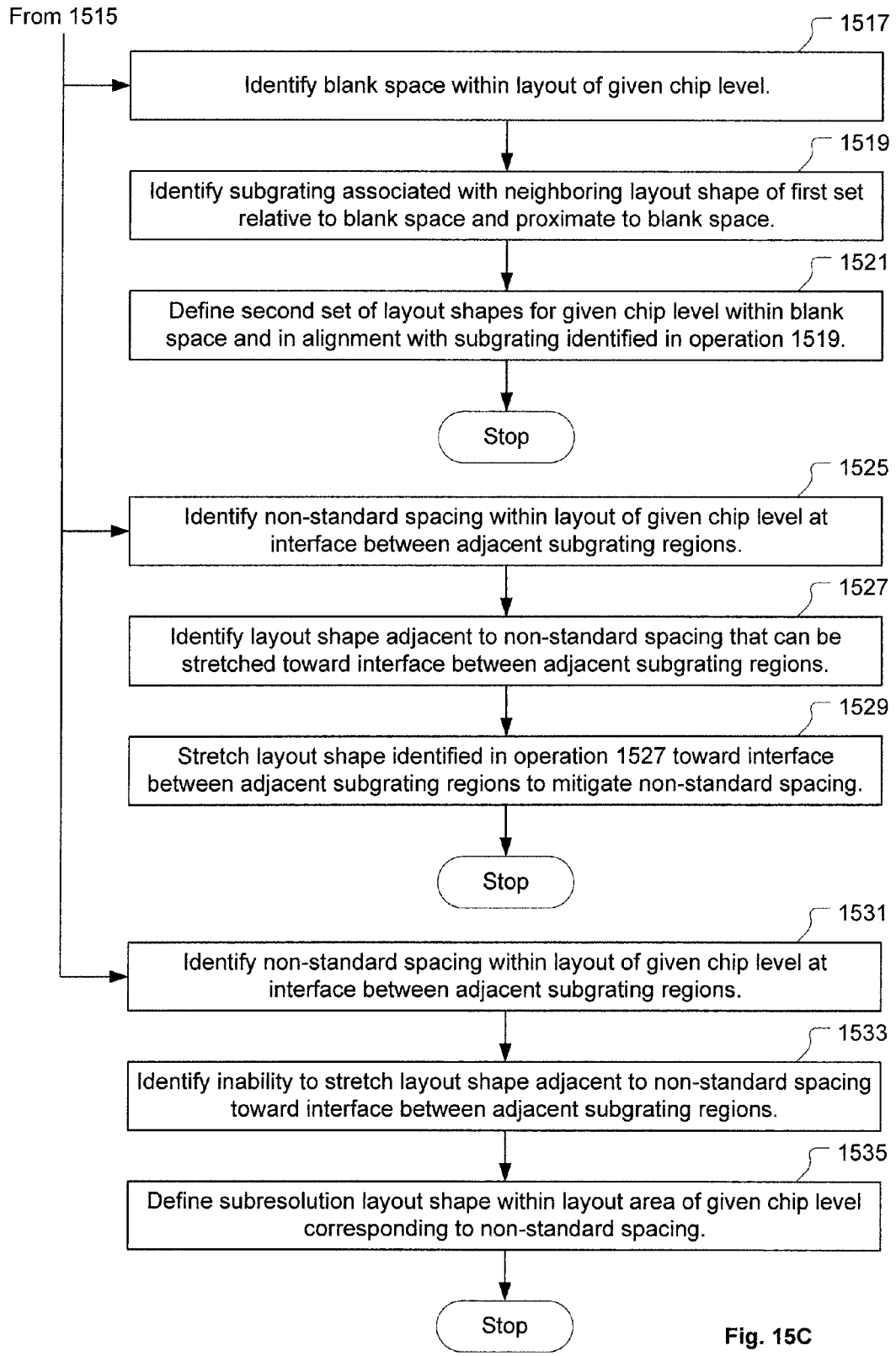
FIG. 15C shows an extension of the method of FIGS. 15A-15B, in accordance with various embodiments of the present invention.

FIG. 15C shows an extension of the method of FIGS. 15A-15B, in accordance with various embodiments of the present invention. In one embodiment, the method proceeds from operation 1515 with an operation 1517 for identifying a blank space within the layout of the given chip level. The blank space in this embodiment is identified as a spatial area within the layout of the given chip level at which a non-standard spacing exists between layout shapes of the first set as placed in operation 1515. The method then proceeds with an operation 1519 for identifying a subgrating associated with a neighboring layout shape of the first set relative to the blank space and proximate to the blank space. An operation 1521 is then performed to define a second set of layout shapes for the given chip level within the blank space. The second set of layout shapes are placed in alignment with the subgrating identified in operation 1519. The second set of layout shapes are defined within the blank space so as to optimize manufacturability of the first set of layout shapes. In one embodiment, operations 1517 through 1521 are repeated until each blank space within the given chip level has been considered for placement of one or more layout shapes of the second set therein.

In another embodiment, the method proceeds from operation 1515 with an operation 1525 for identifying a non-standard spacing within the layout of the given chip level at an interface between adjacent subgrating regions. The method then proceeds with an operation 1527 for identifying a layout shape adjacent to the non-standard spacing that can be stretched toward the interface between the adjacent subgrating regions. An operation 1529 is then performed to stretch the layout shape identified in operation 1527 toward the interface between the adjacent subgrating regions so as to mitigate the non-standard spacing. In one embodiment, the layout shape identified in operation 1527 is stretched within its subgrating region so as to align with another layout shape present in the adjacent subgrating region. In one embodiment the layout shape identified in operation 1527 is a linear layout shape and is stretched in its widthwise direction that extends perpendicular to the virtual lines of the GPG.

In yet another embodiment, the method proceeds from operation 1515 with an operation 1531 for identifying a non-standard spacing within the layout of the given chip level at an interface between adjacent subgrating regions. The method then proceeds with an operation 1533 for identifying an inability to stretch a layout shape adjacent to the non-standard spacing toward the interface between the adjacent subgrating regions. An operation 1535 is then performed to define a subresolution layout shape within a layout area of the given chip level corresponding to the non-standard spacing. The subresolution shape is defined to reinforce manufacturability of the first set of layout shapes near the non-standard spacing, and so as to ensure that the subresolution layout shape is not manufactured.

In yet another embodiment, following operation 1515, one or more non-standard spacings are identified within the layout of the given chip level. In this embodiment, a decision is made to not mitigate the identified non-standard spacings. For example, the identified non-standard spacings may be dealt with through optimization of one or more manufacturing processes without requiring modification of the layout of the given chip level.

Figure 16:
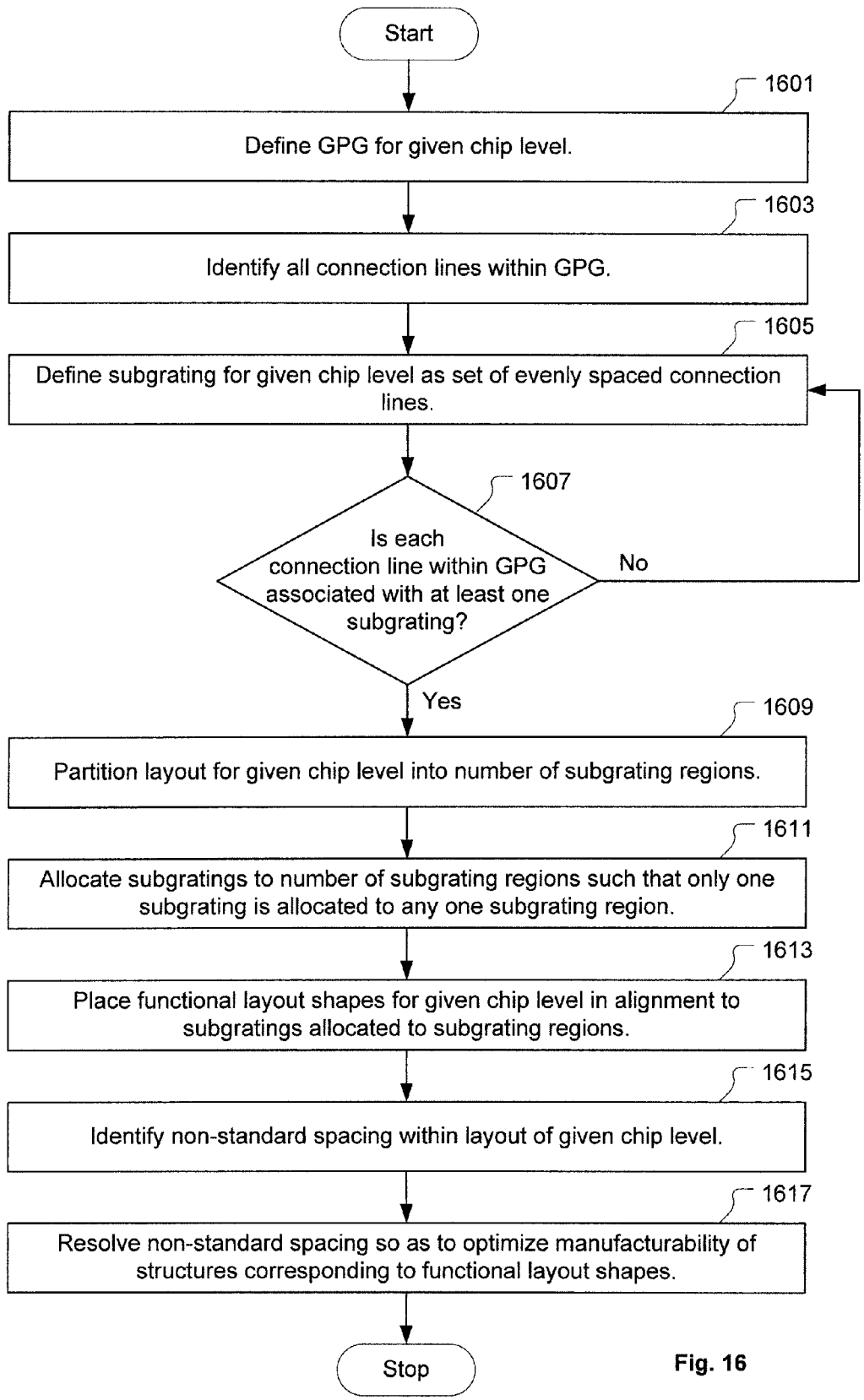
FIG. 16 shows a flowchart of a method for defining a layout for a portion of a given semiconductor chip level, in accordance with one embodiment of the present invention.

FIG. 16 shows a flowchart of a method for defining a layout for a portion of a given semiconductor chip level, in accordance with one embodiment of the present invention. The method includes an operation 1601 for defining a global placement grating (GPG) for a given chip level, wherein the global placement grating is defined by a set of parallel and evenly spaced virtual lines. The method also includes an operation 1603 for identifying all connection lines within the GPG. A connection line is a virtual line of the GPG that is spatially coincident with a virtual line of a related contact level. The method further includes an operation 1605 for defining a subgrating for the given chip level as a set of evenly spaced connection lines, such that a spacing between adjacent connection lines in the subgrating is at least as large as a minimum spacing required to support a common run length of layout shapes on the adjacent connection lines in the subgrating.

A decision operation 1607 is provided to determine whether or not each connection line within the GPG is associated with at least one subgrating. If each connection line within the GPG is not associated with at least one subgrating, the method reverts back to operation 1605. If each connection line within the GPG is associated with at least one subgrating, the method continues with an operation 1609 for partitioning the layout for the given chip level into a number of subgrating regions. Each subgrating region is defined as a contiguous area within the layout for the given chip level. An operation 1611 is then performed to allocate subgratings to the number of subgrating regions such that only one subgrating is allocated to any one subgrating region. It should be understood that different subgratings can be allocated to different subgrating regions, so long as no more than one subgrating is allocated to a given subgrating region in a given chip level.

The method continues with an operation 1613 for placing functional layout shapes for the given chip level in alignment to the subgratings allocated to the subgrating regions. Following placement of the functional layout shapes in operation 1613, the method proceeds with an operation 1615 for identifying a non-standard spacing within the layout of the given chip level. In one embodiment, identifying the non-standard spacing in operation 1615 includes comparing a side-to-side spacing of functional layout shapes located adjacent to each subgrating region interface extending parallel to the virtual lines of the GPG with a standard side-to-side spacing between (or specified for) adjacent functional layout shapes within the given chip level.

In one embodiment, an operation 1617 is then performed to resolve the non-standard spacing so as to optimize manufacturability of structures corresponding to the functional layout shapes. In various embodiments, resolving the non-standard spacing in operation 1617 can include either stretching a functional layout shape to reduce the non-standard spacing, or inserting a non-functional layout shape within the non-standard spacing, or inserting a subresolution shape within the non-standard spacing, or a combination thereof.

In an alternative embodiment, operation 1617 includes making a decision to not mitigate the identified non-standard spacing. For example, the identified non-standard spacing may be dealt with through adjustment of one or more manufacturing processes without requiring modification of the layout of the given chip level.

In one embodiment, each functional layout shape of the given chip level is placed in alignment with at least one subgrating for the given chip level and is defined as a linear layout shape having a substantially rectangular cross-section when viewed in an as-drawn state. Also in this embodiment, each functional layout shape is placed such that its lengthwise centerline extends parallel to the virtual lines of the GPG. Also in this embodiment, each functional layout shape is initially placed (prior to operation 1617) such that its lengthwise centerline is substantially centered upon a line of its subgrating.

It should be understood that the chip layouts generated by the methods disclosed herein can be stored in a tangible form, such as in a digital format on a computer readable medium. Also, the invention described herein can be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A semiconductor device, comprising:
   a first linear-shaped conductive structure defined in a given chip level of the semiconductor device, the first linear-shaped conductive structure having a lengthwise centerline oriented in a first direction, the first linear-shaped conductive structure having a width measured in a second direction perpendicular to the first direction;
   a second linear-shaped conductive structure defined in the given chip level of the semiconductor device, the second linear-shaped conductive structure having a lengthwise centerline oriented in the first direction, the second linear-shaped conductive structure having a width measured in the second direction; and
   a third linear-shaped conductive structure defined in the given chip level of the semiconductor device, the third linear-shaped conductive structure having a lengthwise centerline oriented in the first direction, the third linear-shaped conductive structure having a width measured in the second direction,
   the width of the first linear-shaped conductive structure substantially equal to the width of the third linear-shaped conductive structure,
   the width of the second linear-shaped conductive structure greater than the width of the first linear-shaped conductive structure,
   at least a portion of the second linear-shaped conductive structure positioned in a side-by-side manner with at least a portion of the first linear-shaped conductive structure, the side-by-side positioned portions of the first and second linear-shaped conductive structure separated from each other by a first distance as measured in the second direction, and
   at least a portion of the second linear-shaped conductive structure positioned in a side-by-side manner with at least a portion of the third linear-shaped conductive structure, the side-by-side positioned portions of the second and third linear-shaped conductive structures separated from each other by the first distance as measured in the second direction.

2. The semiconductor device as recited in claim 1, wherein the width of the second linear-shaped conductive structure is an integer multiple of the width of the first linear-shaped conductive structure.

3. The semiconductor device as recited in claim 2, wherein the width of the second linear-shaped conductive structure is substantially equal to two times the width of the first linear-shaped conductive structure.

4. The semiconductor device as recited in claim 1, wherein the width of the first linear-shaped conductive structure is greater than the first distance.

5. The semiconductor device as recited in claim 1, wherein the first linear-shaped conductive structure has a first end and a second end and extends in the first direction from its first end to its second end,
   wherein the second linear-shaped conductive structure has a first end and a second end and extends in the first direction from its first end to its second end,
   wherein the third linear-shaped conductive structure has a first end and a second end and extends in the first direction from its first end to its second end, and
   wherein the first ends of the first, second, and third linear-shaped conductive structures are substantially positioned on a first line oriented in the second direction.

6. The semiconductor device as recited in claim 5, wherein the second ends of the first and second linear-shaped conductive structures are substantially positioned on a second line oriented in the second direction.

7. The semiconductor device as recited in claim 6, wherein a total length of the third linear-shaped conductive structure as measured in the first direction is greater than a total length of the first linear-shaped conductive structure as measured in the first direction.

8. The semiconductor device as recited in claim 7, wherein a total length of the third linear-shaped conductive structure as measured in the first direction is greater than a total length of the second linear-shaped conductive structure as measured in the first direction.

9. The semiconductor device as recited in claim 6, further comprising:
   a fourth linear-shaped conductive structure defined in the given chip level of the semiconductor device, the fourth linear-shaped conductive structure having a lengthwise centerline oriented in the first direction, the fourth linear-shaped conductive structure having a width measured in the second direction, the fourth linear-shaped conductive structure positioned in the second direction between the first and second linear-shaped conductive structures.

10. The semiconductor device as recited in claim 9, wherein the lengthwise centerline of the fourth linear-shaped conductive structure is positioned at a midpoint of the first distance as measured in the second direction between the side-by-side positioned portions of the first and second linear-shaped conductive structure.

11. The semiconductor device as recited in claim 10, wherein the width of the fourth linear-shaped conductive structure is substantially equal to the width of the first linear-shaped conductive structure.

12. The semiconductor device as recited in claim 10, further comprising:
   a fifth linear-shaped conductive structure defined in the given chip level of the semiconductor device, the fifth linear-shaped conductive structure having a lengthwise centerline oriented in the first direction, the fifth linear-shaped conductive structure having a width measured in the second direction, the fifth linear-shaped conductive structure positioned in the second direction between the fourth and third linear-shaped conductive structures.

13. The semiconductor device as recited in claim 12, wherein at least a portion of the fifth linear-shaped conductive structure is positioned in a side-by-side manner with at least a portion of the fourth linear-shaped conductive structure, the side-by-side positioned portions of the fourth and fifth linear-shaped conductive structures separated from each other by the first distance as measured in the second direction.

14. The semiconductor device as recited in claim 13, wherein at least a portion of the fifth linear-shaped conductive structure is positioned in a side-by-side manner with at least a portion of the third linear-shaped conductive structure, the side-by-side positioned portions of the third and fifth linear-shaped conductive structures separated from each other by the first distance as measured in the second direction.

15. The semiconductor device as recited in claim 14, wherein the width of the fourth linear-shaped conductive structure is substantially equal to the width of the first linear-shaped conductive structure, and wherein the width of the fifth linear-shaped conductive structure is substantially equal to the width of the first linear-shaped conductive structure.

16. The semiconductor device as recited in claim 14, wherein the first linear-shaped conductive structure has a first end and a second end and extends in the first direction from its first end to its second end,
   wherein the second linear-shaped conductive structure has a first end and a second end and extends in the first direction from its first end to its second end,
   wherein the third linear-shaped conductive structure has a first end and a second end and extends in the first direction from its first end to its second end,
   wherein the fourth linear-shaped conductive structure has a first end and a second end and extends in the first direction from its first end to its second end,
   wherein the fifth linear-shaped conductive structure has a first end and a second end and extends in the first direction from its first end to its second end,
   wherein the first ends of the first, second, and third linear-shaped conductive structures are substantially positioned on a first line oriented in the second direction,
   wherein the second ends of the first and second linear-shaped conductive structures are substantially positioned on a second line oriented in the second direction,
   wherein the first ends of the fourth and fifth linear-shaped conductive structures are substantially positioned on a third line oriented in the second direction, and
   wherein a region of the given chip level located between the first and third linear-shaped conductive structures and located between the second and third lines oriented in the second direction does not include any conductive structure.

17. The semiconductor device as recited in claim 1, wherein the given chip level is a gate electrode level of the semiconductor device.

18. The semiconductor device as recited in claim 1, further comprising:
   a substrate, wherein the given chip level is a first interconnect level of the semiconductor device in a direction extending upward from the substrate.

19. The semiconductor device as recited in claim 1, further comprising:
   a substrate, wherein the given chip level is a second interconnect level of the semiconductor device in a direction extending upward from the substrate.

20. A method for fabricating semiconductor device, comprising:
   defining a first linear-shaped conductive structure in a given chip level of the semiconductor device, the first linear-shaped conductive structure having a lengthwise centerline oriented in a first direction, the first linear-shaped conductive structure having a width measured in a second direction perpendicular to the first direction;
   defining a second linear-shaped conductive structure in the given chip level of the semiconductor device, the second linear-shaped conductive structure having a lengthwise centerline oriented in the first direction, the second linear-shaped conductive structure having a width measured in the second direction; and
   defining a third linear-shaped conductive structure in the given chip level of the semiconductor device, the third linear-shaped conductive structure having a lengthwise centerline oriented in the first direction, the third linear-shaped conductive structure having a width measured in the second direction,
   the width of the first linear-shaped conductive structure substantially equal to the width of the third linear-shaped conductive structure,
   the width of the second linear-shaped conductive structure greater than the width of the first linear-shaped conductive structure,
   at least a portion of the second linear-shaped conductive structure positioned in a side-by-side manner with at least a portion of the first linear-shaped conductive structure, the side-by-side positioned portions of the first and second linear-shaped conductive structure separated from each other by a first distance as measured in the second direction, and
   at least a portion of the second linear-shaped conductive structure positioned in a side-by-side manner with at least a portion of the third linear-shaped conductive structure, the side-by-side positioned portions of the second and third linear-shaped conductive structures separated from each other by the first distance as measured in the second direction.

21. A non-transitory data storage device having program instructions stored thereon for generating a layout of a semiconductor device, comprising:
   program instructions for defining a layout of a first linear-shaped conductive structure defined in a given chip level of the semiconductor device, the first linear-shaped conductive structure having a lengthwise centerline oriented in a first direction, the first linear-shaped conductive structure having a width measured in a second direction perpendicular to the first direction;
   program instructions for defining a layout of a second linear-shaped conductive structure defined in the given chip level of the semiconductor device, the second linear-shaped conductive structure having a lengthwise centerline oriented in the first direction, the second linear-shaped conductive structure having a width measured in the second direction; and
   program instructions for defining a layout of a third linear-shaped conductive structure defined in the given chip level of the semiconductor device, the third linear-shaped conductive structure having a lengthwise centerline oriented in the first direction, the third linear-shaped conductive structure having a width measured in the second direction, the width of the first linear-shaped conductive structure substantially equal to the width of the third linear-shaped conductive structure, the width of the second linear-shaped conductive structure greater than the width of the first linear-shaped conductive structure, at least a portion of the second linear-shaped conductive structure positioned in a side-by-side manner with at least a portion of the first linear-shaped conductive structure, the side-by-side positioned portions of the first and second linear-shaped conductive structure separated from each other by a first distance as measured in the second direction, and at least a portion of the second linear-shaped conductive structure positioned in a side-by-side manner with at least a portion of the third linear-shaped conductive structure, the side-by-side positioned portions of the second and third linear-shaped conductive structures separated from each other by the first distance as measured in the second direction.

* * * * *